(12) United States Patent
Watfa et al.

(10) Patent No.: US 11,614,974 B2
(45) Date of Patent: Mar. 28, 2023

(54) ENABLING A FOG SERVICE LAYER WITH APPLICATION TO SMART TRANSPORT SYSTEMS

(71) Applicant: CONVIDA WIRELESS, LLC, Wilmington, DE (US)

(72) Inventors: Mahmoud Watfa, Saint Leonard (CA); Chonggang Wang, Princeton, NJ (US); Quang Ly, North Wales, PA (US); Li Xu, Plainsboro, NJ (US); Catalina Mihaela Mladin, Hatboro, PA (US); Hongkun Li, Malvern, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/651,499

(22) PCT Filed: Oct. 5, 2018

(86) PCT No.: PCT/US2018/054567
§ 371 (c)(1),
(2) Date: Mar. 27, 2020

(87) PCT Pub. No.: WO2019/071101
PCT Pub. Date: Apr. 11, 2019

(65) Prior Publication Data
US 2021/0208946 A1    Jul. 8, 2021

Related U.S. Application Data

(60) Provisional application No. 62/568,955, filed on Oct. 6, 2017.

(51) Int. Cl.
*G06F 9/48* (2006.01)
*G06F 9/50* (2006.01)

(52) U.S. Cl.
CPC .............. *G06F 9/5072* (2013.01); *G06F 9/48* (2013.01); *G06F 9/485* (2013.01); *G06F 9/4806* (2013.01);
(Continued)

(58) Field of Classification Search
CPC ........ G06F 9/48; G06F 9/4806; G06F 9/4843; G06F 9/485; G06F 9/4856; G06F 9/4862;
(Continued)

(56) References Cited

U.S. PATENT DOCUMENTS

| | | | |
|---|---|---|---|
| 2011/0145413 A1* | 6/2011 | Dawson | G06Q 40/025 709/226 |
| 2014/0143785 A1* | 5/2014 | Mistry | G06F 1/329 718/104 |

(Continued)

FOREIGN PATENT DOCUMENTS

| | | |
|---|---|---|
| WO | 2016/044581 A1 | 3/2016 |
| WO | 2016/077713 A1 | 5/2016 |

(Continued)

OTHER PUBLICATIONS

Lee et al, "An Online Secretary Framework for Fog Network Formation with Minimal Latency", IEEE ICC 2017 SAC Symposium Internet of Things Track, May 21-26, 2017, IEEE, pp. 1-6. (Year: 2017).*

A. Jain and P. Singhal, "Fog computing: Driving force behind the emergence of edge computing," 2016 International Conference System Modeling & Advancement in Research Trends (SMART), Moradabad, 2016, pp. 294-297, URL: http://ieeexplore.ieee.org/stamp/stamp.jsp?tp=&arnumber=7894538&isnumber=7894471.

(Continued)

*Primary Examiner* — Charles M Swift
(74) *Attorney, Agent, or Firm* — BakerHostetler

(57) ABSTRACT

A fog service layer architecture is disclosed using hierarchical fog node deployment including the co-existence and interactions of the fog node with a cloud node. The architecture also includes a list of functions, capabilities or services that are hosted in each fog node. One or more fog management procedures may be run between fog nodes (or (Continued)

between fogs and the cloud) and may comprise a fog capability discovery procedure, a fog connection verification procedure, and a fog capability status report procedure. In addition, fog nodes may be configured to interact with each other to get particular services using one or more fog service procedures described herein.

14 Claims, 36 Drawing Sheets

(52) U.S. Cl.
CPC .......... *G06F 9/4843* (2013.01); *G06F 9/4862* (2013.01); *G06F 9/4875* (2013.01); *G06F 9/4881* (2013.01); *G06F 9/50* (2013.01); *G06F 9/5005* (2013.01); *G06F 9/505* (2013.01); *G06F 9/5011* (2013.01); *G06F 9/5022* (2013.01); *G06F 9/5027* (2013.01); *G06F 9/5044* (2013.01); *G06F 9/5055* (2013.01); *G06F 9/5061* (2013.01); *G06F 9/5077* (2013.01); *G06F 9/5083* (2013.01); *G06F 9/5088* (2013.01)

(58) Field of Classification Search
CPC .... G06F 9/4868; G06F 9/4875; G06F 9/4881; G06F 9/50; G06F 9/5005; G06F 9/5011; G06F 9/5022; G06F 9/5027; G06F 9/5044; G06F 9/505; G06F 9/5055; G06F 9/5061; G06F 9/5077; G06F 9/5083; G06F 9/5088
See application file for complete search history.

(56) References Cited

U.S. PATENT DOCUMENTS

| | | | |
|---|---|---|---|
| 2016/0080475 A1* | 3/2016 | Singh | H04L 67/10 709/217 |
| 2016/0218939 A1* | 7/2016 | Tiwari | H04L 12/46 |
| 2017/0339070 A1* | 11/2017 | Chang | H04L 47/829 |
| 2018/0150298 A1* | 5/2018 | Balle | H04L 43/04 |
| 2018/0150330 A1* | 5/2018 | Bernat | G06F 3/0641 |
| 2018/0246768 A1* | 8/2018 | Palermo | G06F 9/45558 |
| 2019/0065284 A1* | 2/2019 | Sardino | G06F 9/5027 |
| 2019/0220703 A1* | 7/2019 | Prakash | G06F 9/505 |

FOREIGN PATENT DOCUMENTS

| | | |
|---|---|---|
| WO | 2016/089854 A1 | 6/2016 |
| WO | 2017/066936 A1 | 4/2017 |
| WO | 2017/106619 A1 | 6/2017 |

OTHER PUBLICATIONS

M. Chiang and T. Zhang, "Fog and IoT: An Overview of Research Opportunities," in IEEE Internet of Things Journal, vol. 3, No. 6, pp. 854-864, Dec. 2016, URL: http://ieeexplore.ieee.org/stamp/stamp.jsp?tp=&arnumber=7498684&isnumber=7811160.
OneM2M Technical Specification, oneM2M-TS-0001-V3.5.
OpenFog Reference Architecture for Fog Computing, available online at <https://www.openfogconsortium.org/ra/>.
X. Masip-Bruin, E. Marln-Tordera, G. Tashakor, A. Jukan and G. J. Ren, "Foggy clouds and cloudy fogs: a real need for coordinated management of fog-to-cloud computing systems," in IEEE Wireless Communications, vol. 23, No. 5, pp. 120-128, Oct. 2016, URL: http://ieeexplore.ieee.org/stamp/stamp.jsp?tp=&arnumber=7721750&isnumber=7721728.

* cited by examiner

ENABLING A FOG SERVICE LAYER WITH APPLICATION TO SMART TRANSPORT SYSTEMS

CROSS-REFERENCE TO RELATED APPLICATIONS

This application is the National Stage Application of International Patent Application No. PCT/US2018/054567 filed Oct. 5, 2018, which claims the benefit of U.S. Provisional Application No. 62/568,955 filed Oct. 6, 2017 the content of which is hereby incorporated by reference in its entirety.

BACKGROUND

The terms "cloud" and "cloud computing" have become very popular in the Information Technology (IT) domain. In IT or communications, a cloud refers to a node that serves or provides a set of functions and which is hosted remotely, specifically in an IP network such as on the Internet. Cloud computing refers to the provisioning of compute resources on a cloud node or a server that is located on the Internet. Cloud or compute resources in the cloud include hardware and software resources, storage, communications, analytics, etc. As such, cloud computing enables the manipulating, configuring, and accessing of these resources remotely. One of the benefits of this concept is the ease of service deployment and provisioning. As an example, an application or service provider may require to get and manage a few compute resources to roll out a service. Without cloud computing, a server may be needed which has to meet certain hardware requirements such as memory, compute, and network capabilities. Moreover, particular software elements may also be needed, such as an operating system and other software tools for running the desired application. As such, a service provider, whose primary focus is the application logic and hence the actual service, may also need to get and manage the resources mentioned. Any issues related to the platform may then slow down the rollout of the actual service. As such, service provisioning becomes tightly coupled with the availability and manageability of these resources.

A service provider using cloud computing can turn to a "cloud service provider" or an entity that provides all these resources and relevant software platforms that are needed to host an application, albeit remotely. The application provider can simply submit the resource needs for hosting a service (e.g., parallel computing, CPU performance, communication, storage, etc.) without worrying about how these resources are managed, configured, or whether they are virtualized or not. In this example, the concept of "cloud as a service" becomes apparent—a remote entity that provides all the required resources to host and run any type of service that is needed as long as a network connection is available.

SUMMARY

Disclosed herein are methods and systems for enhanced service provisioning using fog computing. Fog computing involves the use of cloud-like functions that are hosted at the edge in nodes called fogs. The fog nodes have computing and other resources ranging from storage, compute, analytics, capabilities that enable the processing of a multitude of IoT protocols such as CoAP, HTTP, etc., and other services such as the ability to process and react to safety application messages (such as those sent over IEEE WAVE messages), and to transmit and receive functions using access technology support. The fog nodes may provide native services such as tracking, image processing, controlling actuators, etc. These services can be provided horizontally to other fog nodes, or vertically to application instances running on the fogs. Together, the fog nodes provide a fog service layer that also interacts with a cloud entity which is assumed to oversee the fog operations.

A fog service layer architecture is disclosed using hierarchical fog node deployment including the co-existence and interactions of the fog node with a cloud node. The architecture also includes a list of functions, capabilities or services that are hosted in each fog node. One or more fog management procedures may be run between fog nodes (or between fogs and the cloud) and may comprise a fog capability discovery procedure, a fog connection verification procedure, and a fog capability status report procedure.

Fog nodes may be configured to interact with each other to get particular services using one or more fog service procedures described herein. Two broad categories of fog service procedures are described. Procedures for fog service provisioning include procedures that are executed between fog nodes for the purpose of providing services to one another based on prior discovery of fog capabilities. Although these procedures may be triggered by the application layer, the procedures focus on fog interactions for making services available horizontally across and in the fogs. Fog support services for applications may comprise procedures that have tighter interactions with the application layer that in turn uses the fog service layer to dynamically activate or relocate its services horizontally across fog areas.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

Figure 1:
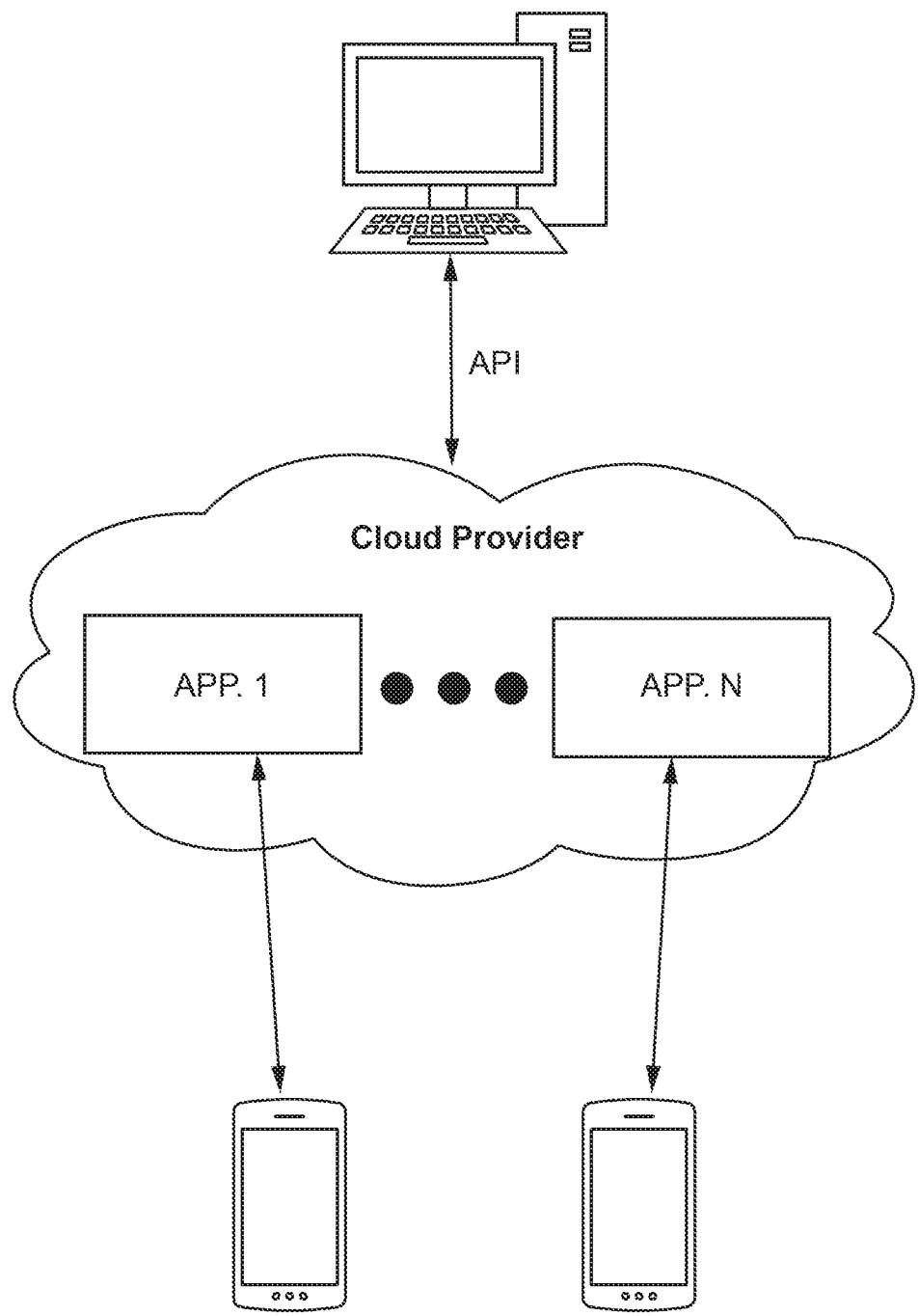
FIG. 1 shows an example basic cloud computing model.

FIG. 1 shows a basic cloud computing concept in which a service provider uses web-based APIs to deploy services on the cloud. The cloud provider defines these APIs and also owns the cloud platform that provides the necessary resources for deploying services or applications. Once deployed, devices such as smart phones can access services or applications that are on the cloud (or Internet).

An example of cloud computing service is the voice recognition and voice commands that are available on smart phones. A user may issue a voice command such as "find restaurants around me" which is then sent to the cloud (e.g., to a specific application or server in the cloud) for analysis. The result is then sent back to the device which displays to the user the list of restaurants as desired.

Although cloud computing transformed the way computing is used and services are deployed, it does require an always on connection to work. Moreover, since the cloud is remote, there are latency issues related to sending data back and forth between devices and the cloud. Furthermore, with the emergence of the Internet of Things (IoT) which may see the deployment of millions of "things," the data generated by devices is expected to increase enormously. As such, latency and bandwidth are seen as setbacks for the use of cloud computing for IoT applications or other applications that are delay sensitive (e.g. applications related to public safety, etc.). The concept of "fog computing" has been introduced to solve the drawbacks associated with cloud computing.

As the term indicates, a fog is a "small cloud on the ground." However, in terms of computing context, a fog node is a node that has cloud-like functions but it is much closer to the edge where data is generated—hence it is less remote as compared to the cloud. Fog nodes are similar to cloud in terms of their capabilities. For example, they have compute, storage, communication and other capabilities that enable the deployment of services and applications at the edge of networks. Due to their proximity to the data source, fog nodes are expected to host services that are more sensitive to latency as compared to cloud applications. With more smart things and machines, this reduction in latency is seen as key as it would enable a quicker time to receive, analyze, and respond to data generated from thousands if not millions of things.

Being closer to the devices than cloud nodes, fog computing is also expected to reduce the overall required bandwidth that is needed to send data to a point for processing and analysis. For example, data from a sensor that uses the cellular network would need to be sent wirelessly to the radio network, and then the data traverses the core network before entering into the Internet realm and eventually to the cloud server, going through a series of IP routers in the process. Whereas with fog nodes, the data may only need to be forwarded over one medium or hop and that could be using a wireless link between the fog node and a sensor as an example. The fog node can then process the data and may send commands in response (e.g. to control the flow of oil in an oil rig).

Figure 2:
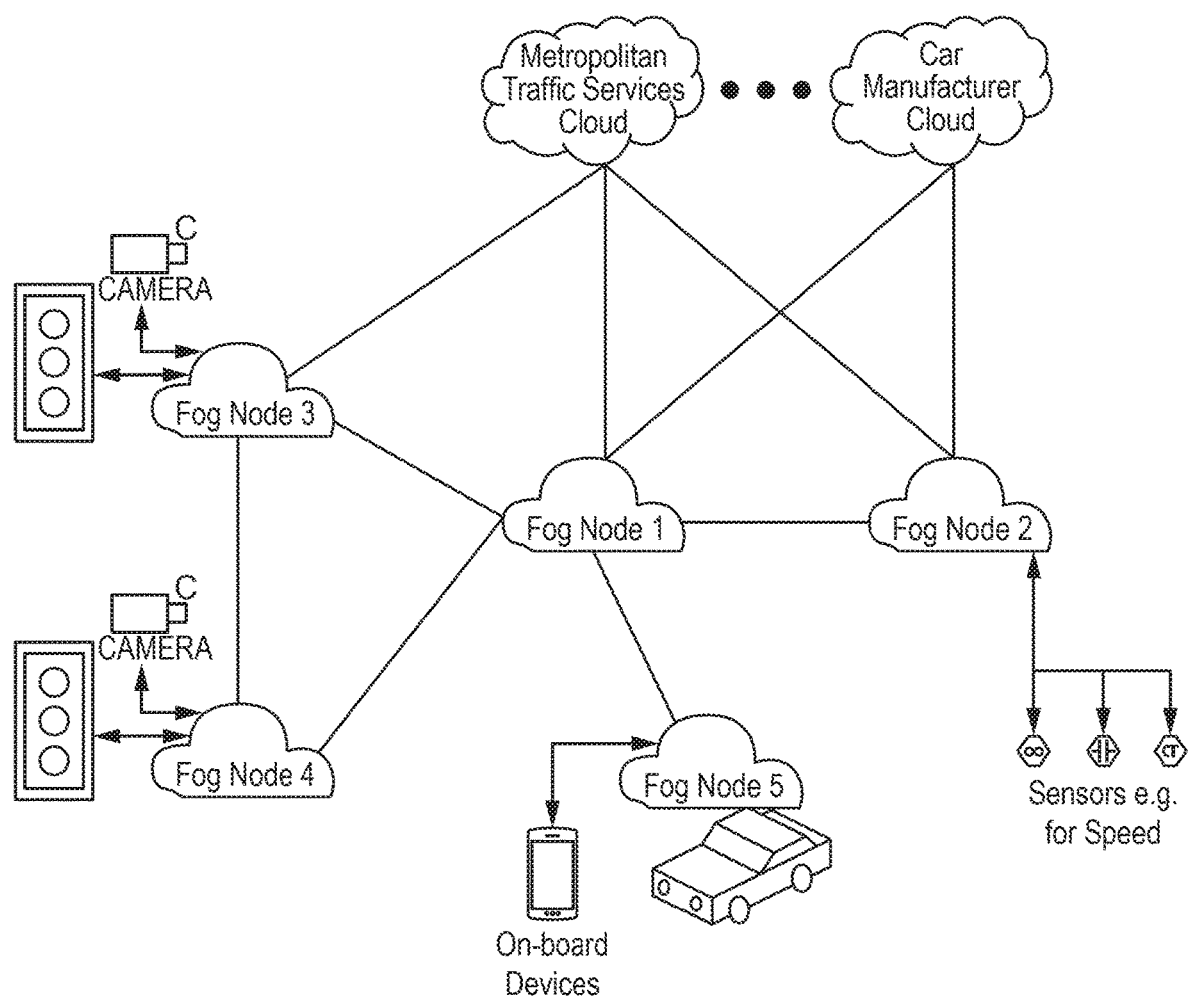
FIG. 2 shows an example fog computing scenario for smart traffic control.

Having described the advantages of fog nodes, it is important to mention that fog nodes are not intended to replace cloud nodes. Fog nodes may co-exist with the cloud, however, they may be deployed in a horizontal manner across a network. Vertically, fogs may also be deployed between the "things" and the cloud thus forming a hierarchy of fog levels, where at each level there can be a horizontal deployment of fog nodes. Therefore, fogs are seen as compute resources that "fill in the gap" between the cloud and the edge, and by doing so they also cover a wide (horizontal) area to meet the service needs of all the devices that can be sparsely deployed. To explain how cloud and fog can co-exist, consider a smart city use case where fog nodes can be deployed in areas to monitor the usage of electricity or other utilities, or even traffic. Fog nodes in particular neighborhoods may be able to receive data from sensors and meters, analyze and react to them according to the data of that neighborhood. Similarly, other fog nodes may be used in other areas to receive data in that locality and respond to it accordingly. However, data from all the neighborhoods and hence the whole city may need to be considered in its entirety (e.g. to perform big data analytics). Therefore, the fog nodes may in turn forward raw or processed data further up the fog hierarchy and eventually to the cloud. In the cloud, a system view can be achieved, big data analysis can be performed, and operational suggestions can be sent back to the lowest fog nodes to ensure optimal performance at both the local and system level. FIG. 2 shows an example deployment of fog and cloud nodes for a smart traffic control scenario.

As can be seen in FIG. 2, fog nodes are connected to traffic lights and cameras on the street. These entities send data to the fog nodes that process the data as needed. Since the traffic lights and cameras have some compute and storage resources, these nodes may be referred to as Fog Entities (FEs). The FEs send data to a Fog Node (FN) that may act as a point of convergence for the FEs in terms of data and services. As such, FN 3 and FN 4 can be considered Local Fog Nodes (LFNs) that act as a fog service layer for applications. The LFNs (or FNs in general) can connect to other FNs that may be deployed at a higher level in the fog deployment hierarchy. For example, LFN 3 (shown as FN 3) and LFN 4 (shown as FN 4) may in turn connect to FN 1 that may be considered a higher level FN. Furthermore, LFN 3 (shown as FN 3) may connect directly to a cloud node. Thus, in a smart traffic scenario, there may be a few levels of fog hierarchy and potentially connection to the cloud. Note that there may be few cloud nodes that provide different services as well. For example, a Metropolitan Traffic Services cloud may be deployed to provide traffic and transport services overseeing a whole area that contains numerous LFNs, FNs, and FEs. Similarly, a Car Manufacturer Cloud may be deployed to collect data from cars in a wide area. The data may be extracted by LFNs and FNs that are deployed in the wide area and via which the cars send information related to sensors, or other on-board devices. Note that the vehicle itself may contain compute and communication resources and hence may be considered as a FN, or a FE that is mobile.

It is important to note that fog nodes bring more dynamicity to the cloud scenario. That is to say fog nodes can be dynamically deployed as needed, and moreover for each fog node, the resources can be scaled accordingly. The fog nodes are expected to have fewer resources than the cloud which promotes a more static deployment case (i.e. the cloud is a central node that can be scaled up in resources but it is not expected that the cloud can be, at least not frequently, moved to different areas). For example, it is expected to have more storage at the cloud node compared to fog nodes, however fog nodes can also scale up storage resources to some degree.

Figure 3:
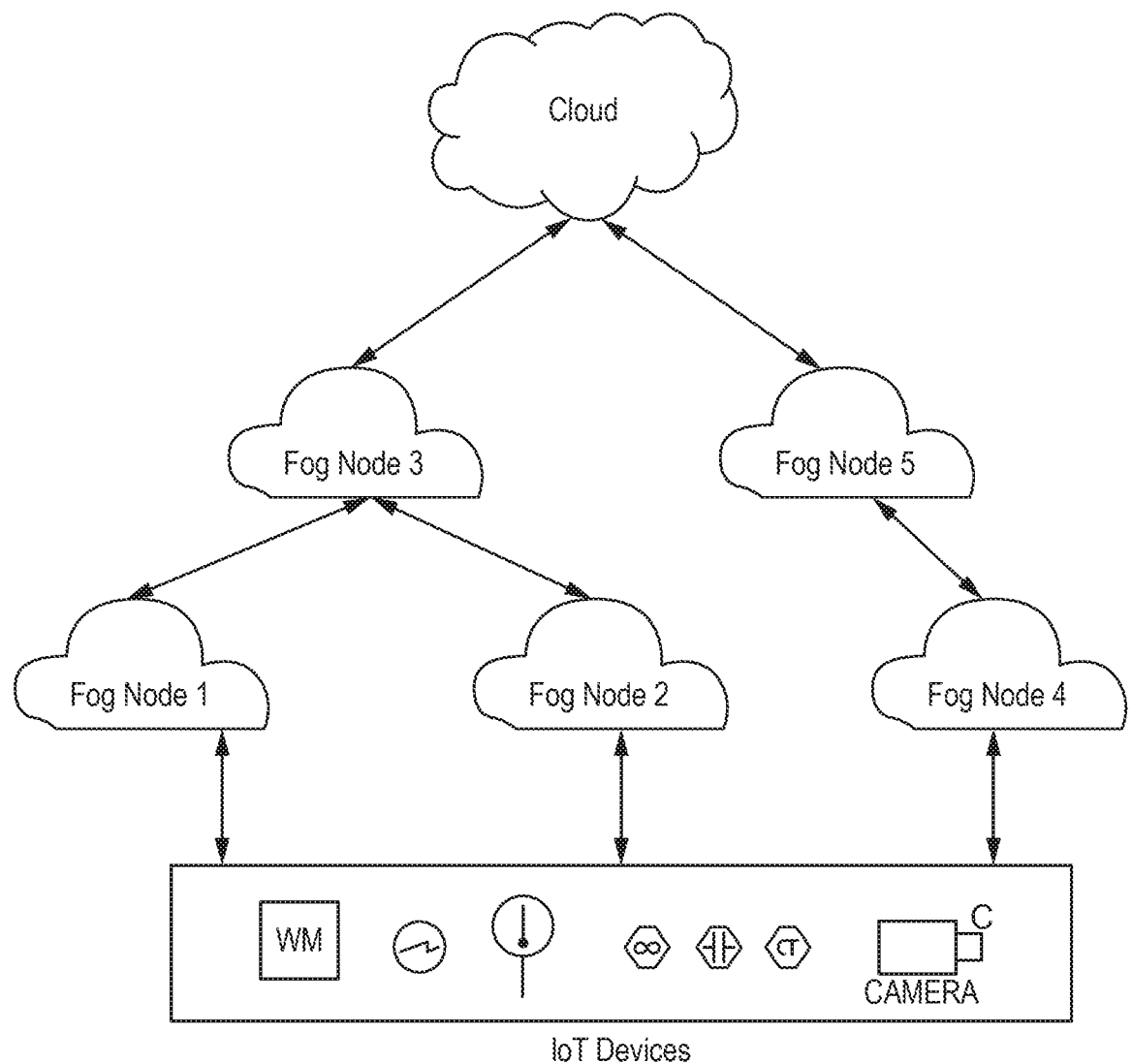
FIG. 3 shows an example hierarchy of fog nodes and their communication.

Finally, it is important to mention that fog nodes can have both east-to-west communication (between fog nodes on the same level) and also north-to-south (between nodes, including the cloud, that are vertically layered in the deployment). FIG. 3 shows an example of this horizontal and vertical communication between fog nodes and the cloud.

Disclosed herein are methods and systems for enhanced service provisioning using fog computing. Fog computing involves the use of cloud-like functions that are hosted at the edge in nodes called fogs. The fog nodes have computing and other resources ranging from storage, compute, analytics, capabilities that enable the processing of a multitude of IoT protocols such as CoAP, HTTP, etc., and other services such as the ability to process and react to safety application messages (such as those sent over IEEE WAVE messages), and to transmit and receive functions using access technology support. The fog nodes can also provide native services such as tracking, image processing, controlling actuators, etc. These services can be provided horizontally to other fog nodes, or vertically to application instances running on the fogs. Together, the fog nodes provide a fog service layer that also interacts with a cloud entity which is assumed to oversee the fog operations.

A cloud node is a node with cloud or fog capabilities (see Fog Node below) that manages the operations of other fog nodes lower in the deployment hierarchy. It also interacts with service providers and has service layer agreements and can authorize requests from fog nodes related to applications that are hosted on the fog nodes. Note that the term "cloud" may be used to refer to a Cloud Node. Furthermore, the Cloud may oversee and manage the interactions between different fog nodes that together enable a fog service layer for applications.

A fog area is the area that a Fog Node or Local Fog Node is responsible for or covers in terms of service. The node is assumed to be connected to IoT devices within the identified area and can communicate with IoT devices to obtain data. Hence it serves that area that deploys IoT devices. Note that a Fog Node serving an area does not necessarily mean that the Fog Node is directly serving the IoT devices but rather obtaining, analyzing and sharing data (from these IoT devices) with other nodes or the application layer. However, this does not also preclude that the Fog Node may act as a gateway or provide a storage service for IoT devices.

A fog entity is a node that has a sub-set of the capabilities of a Fog Node. Moreover, a Fog Entity may connect to a Local Fog Node (see below) and hence become a source of data and service for the Local Fog Node. In addition, the Fog Entity may also request and consume data or services from the Local Fog Node. The application layer (above the Local Fog Node) does not "see" the Fog Entity directly and is able to use its data or services via the Local Fog Node in a transparent manner. In the smart transport use case described herein, a Fog Entity may be a sensor, a camera, a traffic light, or any IoT device with basic (relatively small) compute and storage resources. Moreover, the Fog Entity may be deployed behind or below the Local Fog Node.

A fog node is a node that has any fog resource such as compute, storage, communication, analytics, etc. A fog node may have at least one of these resources and may also have other software or services that are running on the fog node. For the smart transport use case described herein, a Fog Node may be deployed at one level higher than the level of a Local Fog Node. There may be several levels of Fog Node deployments with the Cloud Node being at the highest level. It also assumed that a Fog Node may connect to at least one Local Fog Node and that the former also manages at least one Local Fog Node.

A local fog node is a fog node with numerous capabilities and services that together with other LFNs and the cloud create a fog service layer that provides services for authorized applications. Moreover, the Local Fog Node may be connected to more than one Fog Entities (FEs) that are located in the service area of the Local Fog Node. These (FEs) in turn become sources of data and service that are consumed by the Local Fog Node. Note that a Local Fog Node is a particular instantiation or type of a Fog Node with the characteristics as discussed herein The Local Fog Node can also provide services and data to the Fog Entities that are connected to it. The Local Fog Node, together with other neighboring Local Fog Nodes, appear as a Fog Service Layer to the applications that are hosted on the Local Fog Node. These applications may communicate and interface with the Local Fog Node only and hence may not be configured to interface with the Fog Entities directly. In the smart transport use case, the Local Fog Node may be located between the Fog Entity and the Fog Node or Cloud Node. The Local Fog Node may be assumed to be managed by a Fog Node or a Cloud Node that is one level above the Local Fog Node in the fog deployment hierarchy. As such, a Local Fog Node may connect to multiple Fog Entities and to one Fog or Cloud Node. A Road Side Unit may act as a Local Fog Node or may host some of the logical functions of it. A vehicle may act as a Fog Entity and/or a Local Fog Node depending on the scenario and objective.

It is expected that millions of machines, sensors, meters of various types (light, speed, water, etc.) may be deployed in cities—homes, offices, streets, cars, etc. All of these "things" may be generating lots of data that require some sort of analysis and action. For example, Radio Frequency Identification (RFID) can be used to detect the presence of an authorized driver and actuators may then be used to open or close the gates of a private parking, etc. Currently, most traffic lights operate using specific periodicity for switching between different colors. It is often the case that there may not be any car on a street for which the traffic light is actually green. However, at the intersection of that street, a queue of cars may be waiting for the traffic light facing them to change from red to green. As such, time based traffic light operation may not be optimal. With cameras and sensors installed, a traffic control system can use this extra information to make changes, in real-time, to the operation of the lights so that traffic does not buildup unnecessarily. Note that vehicle detection loops are currently used to detect vehicles at intersections but these require hardware to be installed in the pavement. With IoT devices and big data, such installations can be avoided and these new data sources can replace and help provide more insights for traffic (light) control. Thus, we can see that with more "things" deployed, and more data, a better understanding and awareness of the surrounding can be achieved using this data. In turn, better decisions can be made to improve a set of services. Note that this use case applies to a smart transport scenario, however, the idea of extracting data on a real-time basis from numerous sensors, machines, and "things" in general, sharing this data with entities that can benefit from them, performing analysis and responding accordingly, is an operational enhancement that can be applied to any use case and hence it is not limited to transport systems alone. However, smart transport is used as an example to reflect the benefit of fog computing.

In the context of transport systems, it is important to note how fogs, and the data extracted and shared by fog nodes, can be leveraged for improved services. Consider today's navigation system, for example a navigation application on a smart phone. Many of these applications compute traffic conditions based on the speed of the vehicle. To be more accurate, the vehicle's speed is determined based on speed measurements obtained from the smartphones of the driver in these vehicles. There are a few limitations associated with this method. First, this determination does not represent the whole set of drivers as the computation depends on only those who are actively using the application. Otherwise, the application does not by itself send speed readings. Moreover, the application server to which this information is sent needs some time in order to come up with relatively accurate information. As such, a hazard such as a dropped item from a truck, which may cause slow down, may not be considered by these applications on a real-time basis. Also, vehicle breakdown, which immediately slows traffic, may not be immediately reflected by these applications. As such, it becomes evident that using the speed information from a sub-set of drivers does not give an accurate and real-time description of traffic conditions. Therefore, other data from cameras, sensors, and road side units (RSUs) can indeed make a difference in providing real-time traffic conditions.

Figure 4:
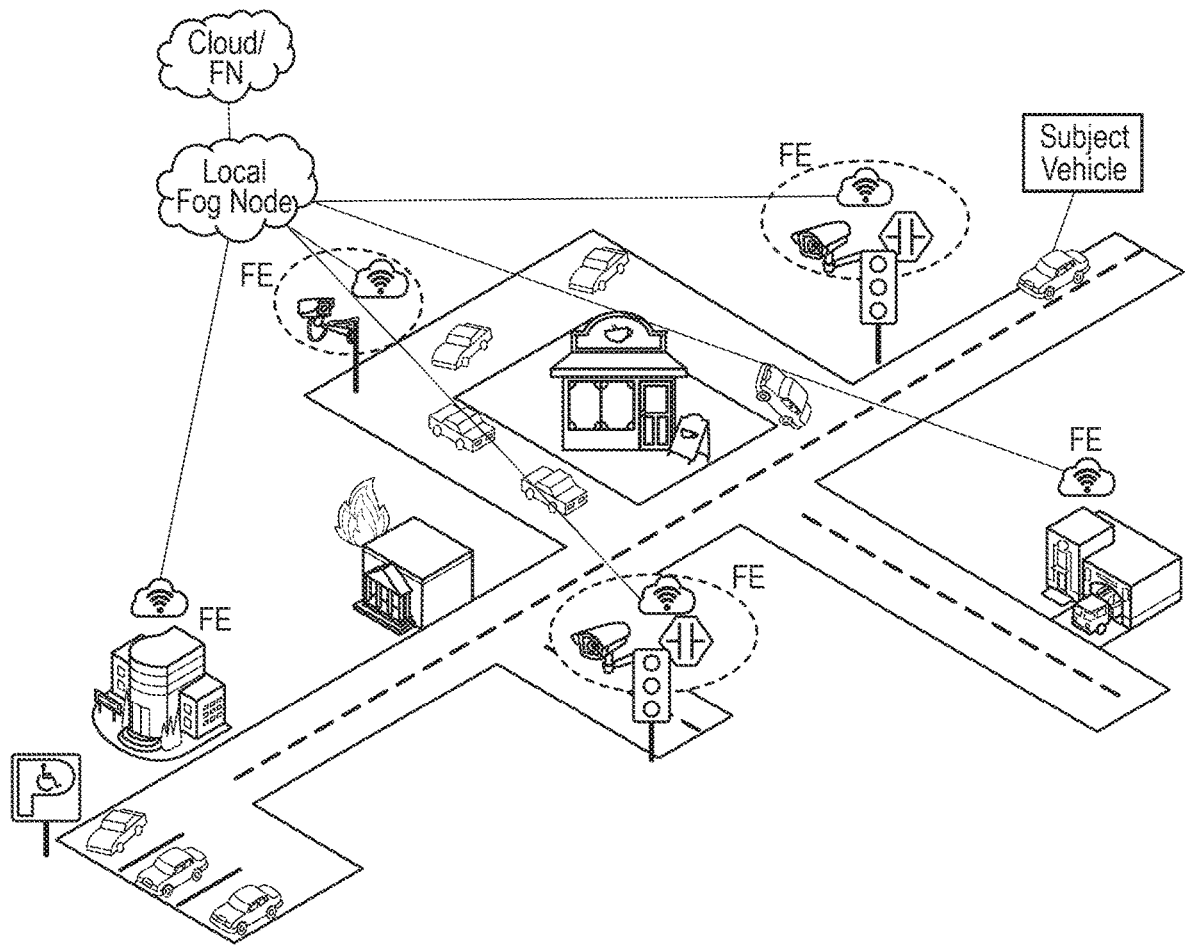
FIG. 4 shows an example use of fog computing for smart transport systems.

FIG. 4 depicts an example use case illustrating the importance of fog computing in data extraction, sharing, and analytics. This use case is explained for the scenario of self-driving cars that are seen as key for enabling the concept of smart transport systems. However, it should be noted that this is just an example and therefore the problems and solutions to follow would apply to other cases also that do not use self-driving cars.

Consider a subject vehicle, as shown in the upper right side of FIG. 4, that is capable of self-driving. A passenger using this self-driving car may desire to get to a particular destination and as such the transport is seen as a service for the user. As part of the transport service, the user may also need to get other services such as, stopping at a particular point of service (e.g. coffee shop), finding a parking spot at the destination, and getting notifications about an eminent emergency service.

Stopping at a Service Point:

First, the user may want to stop at a service point somewhere in between the starting location and the destination. The service point may be a coffee shop or a gas station, or other places that provide a service of interest to the user. Assuming the service point is a coffee shop, the user may want to spend the least time possible to get a cup of coffee and may want to use the drive through service of the coffee shop. Typically, focus is put on the time it takes to get to a particular service point without knowing much about what is happening in the service point itself. For example, the traffic load may be average in order to drive to the coffee shop, however, a particular coffee shop may be much busier than another. As such, factoring in the "congestion" at local service points (e.g. drive throughs) are taking long at a particular coffee shop, can help in determining a better route and reduce the overall time to commute. Fog nodes can provide local information in particular places or service points which can be used to determine the best route. As such, route calculation for self-driving cars is not limited by the volume and speed of other cars, but also depends on the service needs of the users and the traffic load in and around the points that provide these services. As such, continuing with the example of the coffee shop, driving two streets further instead of driving into a coffee shop that is just as close may actually reduce the overall driving time since the closer coffee shop may be much busier and hence makes the commute time longer. Fog nodes can provide this extra information to enhance transport services.

Thus, looking at FIG. 4, a coffee shop can have cameras and sensors that connect to a fog node. This node can determine the degree of congestion locally and can share this information on a real-time basis with other fog nodes. Smart traffic applications can use this information to suggest service points that meet the user's requirements while reducing the overall time to travel.

Finding a Parking Spot at the Destination:

As part of the smart transport service, a user may want to find out about the availability of parking at a destination. For a self-driving car scenario, it may be important to gauge the availability of parking spots so that a vehicle can decide on a particular spot and drive towards it. Note that this use case also applies to the non-self-driving scenario. For example, a driver using a smart transport service may also want to track the availability of parking spots at a destination. To get to a destination quicker is not the only objective in this case. For example, going around a block to find parking close to a particular building may take more time than actually parking a block or two away. As such, getting this information from fog nodes can provide a driver with relevant real-time information that would make the driving and transport system much more efficient in terms of time.

In FIG. 4, a fog node can be on a building and is connected to cameras and sensors such that the fog node can determine the availability of parking spots and possibly parking spots that are for those with special service needs, etc. This information can be shared with other fog nodes and eventually to the self-driving cars (or the driver who is using a smart transport application/service) in order to make the best decisions and minimize time.

Notifications about Eminent Emergency Scenario:

It may be possible that an emergency situation (e.g. fire) has occurred in a place or building to which public safety service personnel may be dispatched. Fire trucks, ambulances, etc., can have a pre-known path to get to their destination. However, the vehicles that are also driving towards that same destination are not aware of the congestion that would occur. There is typically no links, in current smart navigation systems, between a fire in a building and traffic conditions. These are more predictive type of conditions that can be taken into account and vehicles driving in these areas can be notified and redirected from the area of incident. This action would help both the drivers (or self-driving cars) and the public safety crew.

As shown in FIG. 4, a public safety department (e.g. fire truck service department) may have a fog node that is aware of emergency events and the location of these events. As the fire truck is dispatched, the fog node can share this information with neighboring fog nodes that can then broadcast this information so that self-driving cars avoid certain routes. This would avoid congestion on the road and it may make the fire trucks get to their destination quicker as traffic is diverted from that location.

The examples shown above stem from the availability of numerous "things" that are deployed ubiquitously—cameras at almost every intersection, speed sensors, temperature sensors and other detectors (e.g., of slippery roads), other sensors that report availability of parking spaces, RSUs that can transmit or receive safety messages from vehicles, etc. Such deployment gives rise to an enormous amount data from which useful information can be extracted and shared to authorized parties for an enhanced service provision, whether that is related to smart traffic control or smart transport in general, and better public safety services. Fog computing is thus seen as a key enabler for extracting and sharing data on a real-time basis with numerous applications one of which is the smart transport system disclosed herein.

Self-driving cars are expected to become a reality in the next few years. It is important that a safe speed is maintained according to changing traffic conditions on a real-time basis. For example, a hazard in one area may cause the vehicles around it to slow down. However, if other vehicles approaching the area are not notified ahead of time, then many cars may enter that area and many of them would need to slow down within a short period of time or perform sudden stops. This is not safe and may actually cause more traffic in the area. It would be much better to take a proactive approach and notify other self-driving cars approaching the area to modify their speeds. This makes the driving safer and also maintains a constant flow of vehicles into and out of the area in question hence reducing overall traffic. Such operational recommendations between fog nodes are not limited to speed information only, however, speed information for self-driving cars shows how such procedures can enhance any service that is provided with fog computing.

Cloud computing presents a new business model that is based on charging for actual resource usage, typically called "pay as you go." It may be important to maintain this for fog computing as well. Since fog enables a dynamic environment for deploying services, it makes sense to charge the service providers only when they actually use the fog service layer. Therefore, service providers may actually not instantiate their services and applications in all fog nodes, rather they may do so when there are users who actually in turn want to use their services.

In the context of driving and smart transport, the application layer may be aware of the user or vehicle position and the destination and route towards the destination. Since we may assume that fog nodes are deployed in different areas, we may also assume that a service or application may have instances in some of these fog areas that are served by the deployed fog nodes. However, it is possible that a user (e.g. a user who is using a smart transport application) is moving into a new area that is served by a different fog node which does not currently have the smart transport application instantiated on the potential new fog node. To enable the continuity of the service across the areas, the application in the source fog node may actually request the source fog node to trigger the instantiation of the application in the adjacent or neighboring fog nodes. As such, when the user moves into that area, the service remains available without the user knowing about this real-time instantiation. In this manner, the application provider only pays for using the fog resources when the services are actually consumed by the user, while the user seamlessly gets access to the service despite mobility. Further to instantiation of applications in target fog nodes, the application may be made aware of the user context for users that are moving into these fog areas so that services are seamlessly accessed without the users being aware of the instantiation or lack of services due to mobility.

Another related use case is the one in which a passenger in the vehicle is watching a movie using a streaming service. The application provider knows the destination and the route of the vehicle. Since the vehicle remains under one fog node's area for a certain period of time, it may be unnecessary to have the full movie in one fog node. Instead, the data, in this case video streams, can be prepared across the route of the vehicle up until the destination. The fog nodes in these areas may be requested to instantiate the application ahead of time and also the application may be provided with enough information to predict the time when the vehicle may be under the hosting fog node's coverage and how much data should be buffered ahead of time for delivery to the vehicle. In this use case, it is assumed that the fog node has RSUs connected to it via which the data is sent to the vehicle.

The OpenFog Reference Architecture for Fog Computing presents the concept of fog computing in terms of requirements that explains the roles of various players in fog computing such as chip manufactures, individual fog node developers, system integrators of a network of fog nodes, and application providers (that host applications or services on fog nodes). The document also presents several use cases that use fogs, one of which is smart transport. As part of the overall description, and regardless of the use case (be it smart transport, smart grid, etc.), the OpenFog Reference Architecture discusses the important functions that are needed for fog computing, namely, compute, storage, communication, and analytics. The need for communication between fog nodes, and between fog and cloud nodes are also discussed. However, the OpenFog Reference Architecture does not describe any procedure that actually enables such communication between fog nodes.

The concept of fog computing in light of different use cases some of which are related to smart transport or traffic scenarios has also been discussed, as have the advantages of fog computing such as reduced latency and real-time data sharing and analytics, etc. However, a set of procedures that show how a system of fog nodes can interact to extract and share data has not been defined. For example, see the following: (i) M. Chiang and T. Zhang, "Fog and IoT: An Overview of Research Opportunities," (ii) A. Jain and P. Singhal, "Fog computing: Driving force behind the emergence of edge computing," and (iii) X. Masip-Bruin, E. Marin-Tordera, G. Tashakor, A. Jukan and G. J. Ren, "Foggy clouds and cloudy fogs: a real need for coordinated management of fog-to-cloud computing systems."

Therefore, procedures that are currently missing but are relevant to materialize the concept and advantages of fog computing, for example, to enable the extraction of data from "things," process the data, share the data, and respond to the data accordingly are described herein. Note again that although the disclosure presents these topics for a smart traffic application use case, the problems and associated solutions apply to all other use cases that can benefit from fog computing.

In order to extract, analyze and share relevant data across fog nodes, it is important to define the methods by which fog nodes perform management procedures to make available a wide set of fog services to several verticals and to other fog/cloud nodes in the deployment hierarchy. Some of these management procedures include:

Fog capability discovery: the methods by which fog nodes discover the capabilities of neighboring fog nodes, or other fog or cloud nodes at a different level in the fog deployment hierarchy. As these procedures are missing, the definition of fog capabilities is also missing. Hence both the procedure and the definition of fog capabilities (and their discovery) are currently unspecified.

Fog reachability verification: methods by which the fog nodes verify whether the fog nodes are still reachable in order to send data to, or receive data from, these fog nodes when needed.

Fog reports about status of "things": methods via which fog nodes report the status of the "things" that are under their control and from which relevant data can be extracted. For example, a camera installed in a particular street intersection may stop working and other fog nodes or vertical applications on the controlling fog nodes may need to be updated about this status so that other data sources can be used to maintain service availabilities. Similarly, there is a need to define procedures that report the resumption of data from particular data sources or "things."

Figure 5:
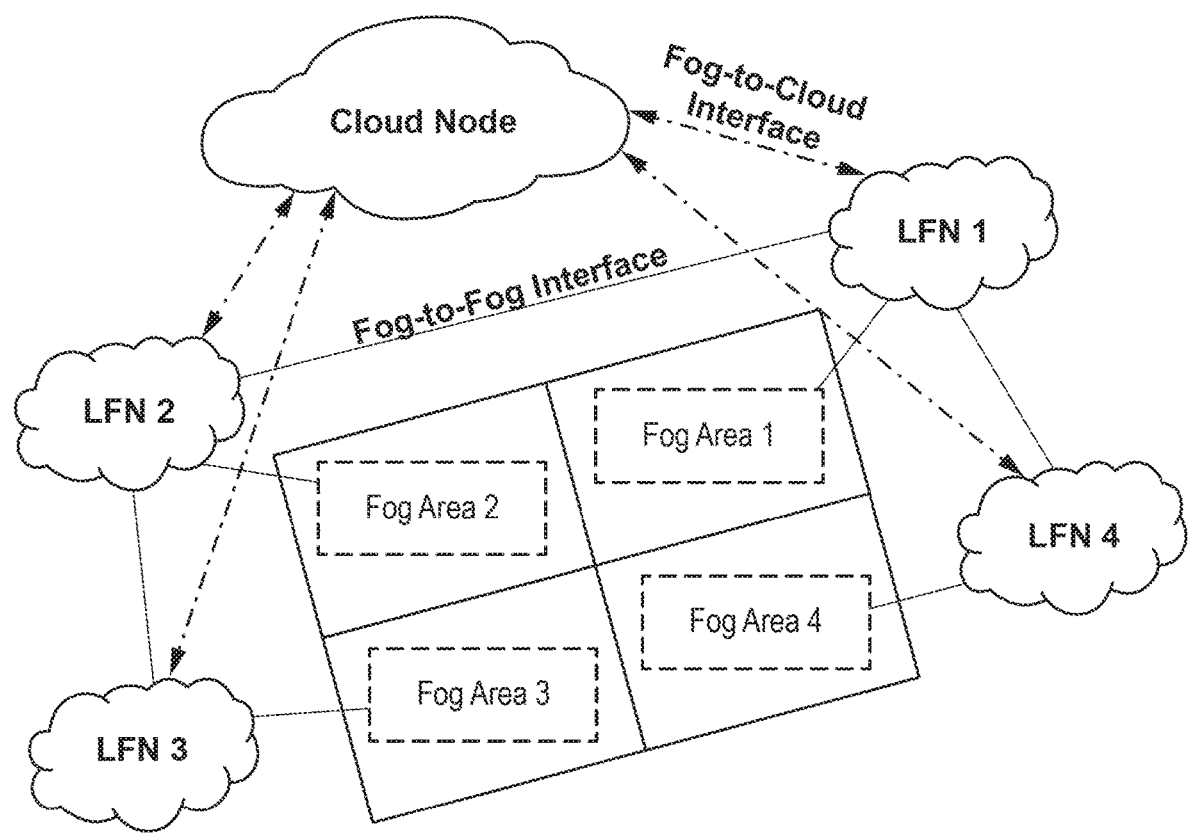
FIG. 5 shows example of fog and cloud node connections per area.

In the example of FIG. 5, it is assumed that a Local Fog Node (LFN) is deployed per area or location known as a fog area. Moreover, in this location, the LFN is connected to other fog nodes. Considering an area and hence a LFN, we may assume that an LFN is connected to other fog entities or it may also be connected to "things" (e.g. cameras, speed sensors, traffic lights, etc.) directly or indirectly via the fog entities. As such, every LFN is seen as the main fog entity that provides a "service layer" for a smart transport system.

Linking these figures with the problems described, every LFN may need to execute fog management procedures to discover the capabilities of its neighbors (i.e. LFNs), to ensure the neighbors are still reachable and to notify neighbors of the operational status of "things." For example, in order to provide a system wide service, management procedures may be needed for LFN in fog area 1 to interact with that of fog area 2 to discover capabilities, ensure reachability, and share notifications of the "things" controlled by these LFNs.

After running management procedures, (e.g. fog nodes discovering the capabilities of each other) the nodes may then provide or receive services from other fog nodes. There are currently no procedures defined that specify how these fog nodes provide or receive services to each other, or to the cloud. As such, the following may be defined:

(1) Necessary procedures for fog service requests: how functions in the fog nodes interact locally, and how fog nodes interact with each other to provide or receive services. For example, what are the messages and behavior of fog nodes that would enable one node to request video feed from a camera that is under the control of a neighboring fog node?

(2) Procedures that support the needs of applications across fog nodes. This is concerned with the interactions between fog nodes and application entities, or fog nodes and the cloud, for the purpose of providing particular services to the application layers such as real-time application instantiation on fog nodes, application layer context transfer across fog nodes, and other procedures that improve service provisioning.

With reference to FIG. 5, after the LFNs discover capabilities of other LFNs, a LFN in one area may need to obtain a fog service (e.g. raw or processed data from speed sensors and cameras in particular streets) from another LFN. Procedures are needed to enable such interactions for enabling service provisioning after executing management procedures.

Methods and systems for enhanced service provisioning using fog computing are disclosed. Fog computing involves the use of cloud-like functions that are hosted at the edge in nodes called fogs. The fog nodes have computing and other resources ranging from storage, compute, analytics, capabilities that enable the processing of a multitude of IoT protocols such as CoAP, HTTP, etc., and other services such as the ability to process and react to safety application messages (such as those sent over IEEE WAVE messages), and to transmit and receive functions using several access technology support. The fog nodes can also provide native services such as tracking, image processing, controlling actuators, etc. These services can be provided horizontally to other fog nodes, or vertically to application instances running on the fogs. Together, the fog nodes provide a fog service layer that also interacts with a cloud entity which is assumed to oversee the fog operations, as discussed in the following example solutions:

(1) A fog service layer architecture with hierarchical fog node deployment including the co-existence and interactions with a cloud node. The architecture may also include a list of functions, capabilities or services that are hosted in each fog node.

(2) Fog management procedures that are run between fog nodes (e.g., FN and LFN), or between fogs and the cloud. Management procedures are related to the operations of fog nodes and hence the fog service layer. These procedures are seen to be the "control plane" of fog operations and include:

(a) Fog Capability Discovery procedure: enables fog nodes and the cloud to discover capabilities of each other, where capabilities include compute, storage, analytics, and different types of IoT devices and their current locations. Other capabilities may be services that are natively provided by fog nodes such as tracking, transmit and receive functions via different access technologies, processing and reacting to safety application messages sent via IEEE WAVE, etc. Discovery thus becomes a pre-requisite for service provisioning both across fog nodes and towards applications which can then request data and services related to specific geographical locations or service points (e.g. buildings, vehicles, etc.).

(b) Fog Connection Verification: this procedure allows fog nodes to periodically verify their mutual availability. Once verified, the fog nodes can use the verified connection to chain and share fog services so that a horizontal fog service layer is maintained.

(c) Fog Capability Status Report: this procedure is used by fog nodes to report to other fog nodes or the cloud about changes in the status of their capabilities, where the capabilities are any of the examples described herein. The report may follow an explicit or implicit event subscription (3) Fog service procedures: following capability discovery procedures, fog nodes can then interact with each other to get particular services. There are two broad categories of fog service procedures presented herein. The following is a summary of these groups of services which are described in detail below.

(a) Procedures for fog service provisioning: these are procedures that are executed between fog nodes for the purpose of providing services to one another based on prior discovery of fog capabilities. Although these procedures may be triggered by the application layer, the procedures focus on fog interactions for making available services horizontally across and in the fogs. Once a service is hosted on a fog node, the service or data may also be provided to verticals if needed, or may be consumed natively by the fog node itself.

(i) Fog Service Request procedure: defines the procedure by which a fog node includes a detailed Fog Service Description (FSD) that is submitted to another fog node. The target fog node may use the FSD to fetch edge data from specified locations, process it according to the FSD and send it to the source fog node.

(ii) Fog Service Recommendation procedure: allows fog nodes to suggest parameters for an overall enhanced operation of the set of fog nodes that form a fog service layer. For example, specific messages may be broadcast across a series of fog nodes to control the speed of self-driving cars in order to maintain a constant flow of traffic in the areas controlled by these fog nodes.

(b) Procedures for fog support services for applications: these are procedures that have tighter interactions with the application layer that in turn uses the fog service layer to dynamically activate or relocate its services horizontally across fog areas.

(i) Fog Application Instantiation: this procedure allows applications to dynamically instantiate instances of the same application on other fog nodes based on user mobility that is tracked by the application layer. This enables reduced costs for application providers who would only pay for fog resources when needed (e.g., when applications are instantiated), and hence use fog resources, only when users need them.

(ii) Fog Application User Context Relocation: this procedure may follow the instantiation procedure, or at least assume an application instance is already running on a target fog node into whose area a user is moving. The application then uses the fog service layer to transfer the user context onto the target application instance on the target fog node. The target application instance then continues to serve the user hence enabling ubiquitous and seamless service availability during mobility.

(iii) Fog Service for Application Preparation based on Predicted Mobility Pattern: is a procedure that enables the application layer to instantiate (if need be) applications in a few fog nodes ahead of a predicted mobility pattern. Moreover, the fog service layer enables the sharing of vital user information that enables these instances in the corresponding fog nodes to prepare a service ahead of the user's mobility into the area (e.g., to buffer video data). Once in the area of a new fog node, the application simply forwards the data to the user instead of having to wait for the user to request the service. Thus, the fog service layer enables a proactive service availability approach that avoids a service to be interruptible during user mobility.

(4) Also described herein are oneM2M embodiments for some fog management procedures, namely for the Fog Capability Discovery procedure that is implemented with a Retrieve operation, and the Fog Capability Status Report procedure that is implemented with an Update procedure. A GUI is described to show the hierarchical deployment of LFNs with FN and the Cloud and the types of FEs that are linked to LFNs.

Figure 6:
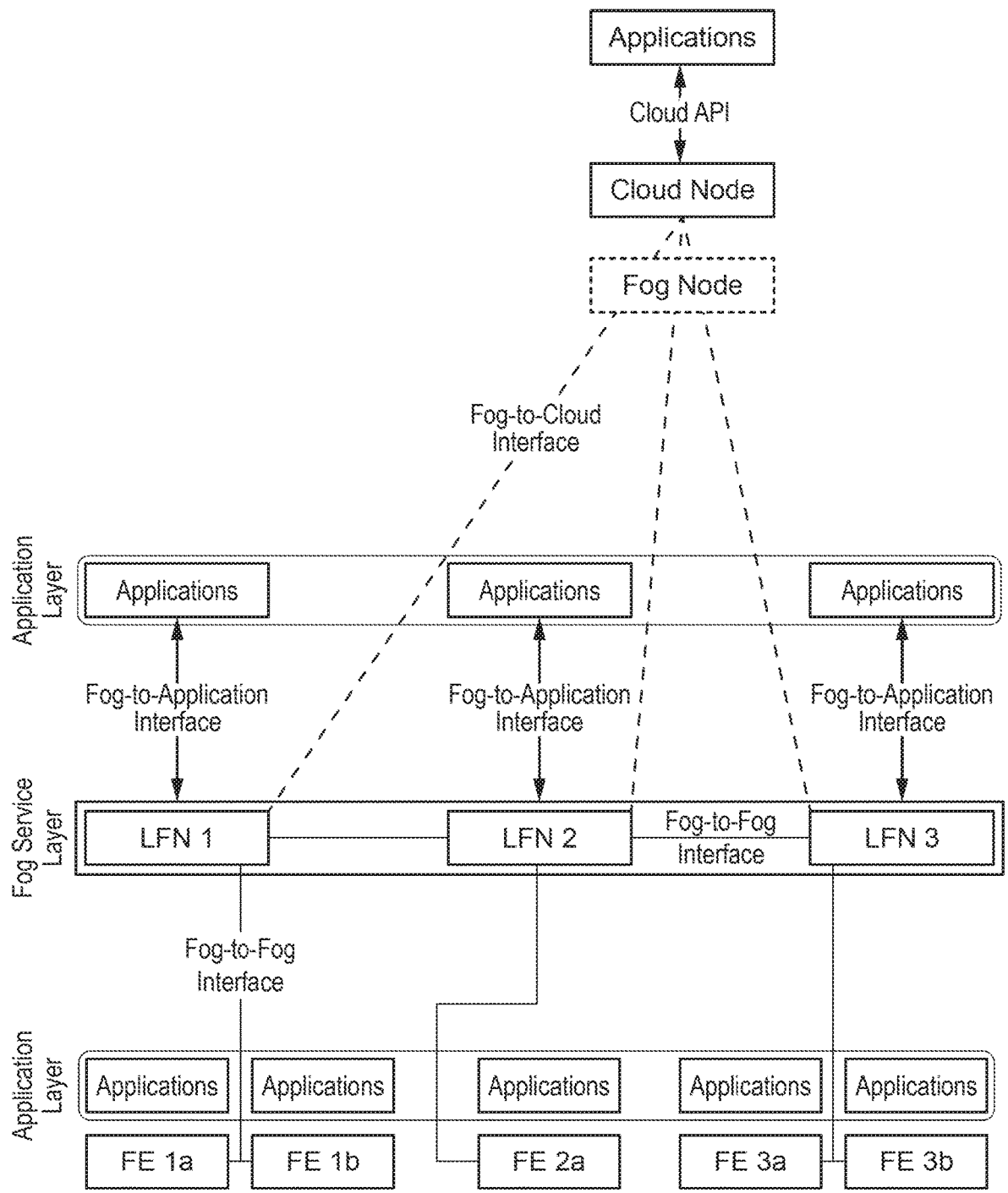
FIG. 6 shows an example fog service layer architecture.

FIG. 6 shows an example fog service layer architecture composed of cloud and fog nodes forming a hierarchical deployment. At the highest level, there is the cloud node (CN) that manages all the fog nodes and is aware of their presence and capabilities. The cloud node (CN) and the Local Fog Nodes (LFNs) may interact using the Fog-to-Cloud interface. The CN may be deployed such that it oversees a very large area which is composed of several smaller areas, known as fog areas, each of which is overseen by a LFN. The LFNs together provide a Fog Service Layer that is capable of providing fog services to vertical applications running on the LFNs and to each other using a Fog-to-Fog interface. Services may include extracting data from "things," performing analytics, sharing data, etc. The LFN can be connected to fog entities (FEs) which are nodes with fog capabilities. Their capabilities may be the same as those of the LFNs or they can be smart cameras with fog capabilities (memory, compute, image processing logic, communication that may be wired or wireless, etc.), smart traffic lights, or speed sensors with fog capabilities. In the smart transport use case, the FEs are types of FNs with smaller fog capabilities and may be residing in service points such as a coffee shop and they in turn can control "things" such as cameras, sensors, and can send or receive data to and from these "things," respectively.

FEs can also be nodes residing in other important buildings or departments such as firefighting departments, hospitals, police departments, etc. Furthermore, FEs may be basic IoT devices such as sensors, cameras, actuators, etc. As such, these FEs may be aware of reported events and locations to which an ambulance, fire truck, police vehicle, etc. may be dispatched. The FEs can collect such information or data and send it to the LFNs to which they have connections with. The Application Layer running on LFNs may interact with the LFNs only and hence may not be aware of the FEs with which the LFNs may be connected. The FEs may appear as "things" to the fog application layer. Note that the FEs may also host their local applications. However, for the use cases discussed herein, the application layer refers to the application layer that is residing above the LFNs. Although the FE can also host applications, the application layer disclosed herein refers to the application layer which runs on the LFNs. Finally, in one embodiment, it is assumed in our architecture that the LFNs alone are the primary providers of the fog service layer and may use data or services from FEs or IoT devices in a manner that is transparent to the applications that use the fog service layer.

As an example only, FIG. 6 shows that LFN 1 is connected to two FEs, 1a and 1b, while LFN 2 is connected to one FE 2a, and LFN 3 connects to FEs 3a and 3b. However, these are just examples that are not intended to limit such connections to the numbers shown. Note that the actual protocol that runs on interfaces between the fog nodes, and between the fog nodes and the cloud, are out of scope of this disclosure.

Figure 7:
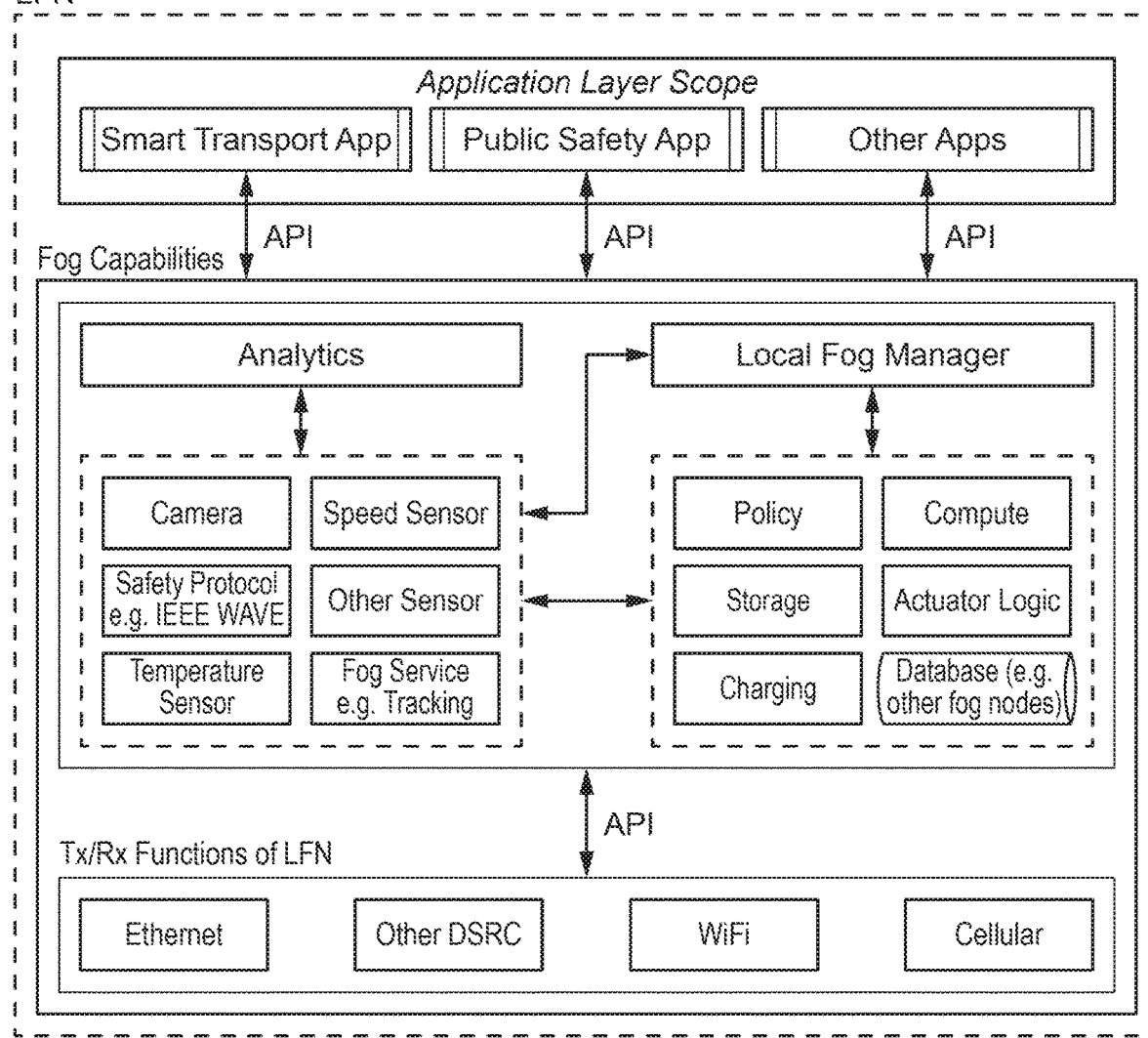
FIG. 7 shows example local fog node capabilities, functions and services.

As shown in the example of FIG. 4, one LFN may have multiple FEs connected to it. Each LFN can have a set of capabilities or services that it supports. FIG. 7 shows an example of these capabilities or functions that may be supported by a LFN. For example, as shown in FIG. 7, the LFN may have one or more of the following functions:

Local Fog Manager (LFM): the part of the LFN that controls and manages all the functions based on policies of the fog service provider. The LFM authorizes service requests from other LFNs or from applications that are running on the LFN. As such, the LFM oversees all the resources of the fog node and manages how services can be provided to applications or other FEs, LFNs and the cloud.

Analytics: the LFN may have an analytics capability or function that can perform data analytics using data from sources controlled by the LFN (e.g., cameras, sensors, etc.) or it can perform analytics on data received from other FEs or LFNs or the cloud.

Camera: the LFN or FE can have a few or numerous cameras that are connected to it, either directly or indirectly via another logical node. The camera function represents all the cameras that feed data (e.g. images or video) into the LFN. As such, the "Camera" function shown above may represent a method (e.g. protocol or software) by which the LFN controls the camera or the actual data (images or video) from the camera. Moreover, the camera function may also contain an entity (e.g. software) that can process raw data or can perform image processing, or can process images that have been potentially processed at each physical camera.

Sensor: the LFN may also have numerous sensors connected to it, and these sensors may send data over a wired or wireless means. The sensors can be speed sensors, temperature sensors, humidity sensors, or any type of sensor. The sensors can use a variety of protocols to send data (e.g. CoAP, HTTP, etc.). The LFN may also have a protocol processing function that is able to receive and process messages that are sent using different protocols.

Protocol Processing: the LFN may implement several protocols acting as clients or servers or both. For example, the LFN may be able to process CoAP, HTTP or other protocols accordingly. The LFN can also support other driving safety protocols making it able to receive and process messages that indicate the occurrence of a crash, or sudden stop, or road hazard notifications, etc. Note the Protocol Processing function is a generic name for any function that implements any protocol (e.g. CoAP, HTTP, IEEE WAVE), protocol messages and other application safety messages. There may be several Protocol Processing functions in a LFN to support a variety of protocol message processing. Although FIG. 7 shows only one materialization of the Protocol Processing function in the form of "Safety Protocol, e.g. IEEE WAVE," this does not mean that only this protocol is supported by a LFN.

Other Fog Services: the LFNs may support other native services that can be requested or consumed by verticals or other LFNs, FEs, or the cloud. For example, the LFN can support a Tracking Service that is used to track a vehicle or a person using several methods such as image tracking, tracking with wireless technology, etc. The LFN can support a multitude of such native services.

Actuator logic/control: every fog node may have actuator logic to control the operation of mechanical objects such as gates (e.g., in garages), camera orientation, switching traffic lights, etc.

Fog resources: each LFN may have compute and storage resources and databases.

Charging: the fog nodes may generate and maintain charging records for services that they provide to verticals or other fog nodes. For example, the fog nodes charge for storage usage by applications, or analytics, or tracking services, etc.

Policy: each fog node may have a policy function that contains the necessary policies to authorize and provide a service to vertical or other fog nodes according to service layer agreements (SLAs). For example, the policies may describe the allowed compute, storage and analytics resources that can be provided to applications that run on top of the fog nodes. Also, the policy can contain details about what type of services that are allowed to be provided to other fog nodes or vertical applications. For example, the policy function may contain a Fog Service Description for an application that might request to use the fog's tracking service. The description may indicate if tracking should be done using visuals, or wireless sensing, or both, the location where this is possible, privacy issues related to the subject being tracked (e.g. images of people detected in an area can be provided to a public safety department with blurred faces), etc. Other Fog Service Descriptions can indicate the number of requests that can be processed, whether or not the service can be outsourced or obtained from other LFNs, etc. The policy may also contains a list of application ID that are allowed to be hosted on the LFN.

Database: the LFN may have database support for its local use or for use by verticals. It can provide database services, or it can use the database to save information about neighboring LFNs, their supported services, the location where these services are supported, etc.

Communication: every fog node may support several communication protocols or transmit (Tx) and receive (Rx) operations using different media and protocol. For example, a LFN may support Ethernet connections (e.g. with smart camera or other FEs), or a set of wireless technologies such as WiFi, Cellular, Bluetooth, etc. Note that the Tx/Rx function may be an access point that is not physically located with the LFN. For example, a LFN can be connected, using a wired connection, to RSUs that are deployed on the streets in the fog area. These access points may receive messages (e.g. WAVE) containing safety application messages and may send them to the LFN for the WAVE Protocol Processing function to process it accordingly. Similarly, the LFN can take local decisions, optionally after processing data received from cameras, sensors, etc., and decide to transmit a message to all the vehicles in an area. Note that the Tx/Rx function, optionally using specific technologies such as WiFi and Cellular may be provided as a service to the applications running on the LFN.

Other Function: the LFN can also provide a router and/or gateway function for devices that connect to it. As such, the LFN can support the necessary IP protocols to support router functions or other related protocols such as neighbor discovery, such as DHCP, DNS, etc.

Note that the functions described above are logical functions that can reside in LFNs as shown in FIG. 7 or they can be logical functions that reside in "things" such as cameras, sensors, or other FEs. As such, FIG. 7 is an example to demonstrate how fog nodes can extract and share data and is not meant to limit the placement of these functions in particular physical nodes. Therefore, the camera function may be implemented on individual cameras and the LFN can interact with the cameras to get image and video data. Also, the camera function can be seen as a fog node or FE by itself.

APIs may be used for communication between one or more of the functions or capabilities shown above. For example, a traffic assessment function or service that may be local to the LFN (e.g., it is not in the scope of the application layer running on top of the fog) may use data from speed sensors, cameras, and safety protocol processing function to determine traffic conditions. As such, this service (although not shown in FIG. 7) may request data from these sources (e.g., camera, sensor, and safety protocol processing functions) using APIs. Additionally or alternatively, these functions can interact using a well-defined interface with well defined procedures.

The LFN may also host applications or provide the environment and resources for applications and verticals to run on the LFN. The applications, generally referred to as the application layer, runs on top of the fog capabilities or services described above, and that uses these services or capabilities of the LFN. The application layer may host numerous applications that use APIs to get raw or processed data from the LFN, or alternatively from "things" that are under the control of a LFN. For example, an application for the Police department may request image data from particular streets when needed. The LFN gets the data from the camera function (or alternatively from the camera(s) deployed in the identified street or addresses), which may be raw or processed images or video. The LFN then forwards the data to the application if authorized to get such data. As another example, a smart transport application residing on the LFN may request traffic information in particular streets of an area. The request may also contain a Fog Service Description indicating how this traffic information should be provided, for example using speed sensors only that compute average vehicle speed, or using video processing, or both. If authorized, the LFN may get data from cameras and speed sensors deployed in the indicated area(s), process the data accordingly and then forward the data to the application. Note that processing data may be done by the LFN which may have functions that do so, or it may be done by the "things" themselves. For example, cameras may have fog capabilities that allow them to process images. Additionally or alternatively, cameras may forward image and video data to the camera function in the LFN which then processes this raw data and forwards it to the application layer or to other LFNs if needed.

Management procedures that may be run between fog nodes, or between fogs and the cloud. Management procedures are related to the operations of fog nodes and hence the service layer. These procedures may not necessarily be providing a service in the sense that they do not operate on actual data or share it. These procedures may be seen to be the "control plane" of fog operations. Moreover, some of these procedures may be necessary before the actual service is provided and others may be used to verify the availability of fog nodes after key initial management procedures are executed. There are three example procedures under management, namely, Fog Capability Discovery, Fog Connection Verification, and Fog Capability Status Report. The following is a brief description of the example procedures:

(1) Fog Capability Discovery: this procedure may enable fog nodes and the cloud to discover capabilities of each other. Some example capabilities may include compute, storage, analytics, and different types of IoT devices and their current locations, and/or capability/constraints on supporting application instantiation (e.g. certain types of applications cannot be instantiated at some fog nodes). Other capabilities may be services that are natively provided by fog nodes such as tracking, transmit and receive function via different access technologies, processing and reacting to safety application messages sent via IEEE WAVE, etc. Discovery may thus become a pre-requisite for service provisioning both across fog nodes and towards applications which can then request data and services related to specific geographical locations or service points (e.g. buildings, vehicles, etc.).

(2) Fog Connection Verification: this procedure may allow fog nodes to periodically verify their mutual availability. Once verified, the fog nodes can use the verified connection to request, chain, and share fog services so that a horizontal fog service layer is maintained.

(3) Fog Capability Status Report: this procedure may be used by fog nodes to report to other fog nodes or the cloud about changes in the status of their capabilities, where the capabilities are any of the examples defined above. The report may follow an explicit or implicit event subscription.

Before a fog capability discovery procedure is run, it may be assumed that the LFNs, FEs, and the cloud have discovered each other. As part of the discovery procedure, the LFNs may know the addresses of other neighboring LFNs. Note that the fog-to-fog (F2F) interface (I/F) or the fog-to-cloud (F2C) I/F may be wired or wireless. The address of a LFN may include both a layer-two (L2) address and/or an IP address.

It may be assumed that before a LFN discovers the capabilities of other LFNs, the LFN in question knows its own capabilities and the FEs that are connected with it and their capabilities as well. For example, the LFN may know the number of cameras installed per street, the capabilities of each camera such as: support for static images, video streams, face detection algorithm, infra-red capability, heat detection, etc. Note also that some of these functions may be implemented in the LFN or in the cameras. The LFN may also know the location of these "things" and hence capabilities, the identity of the "things," the availability of data from these functions, etc.

Figure 8:
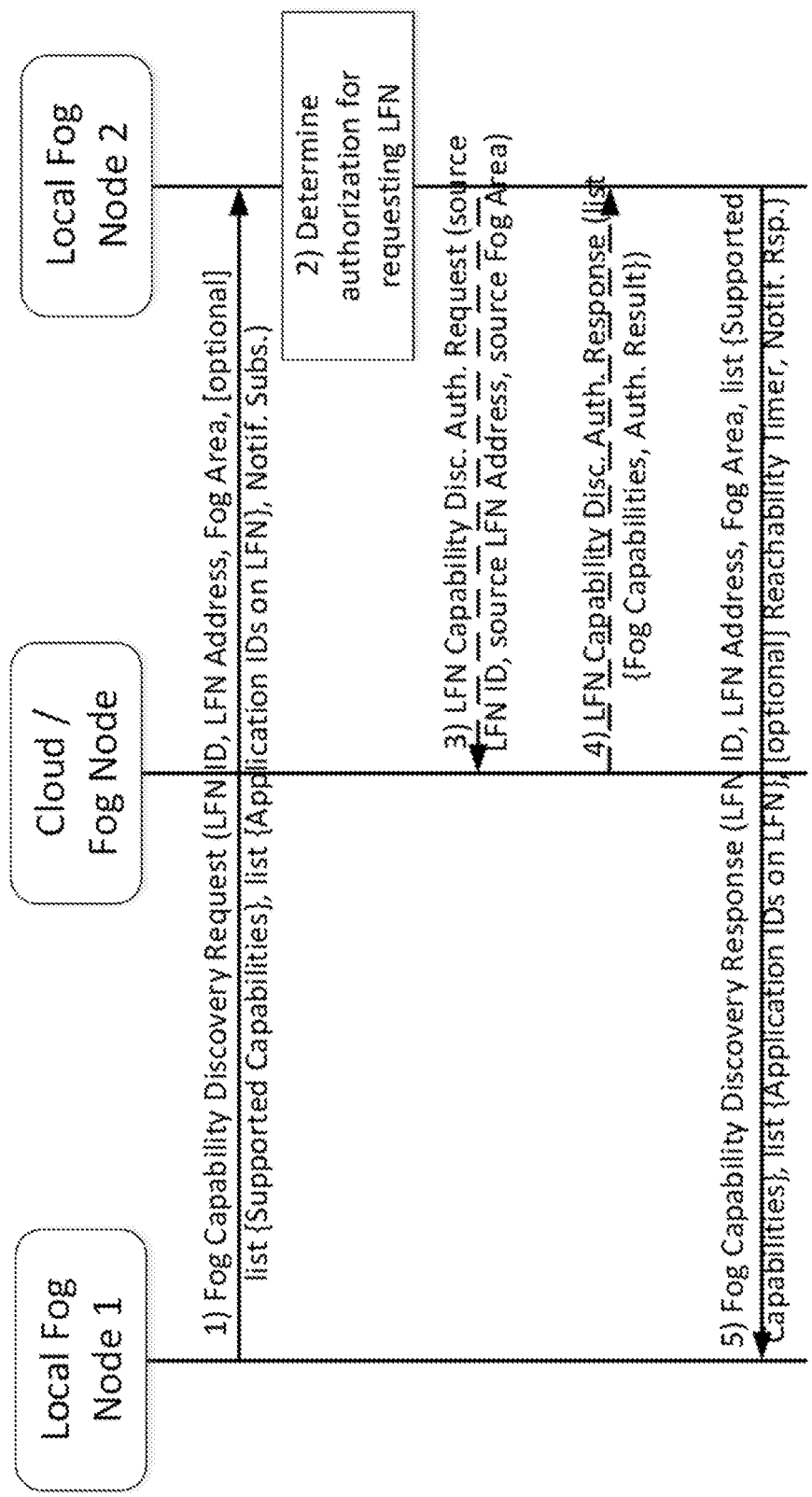
FIG. 8 shows an example procedure for fog capability discovery.

In order to discover the capabilities in neighboring fog nodes, a LFN may send a Fog Capability Discovery Request message to a target neighbor LFN whose address is known. In this message, the source LFN may indicate the following parameters in the message: the LFN ID, the LFN address, the fog area covered by this LFN, the list of capabilities or services in the LFN, the list of applications each identified by a unique Application ID (e.g. an ID that represents YouTube, etc.) that are currently instantiated and running on this LFN. The target, for example the recipient LFN, may authorize the capability discovery request and responds with a Fog Capability Discovery Response message indicating the set of capabilities or services that are supported by that LFN. The response may also include: the LFN ID, the LFN address, the fog area covered by this LFN, the list of capabilities or services in the LFN, the list of applications and their corresponding unique Application ID that are currently instantiated and running on this LFN. After this procedure, both LFNs may update their local information about the neighbor LFN to include the LFN whose services have been discovered and the address information, etc. FIG. 8 shows example steps involved for the fog capability discovery procedure.

In step 1, LFN 1 (source LFN) sends a Fog Capability Discovery Request to LFN 2 (target LFN) whose address may already be known by LFN 1. The message may include the following information related to the source LFN: the LFN ID, LFN Address (e.g. IP address, or an L2 address, or both), the Fog Area indicating the area that the source LFN is servicing, (optionally) the list of supported capabilities in the source LFN, and the list of applications that are currently running on the source LFN.

Note: the Supported Capabilities information element that is included in the messages above may represent a detailed list of the supported services and "things" that are available to provide data, and their location of deployment. Examples of the list of capabilities are those that were previously described in the previous section, such as a camera function, speed sensors, analytics, memory available to neighbor LFNs, specific protocol processing functions (e.g. an LFN may indicate it supports safety application protocols or WAVE messaging), access technologies for Tx/Rx functions, other native services such as tracking services, etc. For each of these capabilities, the LFN may include a detailed list of Fog Service Description to detail the exact type of data or service that can be delivered by the LFN. As an example, for illustrative purposes only, consider the camera function previously described. The Supported Capabilities for this function can include the following:

Name: this indicates name of this function (e.g. "camera").

The location where each camera is deployed under the fog area covered by the LFN. The address may be, for example, a geographical location, or in the form of coordinates, or a street address with a postal code.

The type of data that each camera can provide (e.g. images, video, infrared imagery) and the type of processing that can be done to camera data (e.g. face detection, license plate recognition, etc.).

Whether each camera is fixed or can be panned, zoomed, or tilted (PTZ). If fixed, the direction that the camera points to (e.g. North, South, etc.) or the angle of tilt for this camera, etc.

As another example, the supported capabilities information element related to speed sensors may include any of the following:

Name: this indicates name of this function, for example "speed sensor"

The location where each sensor is deployed under the fog area covered by the LFN. The address may be a geographical location, or in the form of coordinates, or a street address with a postal code.

The method by which speed can be computed, for example the average speed over a certain time window, the periodicity that the average speed can be computed, a history of average speed information, the maximum past time for which computations of previous average speed can be maintained, the units of speed that can be provided such as Km/hr, Miles/hr, etc.

A fog node may implicitly subscribe for notifications regarding the status of particular services or "things" during the fog capability discovery procedure. This implicit subscription is done by including a Notification Subscription (Notif. Subs.) indication in the Fog Capability Request message. The Fog Capability Discovery Response message may also include the result of this implicit subscription, namely a Notification Response (Notif. Rsp.) indicating whether the subscription was accepted. For example, a Service/Thing Notification Indication information element may be included in the Fog Capability Discovery Request message. This indicates to the target LFN that a status notification should be sent whenever the status of a particular service/capability/thing changes in the target LFN. For example, if a camera under the control of the target LFN stops working, and the target LFN is aware of this, then the target LFN checks for all the source LFNs that have asked for such notification. For each LFN that implicitly subscribed to such notification, as described above, the target LFN can send a notification message indicating the following:

The name of the service or capability or function being affected, for example speed estimation service.

The location per service for which this notification is being sent

The list of "things" for example speed sensors, cameras, etc., whose status has changed. Note that the same notification procedure can be used to indicate that a service or thing is available or not available.

The location per "thing" for which this notification is being sent. For example, if three cameras have stopped working in different locations, then each identified camera (or "thing" in general) may be associated with an operation status and a location.

In one embodiment, each capability or service or function may have information unique to it. For example, the tilt of a camera is a specific information to cameras that may not be applicable to speed sensors. As such, what is important to note that the information discovered provides a detailed description of the "things" that are deployed, their locations, the type of data that can be extracted from them, the type of processing that can be done to the data, etc. Also note that whether processing of this data is done in the LFN or at the "thing" (and hence FE) itself is not relevant as the data may come from the LFN that connects and controls these sources of data (i.e. the "things"). This information may also include a summary of supported services, data sources, or IoT devices. For example, in addition to (or instead of) indicating the details of each camera source, the LFN may also include information about the maximum number of cameras supported or other IoT devices that are connected to the LFN.

In step 2, upon receiving the discovery request message, the target LFN verifies if the source LFN is authorized to be provided with the supported capabilities of the target LFN. Each LFN, and hence the target LFN (i.e. LFN 2) in this case, may contain policies that indicate which neighbor LFN, represented by an LFN ID, is authorized to get this information. If this information is available, the target LFN determines if the source LFN is authorized to discover the capabilities of the target LFN. The target LFN may also store the supported services in the source LFN.

In step 3, if the target LFN does not have the authorization information for the source LFN, the target LFN may then contact the cloud node to request authorization for the source LFN. The target LFN sends a Fog Capability Discovery Authorization Request message to the cloud. The message includes the LFN ID of the source LFN, its fog area, and its LFN address.

In step 4, the cloud may determine the authorization using its local policies and information and responds with the Fog Capability Discovery Authorization Response message indicating the result of the authorization.

In step 5, the target LFN may store the authorization result for the source LFN locally. The target LFN may then send a Fog Capability Discovery Response message to the source LFN. The message indicates the following information related to the target LFN (i.e. LFN 2): the LFN ID, LFN Address (e.g. IP address, or an L2 address, or both), the Fog Area indicating the area that the target LFN is servicing, (optionally) the list of supported (and hence authorized) capabilities in the target LFN, and the list of applications that are currently running on the target LFN, and a Reachability Timer. These information elements, except the reachability timer, have been described above. The Reachability Timer indicates the periodicity that can be used by the source LFN to send a message for the purpose of determining whether the target LFN is still reachable as may be presented next. The source LFN stores the supported services in the target LFN.

If the source LFN (i.e. LFN 1) also implicitly subscribed to be notified about the status of the target LFN's services and/or "things," then the target LFN may also save this information so that when a change occurs to a particular capability or service or thing under the target LFN, a notification may be sent to all the source LFNs that subscribed for this notification.

Although not shown in the steps above, the target LFN (i.e. LFN 2) may also acknowledge the implicit subscription to the target LFN capabilities as described herein. For example, the target LFN may include a Service/Thing Notification Acknowledge information element to acknowledge the processed subscription. In turn, the target LFN can also implicitly subscribe to similar notifications from the source LFN by also including a separate Service/Thing Notification Indication information element in the Fog Capability Discovery Response message. The source LFN may not need to acknowledge this implicit subscription. However, the source LFN saves this information and notifies the target LFN when a change occurs with the status of its supported capabilities.

In order to maintain the availability of the fog service layer, which is dependent on sharing data across fog nodes, and across fog nodes and the cloud, the fog nodes may need to periodically verify their mutual connections. A procedure is therefore proposed herein by which fog nodes perform a simple "heart beat" or request-response handshake that indicates the availability of a neighbor fog node. It is important to note that this procedure may not indicate the availability of particular services or the availability of data from certain "things," but rather it may only inform the fog nodes that a control logic, or the Local Fog Manager, of each fog node is reachable. Based on this verification, the fog nodes determine the reachability and availability of neighbor LFNs, and continue to communicate with each other to provide a fog service layer.

Figure 9:
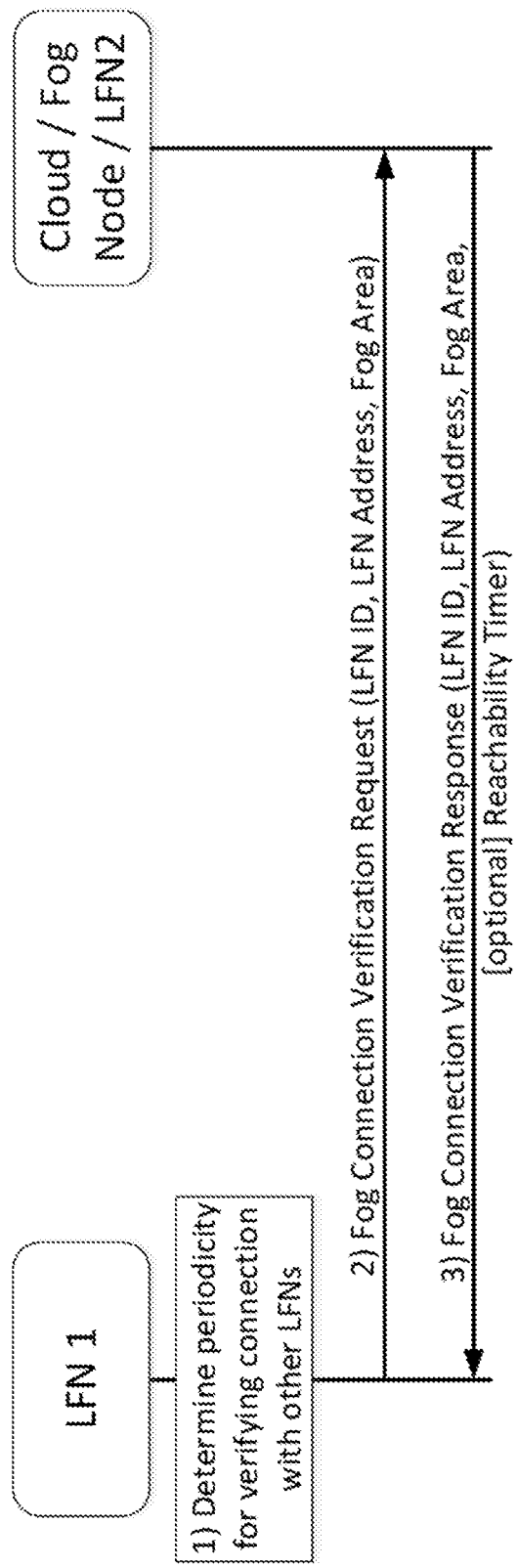
FIG. 9 shows an example procedure for fog connection verification.

Each LFN may be configured to send a Fog Connection Verification Request message to every neighbor LFN. The procedure may be initiated periodically and the LFN may be configured with the periodicity of this procedure. The cloud node or any fog node that is a level higher than a LFN may configure the LFN with this information. Alternatively, the fog nodes that executes the fog capability discovery procedure (described earlier) may take the role of the entity that starts this procedure. Note that a fog node, although it did not initiate the fog capability discovery procedure, may also be configured with a timer such that if no message is received from a source fog node then the fog node in question can still send a message to verify the availability of a source fog node that actually had previously initiated the fog discovery procedure. The periodicity of the procedure may be pre-defined or pre-configured in the LFNs. Optionally, the response of the capability discovery procedure (described earlier) may contain a suggested periodicity by a target LFN to which a source LFN sent the Fog Capability Discovery Request message. This was previously proposed as a Reachability Timer information element that the target LFN includes in the Fog Capability Discovery Response message. An LFN determines the periodicity for sending fog connection verification messages using any of options described above and then sends the message to a target LFN. An example procedure for fog connection verification is shown in FIG. 9. Note that the periodic timer (whether configured or based upon the Reachability Timer information element) may be reset when a response is received from a target fog node for which a verification of connection is being executed.

Note that the procedure shown in FIG. 9 can be run between LFNs, or between a LFN and a fog node at a different level, or between a LFN and the cloud. Note that each LFN may run this procedure with its neighbor LFNs.

In step 1, the LFN determines the time or periodicity to start the connection verification procedure using any of the methods described herein. The LFN may have a timer that guards the start time of this procedure, and upon whose expiry the LFN may send the message described in Step 2 below. Note that this message may also include information about LFN 1's resource usage or availabilities. For example, LFN 1 can include information about a few important resources such as memory, CPU, battery, load level, etc.

In step 2, the LFN sends a Fog Connection Verification Request message to a target cloud, fog node, or neighbor LFN. Note that this message may be sent in a broadcast manner or to a set of nodes that form a particular fog group. The LFNs may contain such broadcast or group information that they may use. The responses (i.e. the message described in Step 3 below) may be sent in a unicast manner.

In step 3, the target node receives the message and updates the reachability of the source fog node indicating that it is still reachable. The target node responds with a Fog Connection Verification Response message to the source node. The target node may suggest a different value for a Reachability Timer. The source node updates the reachability for this target LFN accordingly and if provided with a new Reachability Timer value, the source node updates the periodicity for this procedure using this value. Note that this message may also include information about LFN 1's resource usage or availabilities. For example, LFN 1 can include information about a few important resources such as memory, CPU, battery, load level, etc.

An example procedure for reporting the status of at least one service (e.g. tracking service, or infrared imagery of a camera service, etc.) provided by a LFN or for reporting the status of at least one "thing" (e.g. camera, speed sensor, light sensor, etc.) is described herein. The location of the service or "thing" in question is also included, for example, if a camera is reported to have stopped working, then the location of the camera should also be reported so that the node receiving this notification can understand precisely how the fog services may be affected. Note that reporting status may mean a service or "thing" is no longer available, or a service or "thing" is now available, or a new service was added, etc. Other statuses can also be defined accordingly.

Figure 10:
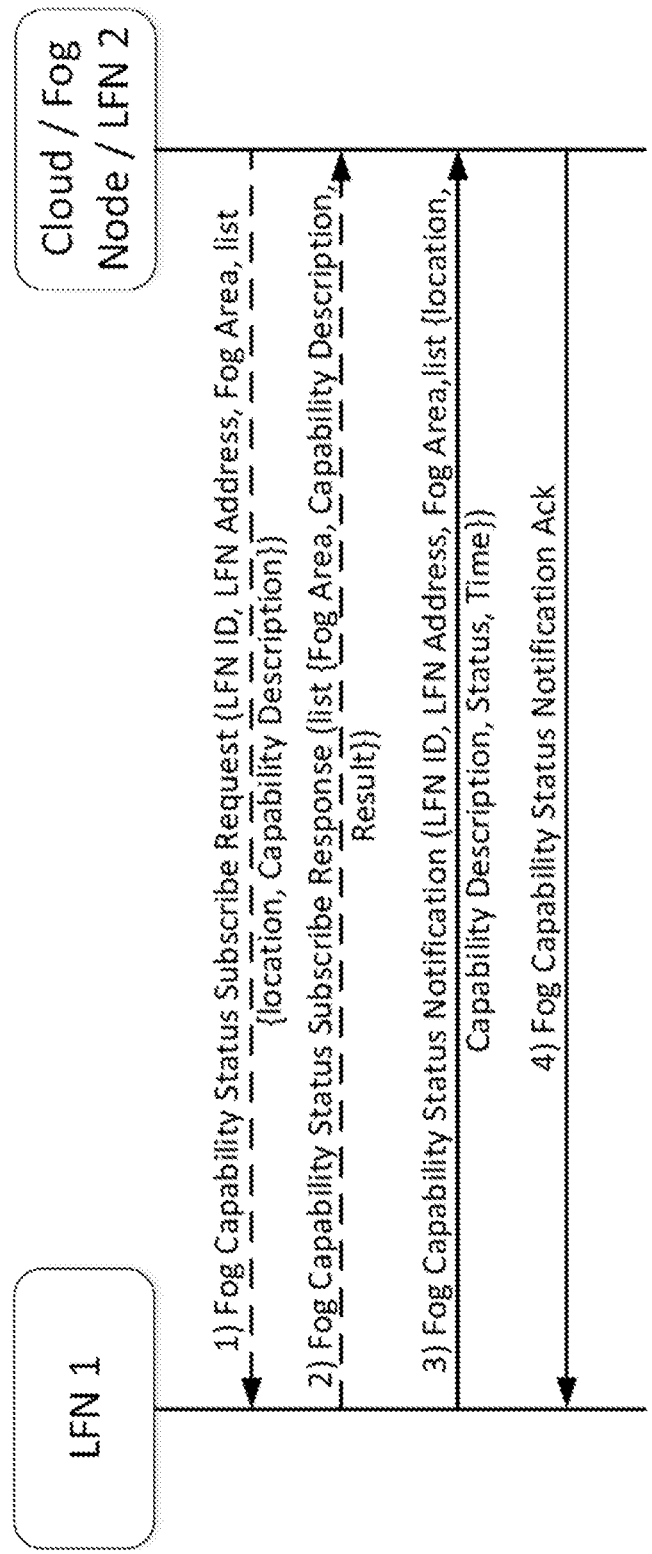
FIG. 10 shows an example procedure for fog capability status notification.

FIG. 10 shows an example procedure for reporting the status of at least one fog capability to other LFNs, a fog node, or the cloud. Note that although an implicit subscription for notification has been described, it is also possible that a LFN, fog node, or cloud, can explicitly subscribe for notifications.

In step 1, a cloud node, fog node, or LFN may explicitly subscribe to be notified about the status of certain fog capabilities. To do so, the node may send a Fog Capability Status Subscribe Request in which it indicates the location and the capability description associated with that location. As such, the fog node can include a list of services, associated with a location, for which notifications are desired. The Capability Description describes the specific service or "thing" for which a notification is desired. The LFN ID, LFN Address and Fog Area are associated with LFN 2.

In step 2, although not shown, the recipient LFN authorizes the request using local policies. The recipient LFN, in this case LFN 1, sends a Fog Capability Status Subscribe Response message which includes the result for each of the listed capability description. The LFN ID, LFN Address and Fog Area are associated with LFN 1.

In step 3, the LFN may have received implicit or explicit subscription for notification about status of its capabilities in certain locations. Upon detection of a change in the status of a service (e.g. Tracking Service), or of a "thing" (e.g. a camera stopped or resumed its functions), the source LFN (LFN 1) sends a Fog Capability Status Notification to the target LFNs that have subscribed to this notification. The message may include the details of which service this notification is associated to, the location, the actual status and the time this status changed occurred. Note again that different values for the status may be defined (e.g. "working," "not working," "on," "off;" etc.).

In step 4, the target LFN (LFN 2, cloud, or fog node) receives the message and processes it to determine the affected services and locations. The LFN may have applications running on it, or other FEs connected to it, that were using any of the affected services. The LFN then notifies all the applications or other FEs about the updated status of the capability and the location. The target LFN sends a Fog Capability Status Notification Ack message to acknowledge the report. Note that the reception of this message may optionally reset the Reachability Timer.

Note that at LFN 1, there could be applications running on the LFN that were previously using any of these capabilities whose statuses have changed. Moreover, the applications may have used APIs to subscribe to notifications when the status of the capabilities or services at particular locations change. As such, the LFN may also use an API to indicate to the application(s) which capabilities have had status changes, their location, the actual status, and the time of the status change.

Following capability discovery procedures, fog nodes can then interact with each other to get particular services. For example, a fog node may use data from cameras and sensors that are under its control. This information may be processed to determine the traffic load which may then be provided to an application (e.g. smart transport) running on the fog node, or to a public safety application such as ambulance services for detecting and selecting the route with the shortest time to a destination. Another type of service that fog nodes can provide is data sharing between them. For example, an application may require data about the availability of parking spots in a particular destination which is under the control of another LFN. The source LFN which hosts the application may be triggered to get this service from the target LFN. The target LFN may monitor the availability of parking spots and provide that information back to the source LFN, which in turn provides it to the application. Another example of a public safety transport application is one that requests a fog node to use its Tx/Rx functions to first receive safety application messages, determine the occurrence of a crash and then report this or similar incidents to the safety application or department. Furthermore, the fog node may broadcast a message to notify other vehicles about the incident and the location. The vehicle may then decide to use other routes and help with less congestion for public safety vehicles to attend the scene. Moreover, the fog nodes can share this information with neighbor fog nodes so that vehicles are proactive in choosing different routes ahead of entering the fog area under which an accident occurred. Other examples and solutions for certain use cases are discussed herein. However, it is important to note that the solutions for fog computing presented herein are not limited to the use case of smart transport only. Instead, this application is just an example to show the benefit of fogs and the proposed procedures can be application to all use cases as they focus on the interactions between fog nodes to extract, share and analyze data on a real time basis. Some example fog procedures are discussed below:

(1) Procedures for Fog Service Provisioning: these are procedures that are executed between fog nodes for the purpose of providing services to one another based on prior discovery of fog capabilities. Although these procedures may be triggered by the application layer, the procedures focus on fog interactions for making available services horizontally across and in the fogs. Once a service reaches a fog node, the service or data may also be provided to verticals if needed, or may be consumed natively by the fog node itself.

(a) Fog Service Request procedure: defines the procedure by which a fog node includes a detailed Fog Service Description (FSD) that is submitted to another fog node. The target fog node uses the FSD to fetch edge data from specified locations (or the FEs in these locations), process it according to the FSD and send it to the source fog node.

(b) Fog Service Recommendation procedure: allows fog nodes to suggest parameters for an overall enhanced operation of the set of fog nodes that form a fog service layer. For example, specific messages may be broadcast across a series of fog nodes to control the speed of self-driving cars in order to maintain a constant flow of traffic in the areas controlled by these fog nodes.

(2) Procedures related to Fog Services for Applications: these are procedures that have tighter interactions with the application layer that in turn uses the fog service layer to dynamically activate or relocate its services horizontally across fog areas.

(a) Fog Application Instantiation: this procedure may allow applications to dynamically instantiate instances of the same application on other fog nodes based on user mobility and other information that is tracked by the application layer. This enables reduced costs for application providers who would only pay for fog resources when needed (e.g., applications are instantiated, and hence use fog resources, only when users need them).

(b) Fog Application User Context Relocation: this procedure may follow the instantiation procedure, or at least assumes an application instance is already running on a target fog node into whose area a user is moving. The application may then use the fog service layer to transfer the user context onto the target application instance on the target fog node. The target application instance may then continue to serve the user hence enabling ubiquitous and seamless service availability during mobility.

(c) Fog Service for Application Preparation based on Predicted Mobility Pattern: is a procedure that enables the application layer to instantiate (if need be) applications in few fog nodes ahead of a predicted mobility pattern. Moreover, the fog service layer enables the sharing of vital user information that enables these instances in the corresponding fog nodes to prepare (e.g. buffer video data) a service ahead of the user's mobility into the area. Once in the area of a new fog node, the application may simply forward the data to the user instead of having to wait for the user to request the service. Thus, the fog service layer enables a proactive service availability approach that avoids a service to be interrupted due to user mobility.

The Fog Service Request Procedure is used between fog nodes, or between a fog node and cloud, to request a particular service. A service may be data from cameras, sensors, etc., and the data may be raw or processed data. The service may also be related to analytics, for example a fog node may have previously discovered that a particular neighbor fog node supports a specific analytics solution. The fog node may then execute this service request procedure to request this service. If accepted, the fog node may forward data to the target LFN which then performs analytics on the data and sends the results back. Other types of services may include requesting a target LFN to provide traffic information which may be based on speed sensor readings, image processing, processing of WAVE messages, etc. A single service request procedure may list more than one service identified by a Request ID. The service may also be associated with an address that the source LFN desires the data or service to be sent to. This address may include an IP address, port number, layer 2 address, an application layer identity, etc. The requesting LFN may also indicate the protocol and/or transport to use for the service, such as SIP over UDP, etc.

In one aspect, an example method may comprise receiving, from an application, a request to provide a service, wherein the request to provide the service comprises location information associated with the service; determining, based on the location information associated with the service, that a second local fog node is configured to provide the service; sending, to the second local fog node, an indication of the request to provide the service; receiving, from the second local fog node and based on the indication of the request to provide the service, a service result; sending, to the application, the service result; and updating information stored at the first local fog node to indicate that the second local fog node is configured to provide the service.

The request to provide the service may further comprise one or more of an identifier associated with the application and an identifier associated with the request to perform the service. The indication of the request to provide the service may comprise one or more of an identifier associated with the first local fog node, an identifier of a fog area associated with the first local fog node, the identifier associated with the application and the identifier associated with the request to perform the service. The updated information stored at the first local fog node may comprise one or more of an identifier associated with the second local fog node and the identifier associated with the request to perform the service.

The method may further comprise determining, prior to sending the indication of the request to provide the service, whether one or more policies stored at the first local fog node indicate that the application is authorized to receive the service. The second local fog node, prior to sending the service result, may determine whether one or more policies stored at the second local fog node indicate that the first local fog node is authorized to receive the service result. The second local fog node may be configured to send, to a cloud node and in response to determining that there are not one or more policies stored at the second local fog node that indicate that the first local fog node is authorized to receive the service result, a request to authorize the first local fog node to receive the service result.

Figure 11A:
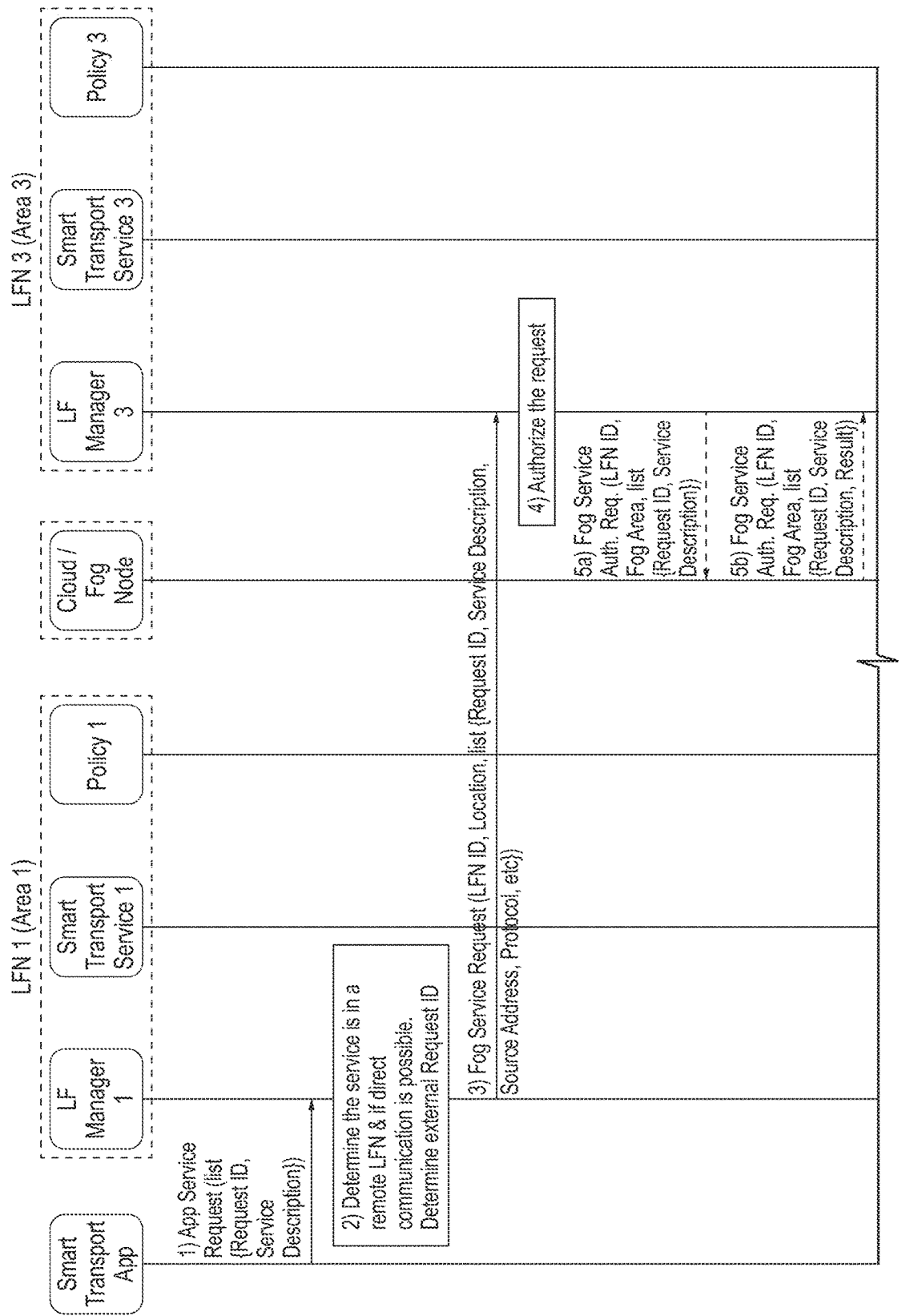
FIGS. 11A-C shows an example procedure for a fog service request.
Figure 11B:
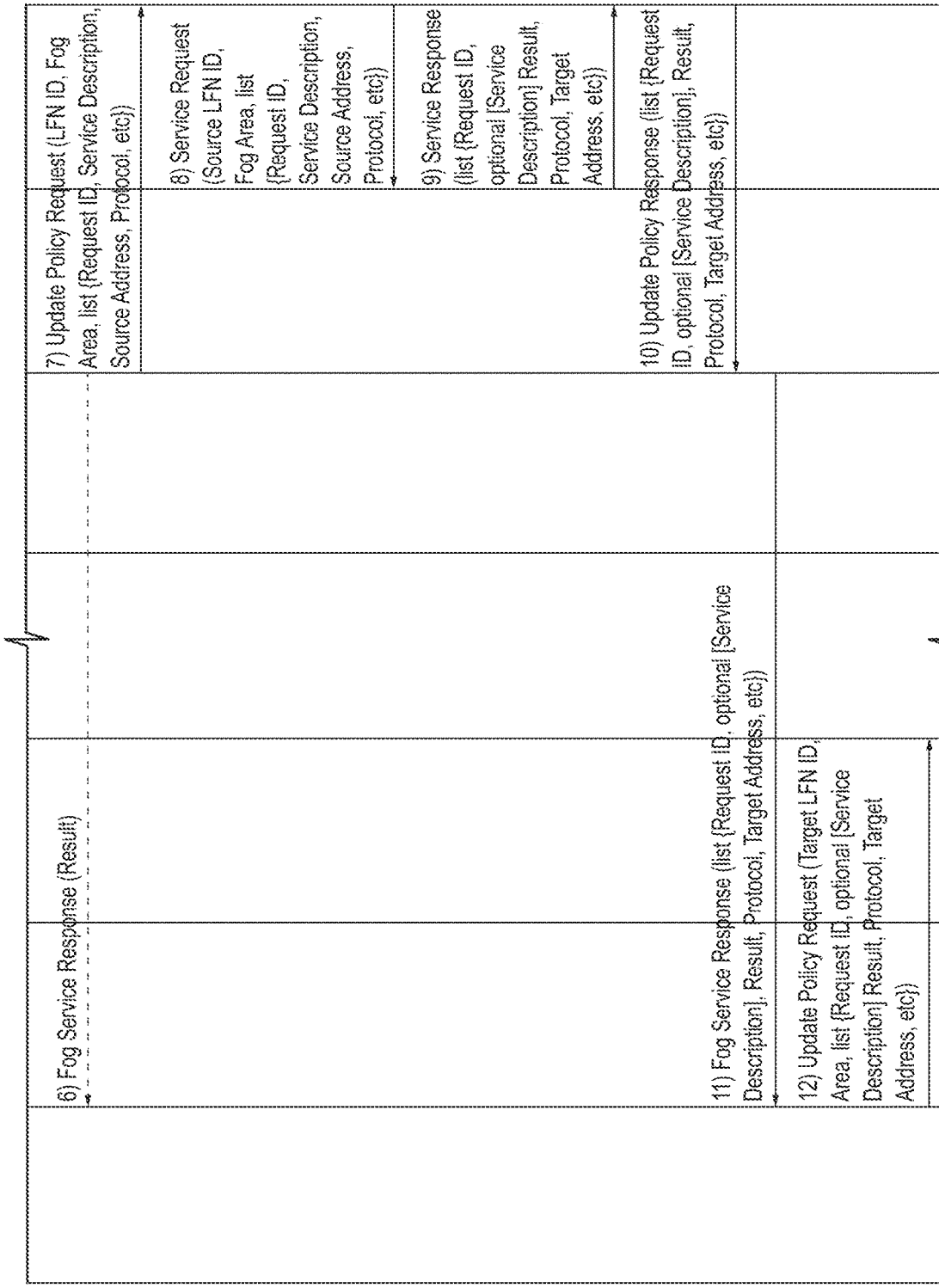
Figure 11C:
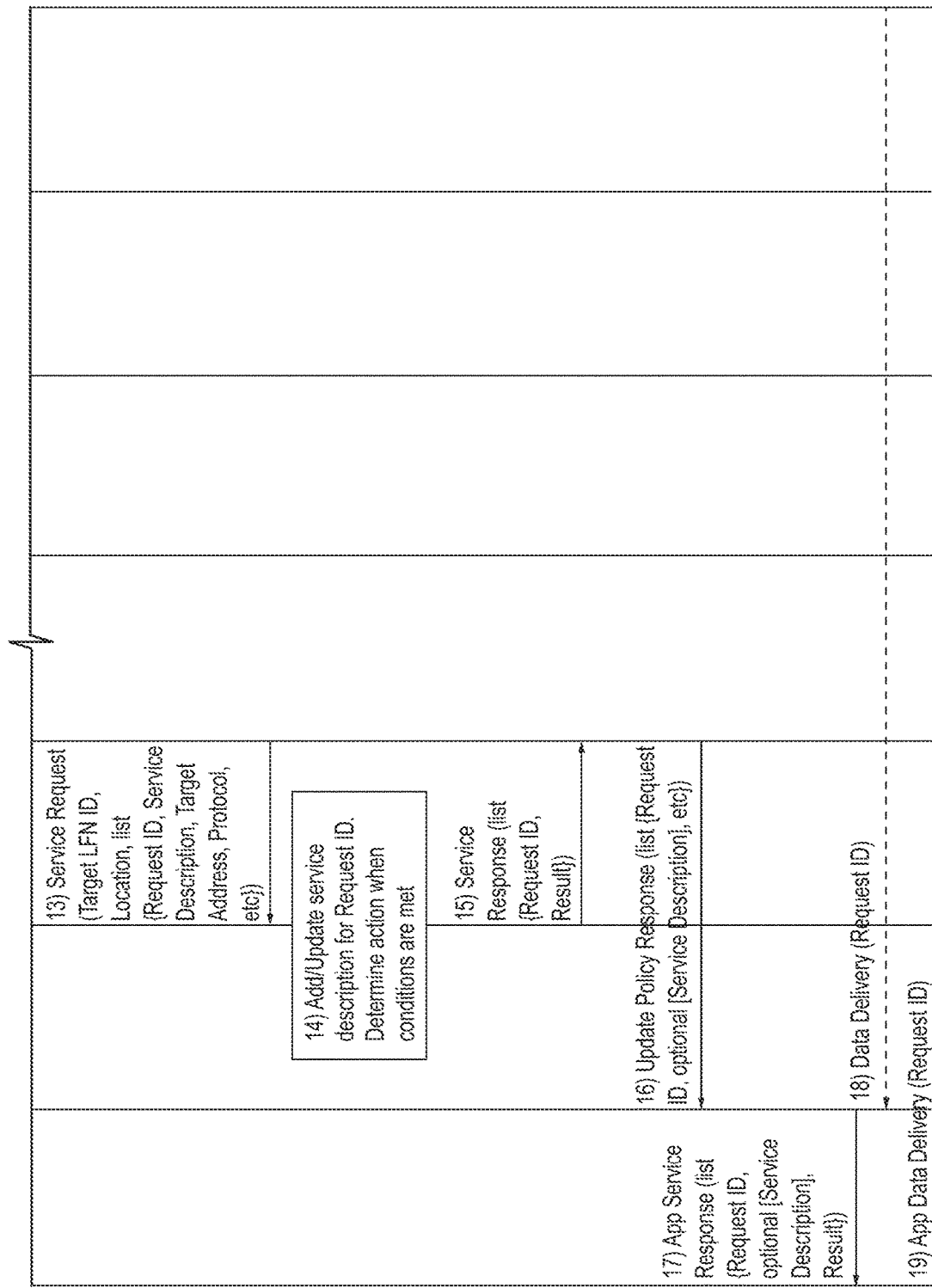

Example interactions between functions within a LFN, and between a source and target LFN to provide a service is shown in FIG. 11. Note again that the functions within a LFN may actually be logical functions that are not residing in the LFN and this example shows that a Smart Transport Service (STS) is hosted in the LFN is for an example only. The STS represents a service that provides information about traffic such as, but not limited to, video streams of traffic in particular streets, traffic description using speed sensors and images and possibly safety application messages, traffic predictions, etc. The call flow shows the procedure without getting into how the actual traffic data or information is computed by the STS. It may be assumed that LFN 1 with a STS called STS 1 has previously discovered the support of a STS capability or service at LFN 3 (called STS 3).

In step 1, an application hosted in the application layer scope of the LFN requests a service using a well-defined API. The application may be related to a smart transport application for self-driving cars. The request may include a list of: Fog Service Description (FSD) and a Request ID. The Fog Service Description contains location information associated to each service. The API request may also include the identity of the application requesting this service. Note that although FIG. 11 shows an application instance running of the fog node that uses APIs to request services from a LFN, the same set of APIs can be used by an application running on a mobile device such as a smart phone or an on-board vehicle device. As such, it is understood that FIG. 11 does not intend to limit the use of such APIs to applications running on the LFNs only and the same APIs apply to any application running on a mobile device that interacts with an LFN.

In step 2, the LFN Manager in LFN 1 processes the request and determines whether the service, based on the location information contained in the FSD, can be provided by LFN 1 or a target LFN. The LFN 1 is assumed to be aware of the LFNs that are responsible to provide services in other locations or fog areas. As such, the LFN Manager 1 determines, based on this local information, that LFN 3 is the target LFN to provide this service. Note that this call flow is showing just one target LFN for simplicity, however, the request may have FSD for several locations which may cause LFN 1 to contact more than one target LFN to provide the service. Although not shown in this step, the LFN 1 may verify its local policies to determine if the particular application (identified with an Application ID) is authorized to get this service. If this information is not available, the LFN 1 may contact the cloud or fog node to authorize this request. The procedure to do so would be similar to 5*a* and 5*b* below although the contents may be different as the message may also include the Application ID so that the cloud can perform service authorization. Moreover, the message name may be different.

In step 3, LFN 1 (i.e. the LF Manager 1) sends a Fog Service Request message to the target LFN, here LFN 3. The source LFN, here LFN 1, may provide its LFN ID, Fog Area, and a list of: Fog Service Description, Request ID, Source Address (representing the address that should be used to deliver the data to the source LFN), the desired protocol to use, etc. Note that "Address" here may mean an IP address, port numbers, Layer 2 address, etc. Although not shown in the figure, this message may also include an Application ID to indicate to the target LFN that the data or service is triggered by, and for to be used by, the specified Application ID.

In step 4, LFN 3 checks its local policies to determine if the source LFN is allowed to get this service, optionally for the indicated Application ID if provided.

In step 5*a*, if LFN 3 does not have this information, then it may contact the cloud or a fog node to authorize the request. LFN 3 sends a Fog Service Authorization Request message to the cloud and indicates the list of FSD and associated Request ID, the source LFN ID and optionally the Application ID if received in the request above.

In step 5*b*, the cloud node performs an authorization check and responds with a Fog Service Authorization Response that includes the result of the authorization for each FSD. This message may also include a cause code to indicate the reason for rejecting any of the FSDs if a particular FSD is not allowed. If a particular FSD is allowed and granted, then the accepted FSD may be different from what is actually requested.

In step 6, LFN 3 verifies the result of the authorization and if none of the FSD is allowed, then LFN 3 sends a Fog Service Response message indicating the result whose value would be set, for example, to "reject," or any other value indicating that the request was not authorized. The message may also include a cause code to describe the reason for rejection. If this step occurs, then the procedure ends.

In step 7, the LF Manager 3 communicates with the Policy function (here Policy 3) to log the incoming request with the details of the FSD, Request ID, source address to use, protocol, etc. This may be done by sending an Update Policy Request message to the Policy function. The Policy function may be considered to be a dispatcher of services to the appropriate functions or services within the LFN. Note that this may be a logical function that can be part of the LFN Manager function too. The call flow simply shows an example of a possible implementation of LFN logic and behavior for this use case.

In step 8, the Policy 3 function analyzes the request and based on the FSD determines the list of target capabilities, or functions or services that are responsible to process this service. It may be assumed that there is only one FSD that is related to a STS service, here STS 3. The policy function contacts the entity (which may be a fog entity by itself) or service or function for STS, here STS 3. The Policy function may send a Service Request message (which can also be implemented as a Fog Service Request message) which may include the identity of the source LFN, the address that should be used for sending the data, the Request ID, the protocol to be used, and the FSD.

In step 9, STS 3 analyzes the request and responds with the list of accepted FSDs, the corresponding protocol to be used, the target address (which is the address of the STS 3 itself), the Request ID, and the result corresponding to each FSD.

In step 10, the Policy function saves the accepted FSD, Request ID, source and target addresses for each Request ID or FSD, the protocol to be used and the result (e.g. accept) of the request as allowed by the STS 3. The Policy function may send an Update Policy Response message to the LFN 3 Manager and forward the result associated with each FSD, Request ID and the corresponding target address from where the data may be sent, the protocol to be used, etc.

In step 11, the LF Manager 3 sends a Fog Service Response to LFN 1 including a list of one or more of the Request ID, FSD, Result, Protocol and the target address from where this service may be sent. At this point both LFN 1 and LFN 3 and the corresponding functions in these LFNs may know both the source and destination addresses for a particular request that is identified by a Request ID and that has an associated FSD and a protocol to be used for service delivery. Note that this step may imply the success of the procedure and therefore means that Step 6 may not have been executed (as it would imply the rejection of the whole procedure).

In step 12, the LF Manager 1 communicates with the Policy function (here Policy 1) to log the pending service from LFN 3 by sending an Update Policy Request message which includes one or more of: a list of Request ID (each associated with a FSD), an associated source and destination address used for each request, and a protocol associated with the FSD.

In step 13, the Policy 1 function analyzes the request and based on the FSD determines the list of target capabilities, or functions or services, that are responsible to process (in this case receive) this service. Here, it is assumed that there is only one FSD that is related to an STS service, here STS 1. The policy function contacts the entity (which may be a fog entity by itself) or service or function for STS, here STS 1. The Policy 1 function sends a Service Request message (which can also be implemented as a Fog Service Request message) and includes at least one of the identity of the target LFN, the fog area, the source and destination addresses for this service, the FSD and associated Request ID and protocol. Note that although not shown, this message may also indicate to the STS 1 that the destination for this data, after received from the LFN 3, is a local application. The Application ID may also be provided in this message for subsequent data delivery (as described in Step 17).

In step 14, the STS 1 function analyzes the service request and adds/updates its local information to now include the indicated services with the details provided in the message (e.g. FSD, addresses used, protocol, etc.).

In step 15, the STS 1 responds with a Service Response message indicating the result associated with each Request ID.

In step 16, the Policy 1 function updates the logs for each Request ID with the indicated result and responds with an Update Policy Response message to the LFN 1 Manager indicating the result associated with each Request ID and FSD, etc.

In step 17, at this point, the LF Manager 1 may be aware of the results of each FSD associated with the request from the application. The LF Manager 1 uses the App Service Response API to inform the application about the result of the initial service request.

In step 18, LFN 3, optionally the STS 3 function of LFN 3, receives data from the "things" or other local capabilities and processes the data according to the FSD for each Request ID. The data may then be delivered to the destination using the associated source and destination addresses, and the selected protocol. The Data Delivery message may be sent which may contain the contents of the data and an associated Request ID.

In step 19, LFN 1, optionally the STS 1 function of LFN 1, receives data for an associated Request ID. The STS 1 may be aware of the destination of this data (e.g., the application running on the fog node). The STS 1 may then forward the data and its associated Request ID to the appropriate application using a well-known App Data Delivery API. The STS 1 may also indicate the fog area and LFN ID from where the data is received. Note that the STS 1 may also do some processing to the data according to the FSD and policies associated with the FSD and potentially SLA agreements associated with the requesting application.

Procedures that can be used to recommend service operations or parameters related to service provisioning are disclosed. This procedure may be used to inform neighbor fog nodes about the chosen operations of one fog node so that the neighbors may consider operation with similar characteristics in order to provide a similar service and quality of experience across the fog deployment area. One example use case that can benefit from this procedure is a fog node with a smart transport service that can detect the traffic conditions and determine an optimal speed for use by self-driving cars under its fog area. However, in order to maintain a constant and even flow of traffic into the area in question, the fog node then sends operational recommendations, in this example a recommended speed, to neighbor fog nodes. In turn, the neighbor fog nodes take this information into account and may fine-tune their operations based on this. For example, the neighbor fog nodes may determine a reduced speed for vehicles entering the area of the source fog node. This enables an even flow of traffic in and out of the fog area that initiated this recommendation. Note again that this procedure is explained with the example of recommending speed for self-driving cars, however, this procedure is not limited to recommending speeds only. Similarly, like previous procedures, a fog node can include a FSD in the message to neighbor fog nodes where the FSD is interpreted to be containing recommendations for specific services.

In one example, a first device may be configured to receive data corresponding to a service provided by the first device, update, based on the received data, one or more parameters of the service provided by the first device, and to send, to a second device, information regarding the one or more updated parameters, the information causing the second device to update one or more parameters of a service provided by the second device.

Figure 12:
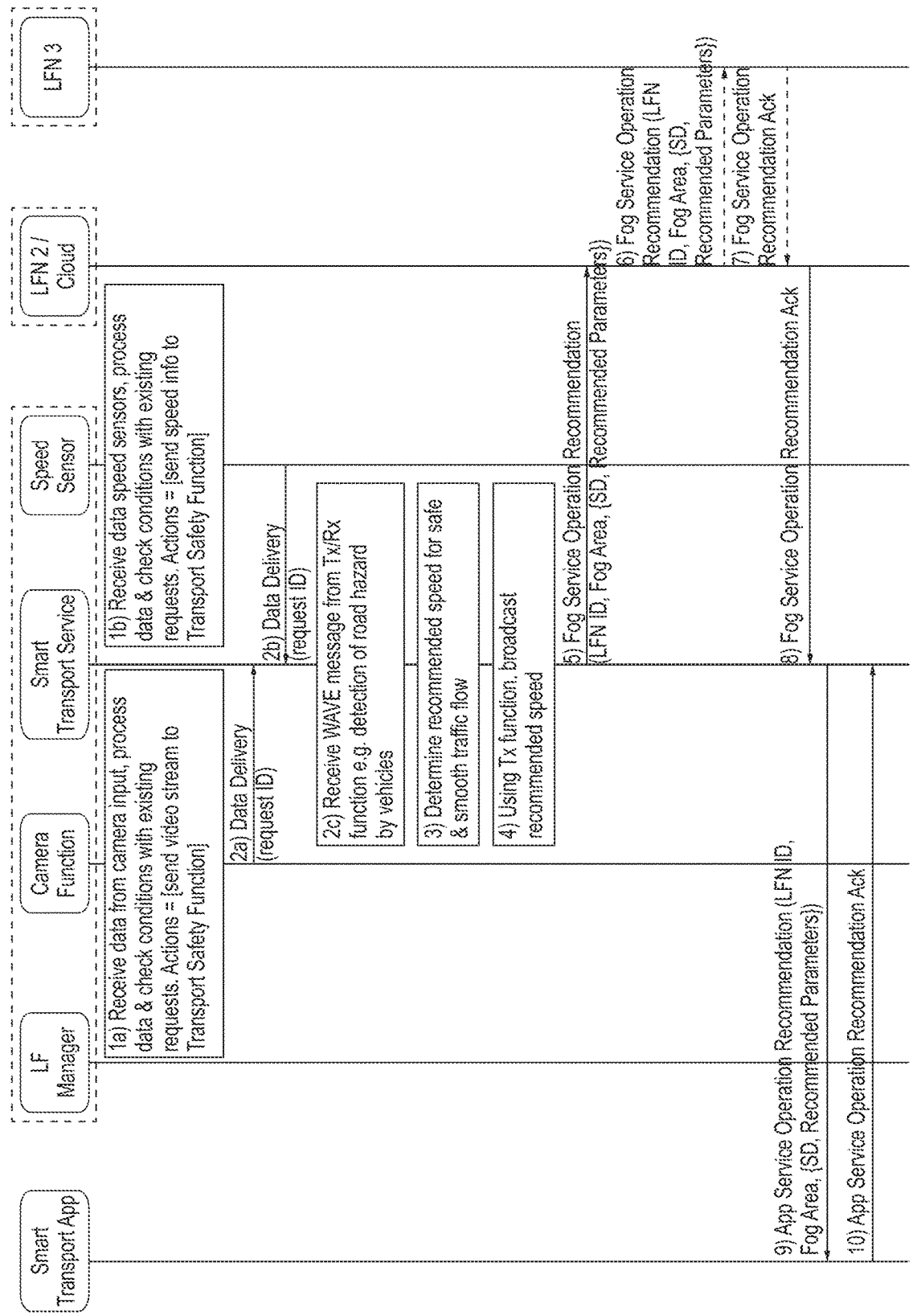
FIG. 12 shows an example procedure for a fog service operation recommendation.

In the example of FIG. 12, the LFN may provide a native Smart Transport Service (STS) which is independent of the Smart Transport Application running in the application layer scope of the LFN, although the latter may use the services of the STS. In this procedure and call flow, the STS may gather information or consume services of other capabilities of the LFN such as services from the camera and speed senor functions, and also from the Tx/Rx functions of the LFN. The STS may be assumed to also be capable of processing safety application messages that may be sent over WAVE messages. In the call flow shown in FIG. 12, it may be assumed that the STS has requested to use the services of the camera and speed sensor functions.

In step 1*a*, the camera function may receive data for which a policy was created such that a service has to be delivered to the STS. The camera function may be aware of the FSD related to each Request ID (similar to what have been described in FIG. 11, Steps 13-15). The camera function may process the data according to the FSD and may be aware of the action associated with this data, for example in this case, the camera function should send the processed data to the STS.

In step 1*b*, similar to Step 1*a*, the speed sensor function receives data for which a policy was created such that a service has to be delivered to the STS. The speed sensor function may be aware of the FSD related to each Request ID (similar to what have been described in FIG. 11, Steps 13-15). The speed sensor function may process the data according to the FSD and may be aware of the action associated with this data, for example in this case, the speed sensor function may send the processed data to the STS. The speed sensor function may then forward the data to the STS and include the Request ID associated with the data. Note again that the camera or speed sensor functions can be independent FEs that are not in the LFN.

In step 2*a*, the camera function may then forward the data to the STS and include the Request ID associated with the data. Note again that the camera or speed sensor functions can be independent FEs that are not in the LFN.

In step 2*b*, the speed sensor function may then forward the data to the STS and may include the Request ID associated with the data. Note again that the camera or speed sensor functions can be independent FEs that are not in the LFN.

In step 2*c*, the STS function may be able to receive WAVE messages that carry safety applications. The STS may receive a WAVE message indicating for example a detected hazard on the road or an accident that is reported by vehicles.

In step 3, based on the information or service received in steps 2*a*, 2*b* and 2*c*, the STS determines the need to inform the vehicles about reducing their speeds to avoid risks and also avoid traffic. This determination is based on the logic of the STS.

In step 4, the STS uses the transmit function of the LFN to broadcast a recommended speed using one or more access technologies and protocols. For example, the STS sends WAVE messages using RSUs that are capable of WiFi access technology. The WAVE message includes a recommended speed information that self-driving cars can receive and adjust their speeds accordingly.

In step 5, based on local policies of the STS and/or LFN, the STS sends a Fog Service Operation Recommendation message to the neighboring LFNs—although the flow only shows one for simplicity. Note that this message may also be sent by the LF Manager instead of the STS. In this case, the STS first communicates with the LF Manager and provides the necessary information to include. The message may include a FSD which in turn may contain the details of the service for which an operational recommendation is included, the LFN ID and the fog area related to the originating LFN. Note that the LFN and/or STS may have the list of neighbor LFNs to which this message should be sent. Alternatively, this message may be sent to the cloud, hence this step considers both options of the recipient being either a neighbor LFN or a cloud node. If sent to the cloud, the cloud can then forward the recommended operation to the necessary neighbor LFNs based on its policies.

In step 6, if the message was sent to the cloud, the cloud may determine which neighbor LFNs should receive this based on local policies. The cloud may then send a Fog Service Operation Recommendation message to the neighbor LFNs, here LFN 3. Note that the message may be sent to the LF Manager which then forwards it to the appropriate function, for example, another STS service in LFN 3, via the Policy function as has been described previously in FIG. 11 (e.g. Steps 7 to 9). The same applies to Step 5 above if the recipient was a LFN.

In step 7, the LFN 3 acknowledges the receipt of the recommendation by sending a Fog Service Operation Recommendation Ack message back to the cloud.

In step 8, the fog node or cloud acknowledges the receipt of the recommendation by sending a Fog Service Operation Recommendation Ack message back to the source LFN.

In step 9, the LFN may also send similar recommendations to applications that can benefit from this such as a smart transport application. The LFN may have policies that define which applications should be provided with such recommendations. The STS may send an App Service Operation Recommendation message to the application. This may include the FSD, fog area, and LFN ID from where this originated. Although it originated from the LFN, this information may be helpful if the LFN first receives it from a neighbor or from the cloud and then forwards the information to the application which then knows that this is related to another fog area and can therefore take the necessary decisions as need be, for example, to notify the users about such recommendations before entering that area.

In step 10, the application responds with an App Service Operation Recommendation Ack message to acknowledge the receipt of the recommended parameters.

Procedures for an application to request a service related to instantiating the same application in other fog nodes, and also to move the context of a user—at the application layer—from the application instance in one fog node to the application instance in another fog node are disclosed. Note that the latter may be due to the mobility of the user who is actively using a service or application that has all the context and details of the service requirements. For example, a user may be receiving services from a smart transport application or navigation system. The user may have initiated this service in LFN 1 which has details about the desired path, the desired point of services that the user wants to stop at, and the desired services at the destination such as finding parking spots below a certain cost, etc. As the vehicle drives, this information may be passed to the neighboring applications that run on neighboring fog nodes. This is important since the user may at any time request updates to a service such as to stop at a gas station, etc. Procedures for instantiating applications in other fog nodes, relocating user application context across neighboring application instances and hence fog nodes, and finally a fog node may request the instantiation of a service due to multiple requests from the application layer are disclosed.

The decision to instantiate an application in a fog node may be made in the application layer. An instance of the application currently running on a source fog node may be assumed to know the fog area of the fog node that it is hosted on and hence the fog areas of neighbor fog nodes. This information may be made available by the fog node if the application is authorized to receive it. The application instance also may know, via the current hosting fog node, whether neighboring fog nodes already have an instance of the same application running or not. Based on the user's mobility, the application may request the fog service layer to instantiate the same application in the neighboring fog node in order to serve the user as he moves into that area. There are also other reasons for triggering the instantiation of applications in fog nodes and the decision to do so may be done at the cloud instead of being triggered by the application layer.

Figure 13A:
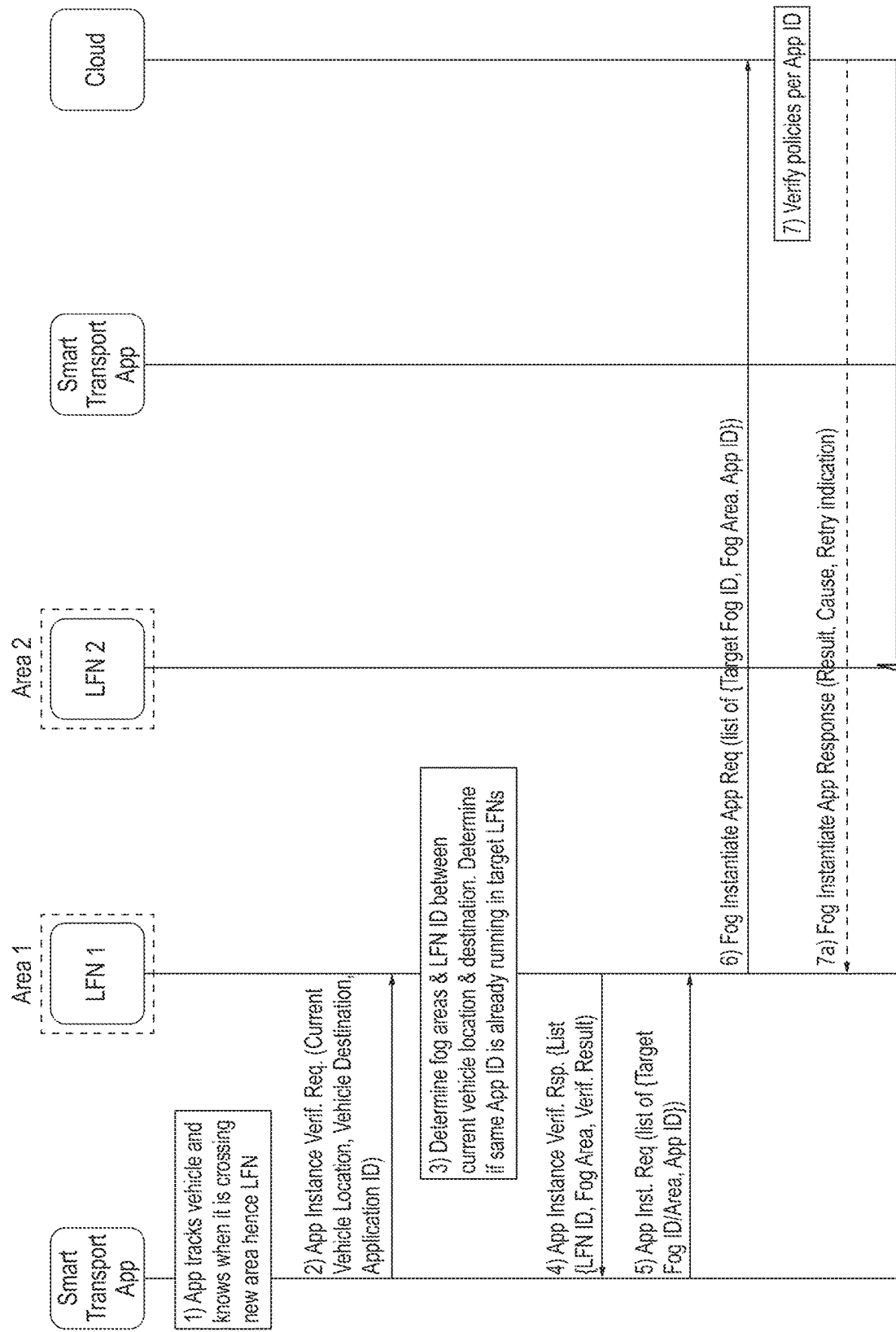
FIGS. 13A-B shows an example procedure for fog application instantiation due to mobility.
Figure 13B:
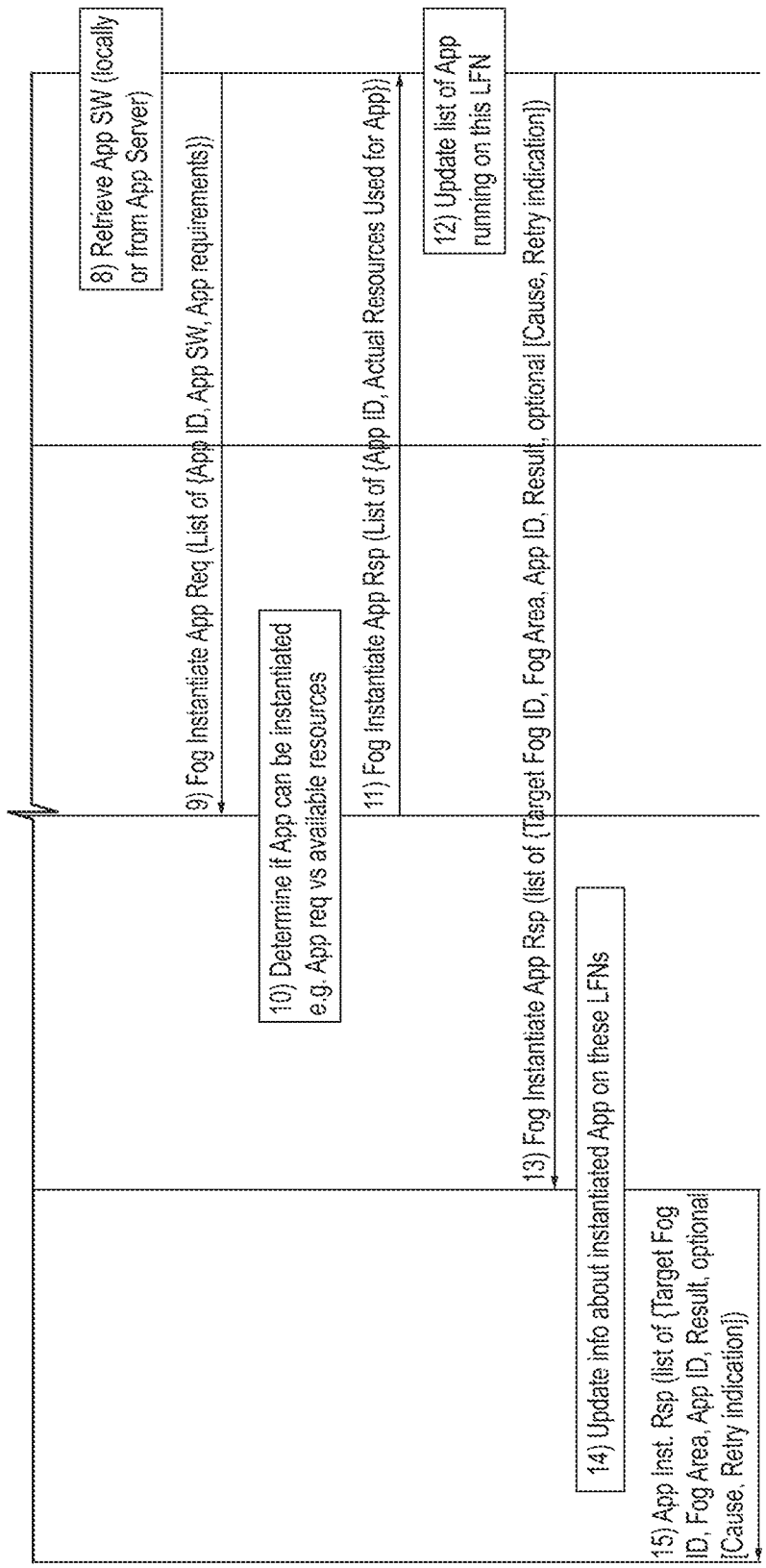

Procedures for the dynamic instantiation of application instances as the user is moving from one fog area to another are disclosed. The instantiation may be done via the cloud due to a request from an application running on a source LFN and the application may be aware of the user's mobility and location. FIG. 13 shows an example procedure.

In step 1, the application tracks the vehicle optionally using services of the fog node. The application may contain the user context which describes the services required by each user or vehicle. The application, in this case a smart transport application, may be aware that the vehicle is leaving the fog area of the fog node on which it (i.e. the application) is currently hosted.

In step 2, the application may request the LFN to indicate whether the neighboring or adjacent LFNs are already hosting instances of a list of applications identified by an Application ID. Note that for this use case, there may be only one Application ID which is the same as that of the smart transport application, however, it is possible that an application requests to know if other applications are also running as usually they may share the same user information such as email address, user names, etc. The application may use the Application Instance Verification Request API which may include the vehicle's current location, the vehicle's destination and at least one Application ID for which it is desired to know if the same application is already instantiated in any fog node between the current location and the destination.

In step 3, the LF Manager analyzes the location information and the destination. The LF Manger determines the list of adjacent LFNs or at least the next LFN based on the location information of the vehicle and its destination. The LF Manager may be already aware of the list of applications that are already running on these neighbor LFNs.

In step 4, based on the determination in Step 3, the LF Manager responds to the application using the API: Application Instance Verification Response which may contain the list of LFNs, Fog Areas, and the result per Application ID indicating whether or not the application is instantiated in the corresponding LFN ID.

In step 5, based on the received information, the application determines to instantiate an application in a particular LFN (e.g. the next adjacent LFN) in order to serve the user or vehicle. The application uses the API: Application Instantiation Request which may include the list of target LFNs and the associated areas corresponding to which the indicated Application ID is desired to be instantiated.

In step 6, LFN 1 sends a Fog Instantiate Application Request to the cloud, indicating a list of target fog areas, LFN ID and Application ID as received from the application layer.

In step 7, the cloud node verifies its policies to authorize the request for each application.

In step 7a, if the request is not accepted (e.g. for all the requested applications or for all the target LFNs) the cloud may send a Fog Instantiate Application Response which may include the result of the request that would be set, for example, to "reject" in this case. The message may also indicate the cause for rejection and whether and when a retry may occur.

In step 8, if the request is granted and authorized, the cloud node retrieves the application software associated to each Application ID that was allowed. This may be available locally at the cloud node or the cloud node may get it from the main application server.

In step 9, the cloud node contacts each target LFN for which the request has been authorized. Note that while FIG. 13 only shows one target LFN 2 for simplicity, it is understood that any number of target entities may be involved. The cloud sends a Fog Instantiate Application Request message that includes a list of Application IDs each of which is associated with the Application Software that should be instantiated and the fog resources for running or instantiating this application such as memory, compute, the allowed services such as Tx/Rx functions, camera data, etc. Note that it may be assumed that the cloud already has the Application Software that is provided the Application Provider. The cloud may also contact the provider to get the software if not available.

In step 10, the LFN 2 determines if the application(s) can be instantiated with the required resources. If yes, the LFN 2 instantiates the applications using the received Application Software from Step 9. It is also possible that the actual available resources do not match the desired resources. The LFN 2 may have policies that help it to determine whether the indicated applications can be instantiated, for example, based on the available resources at the target LFN in comparison to the resources that are needed for the application to be instantiated. Furthermore as an example, even if the available resources do not precisely match the required resources (such as in terms of memory), the LFN may still instantiate the application if the difference between available and required resources does not go beyond a certain threshold (e.g., 90%). This threshold may be configured in the LFN. The LFN 2 then instantiates the application(s) with the resources available or that have been determined per application.

In step 11, the LFN 2 sends a Fog Instantiate Application Response message to the cloud which may contain the list of Application IDs, the corresponding result of instantiation, and optionally the actual resources used for each application if different from what was previously requested.

In step 12, the cloud node updates the list of instantiated applications on this LFN 2.

In step 13, the cloud sends a Fog Instantiate Application Response back to the source LFN, here LFN 1. The message may include a list of Application IDs, the target LFN and fog area and the result of the instantiation request. If the result is not successful, the message may also include a cause code to reflect why the operation was not successful and may also include an indication for a retry at a later time.

In step 14, the LFN updates its local information to reflect the status and Application IDs that are running on the corresponding target LFNs for future requests from the application layer.

In step 15, the LFN Manager in LFN 1 uses the API: Application Instantiation Response to indicate to the application layer the result of the request, the target LFN ID and fog area on which the applications have been instantiated, and if not successful then the cause for this failure or rejection. This API also indicates if the application can retry again for those applications that were not instantiated.

Procedures for a cloud-triggered application instantiation in fog nodes are disclosed. The determination to do so may be based on local policies and logic at the cloud. Again, this procedure may be presented with a use case in mind, however the procedure itself applies to any use case once the decision to instantiate applications is taken in the cloud according to the use case.

Here we may assume that the cloud (or higher level fog node) has performed the Fog Service Request procedure with at least one LFN, namely LFN 1 in our example. The service may be related to the delivery of data from LFN 1 to the cloud that is related to traffic information from various sources such as cameras, speed sensors and processing of safety application messages possibly sent using the WAVE protocol. LFN 1 may send the data related to each FSD in the request. The cloud receives the data from LFN 1 (and possibly other LFNs as well) indicating, for example, an accident. The service may also deliver camera images or videos that show the extent of the accident such that it becomes necessary to divert all traffic from the affected area. As such, the cloud node takes the decision to do so but first triggers the instantiation of applications in LFNs that are in the neighborhood of the affected fog area.

Figure 14A:
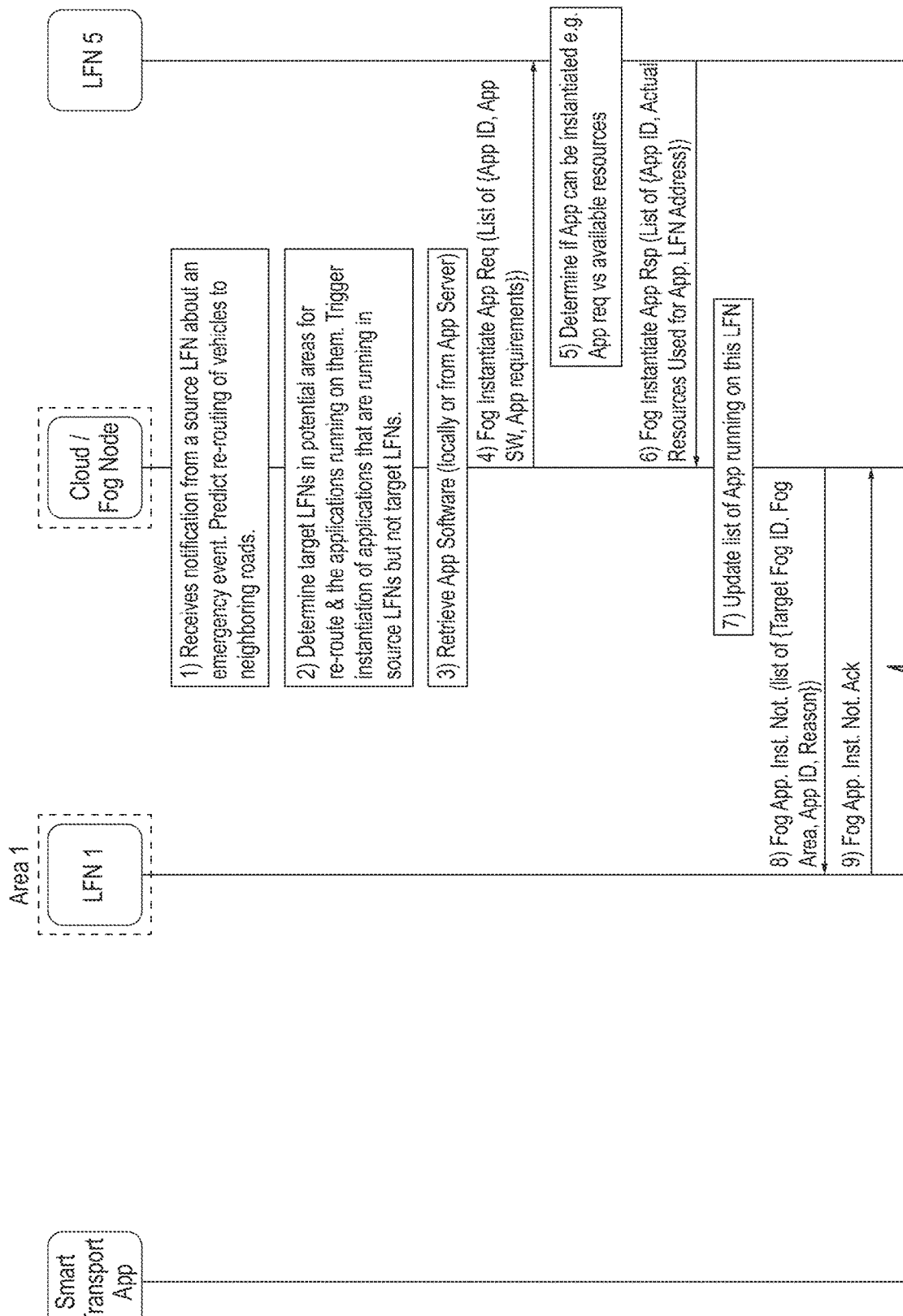
FIGS. 14A-B shows an example procedure for cloud-triggered application instantiation in fog nodes.
Figure 14B:
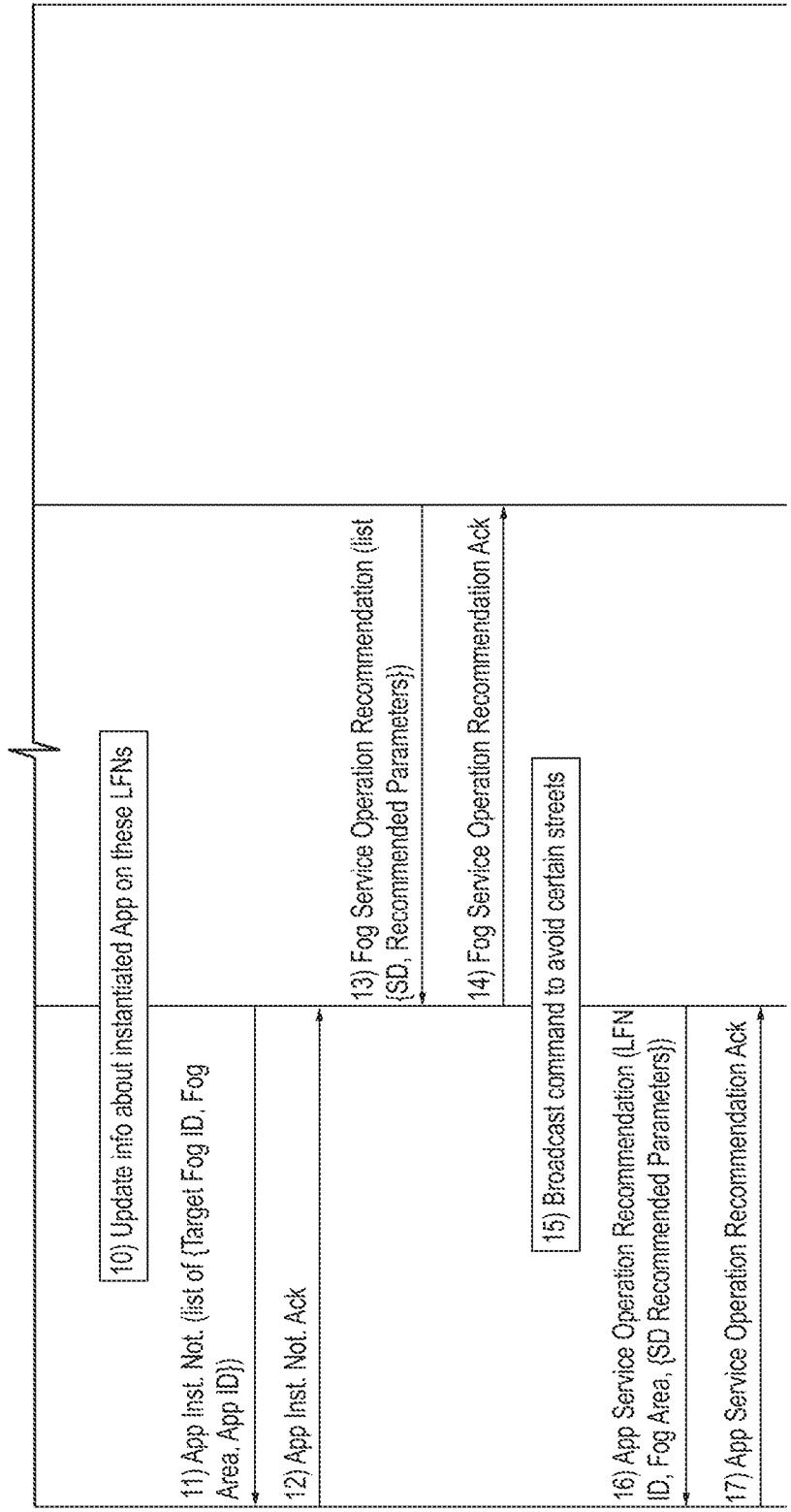

FIG. 14 shows an example procedure for the instantiation of applications triggered by the cloud. In this flow, it may be assumed that analyzed data from LFN 1 triggers the cloud to instantiate applications in other LFNs, namely LFN 5. Note that the application instantiation may be done in several fog nodes but this example shows only one target LFN for simplicity only. After the instantiation, the cloud node further uses the fog service operation recommendation procedure (described previously) to recommend the broadcast of traffic diversion from the affected streets or areas under the control of LFN 1.

In step 1, the cloud may already be assumed to have requested service from LFN 1 using the Fog Service Request procedure that was presented previously. As part of this service, the cloud receives data from LFN 1 about an accident. The analysis of this data or service triggers the cloud to decide on traffic diversion from the affected streets in LFN 1's fog area.

In step 2, the cloud determines the potential new routes that vehicles might be taking based on local logic and policies. The cloud decides to instantiate one or more of the applications that are being used in LFN 1 on the fog nodes responsible for the fog areas into which traffic diversion is predicted to occur. This is important to enable seamless service availability in the fog service layer so that whatever service is being used in LFN 1's fog area may be available in the new areas where diversion may occur.

Step 3 may be the same as Step 8 in FIG. 13.
Step 4 may be the same as Step 9 in FIG. 13.
Step 5 may be the same as Step 10 in FIG. 13.
Step 6 may be the same as Step 11 in FIG. 13.
Step 7 may be the same as Step 12 in FIG. 13.

In step 8, since the cloud took the decision to instantiate applications in target fog nodes, the cloud may send a Fog Application Instantiation Notification message to the LFN 1. The message may include a list of Application IDs and corresponding LFN ID and Fog Area representing the LFN on which the application has been instantiated.

In step 9, the LFN 1 responds with a Fog Application Instantiation Notification Ack message to confirm the receipt of the notification.

Step 10 may be the same as Step 14 in FIG. 13.

In step 11, LFN 1, optionally the LF Manager in LFN 1 informs each application about the instantiation of the same application (identified with similar Application ID) about the instantiation the same application in the target LFNs and corresponding Fog Areas. This may be done using an API: Application Instantiation Notification.

In step 12, the applications respond via the API: Application Instantiation Notification Ack to acknowledge the receipt of the notification. The applications may now save this information reflecting the LFNs that are now running the same application identified by an Application ID.

In step 13, the cloud, since it is assumed to be managing all the LFNs, decides to divert traffic away from the affected area based on local policies. The cloud uses the operation recommendation procedure that was previously described to include the necessary FSD for this operation. The cloud sends the Fog Service Operation Recommendation message to the LFN 1 with the recommended parameters or actions. For example, the recommended parameters may indicate to broadcast a message, in all or specific areas of the LFN 1's fog area, informing vehicles to avoid certain streets altogether.

In step 14, LFN 1 responds with a Fog Service Operation Recommendation Ack message to acknowledge the receipt of the message.

In step 15, the LFN 1 takes into account the recommended parameters and actions as received from the cloud. As an example, the actions may be to broadcast a message indicating the need to avoid certain streets or areas. The LFN 1 uses it's transmit functions to do so.

Step 16 may be the same as Step 9 in FIG. 12.
Step 17 may be the same as Step 10 in FIG. 12.

The example procedure for instantiating applications in other fog nodes may be initiated either by a LFN or by the cloud. Subsequent to application instantiation, it may be expected that the application user context be moved from one fog node to another so that the instantiated application serves the users in question who are moving across fog areas.

In one aspect, the source LFN may contact a target LFN directly for instantiation of an application. The source LFN may be assumed to have the Application Software locally and may provide the Application Software to the target LFN for instantiation. Optionally, it may be the case that the target LFN has the Application Software locally although not yet instantiated. The source LFN may provide the Application ID which is then used by the target LFN to choose the corresponding Application Software and instantiate the application accordingly.

Figure 15:
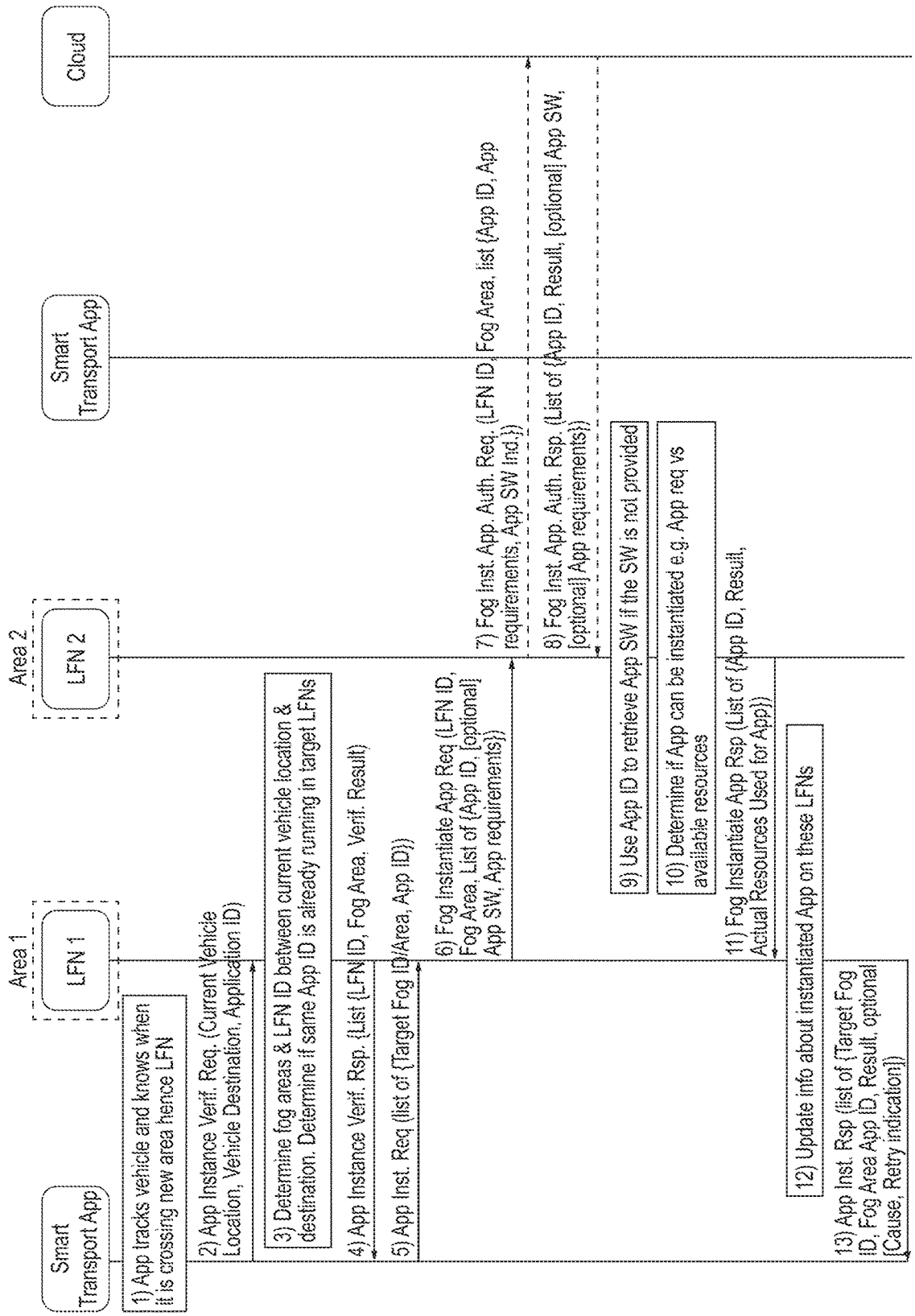
FIG. 15 shows an example direct F2F procedure for application instantiation.

FIG. 15 shows an example call flow that uses direct F2F communications to instantiate an application at a target LFN. Note that the LFNs (source, or target) or cloud, may have the application software template or may exchange an application template, or an LFN may already have a template locally for certain applications. As such, the term Application Software may also refer to a template.

Step 1 may be the same as Step 1 in FIG. 13.
Step 2 may be the same as Step 2 in FIG. 13.
Step 3 may be the same as Step 3 in FIG. 13.
Step 4 may be the same as Step 4 in FIG. 13.
Step 5 may be the same as Step 5 in FIG. 13.

In step 6, the LFN may be configured, for example, based on Application ID or based on the requesting application or other local policies, or due to lack of a connection with a FN or the cloud, to directly contact a target LFN for application instantiation. In this case, the source LFN sends a Fog Instantiate Application Request message to the target LFN. The message may include the source LFN ID and Fog Area, and a list of one or more of: Application ID, optional Application Software per Application ID, and Application requirements per Application ID that describe the fog resources needed for this application.

In step 7, the target LFN may contact a FN or the cloud to authenticate the request and hence may send a Fog Instantiate Authorization Request message including the source LFN ID and Fog Area, and the list of one or more of: Application ID, optional Application Software per Application ID, and Application requirements per Application ID that describe the fog resources needed for this application. If the Application Software is not sent by the source LFN and if the target LFN does not have the Application Software for a particular Application ID, the source LFN may also include an Application Software Indication per Application ID. This informs the cloud that the Application Software is needed at the target LFN.

In step 9, the cloud authorizes the request based on local policies and responds with the Fog Instantiate Authorization Request message including a list of one or more of: Application ID, the Result of the authorization per application, an optional Application Software if needed (as described above), and an optional Application requirement per application that describe the set of fog resources needed to instantiate the corresponding application on the fog node.

In step 9, the target LFN, if it authorizes the request based on local policies or information or based on the steps described above, may retrieve the Application Software using the Application ID assuming the Application Software is available and was not provided by the source LFN or the cloud. Note that the LFN may already have the Application Software that it may have received from a higher level FN or the cloud and may retrieve it based on the Application ID.

In step 10, the target LFN determines if the resources are available to instantiate each of the applications.

In step 11, the target LFN responds to the source LFN with a Fog Instantiate Application Response message. The message may include a list of one or more of: Application ID, the Result of the application instantiation request per application, and the actual fog resources used to instance each application.

Step 12 may be the same as Step 14 in FIG. 13.
Step 13 may be the same as Step 15 in FIG. 13.

Procedures to address the use cases related to the relocation of application user context from a source application instance, running on a source fog node, to a target application instance running on a target fog node are disclosed. This context indicates the current state of a service for a particular user which needs to be relocated as the user moves from one fog area to another. In one embodiment, there are two methods to relocate the user context at the application layer. In both cases, the relocation of user context is considered to be a service that is provided by the fog service layer. The first option for relocating application user context is via the cloud to a target fog node. The second option is a relocation using direct procedures between fog nodes.

Note that although the solutions below may refer to the transfer of user context, the solution may also transfer and include application layer context as well. As such, the support services may be related to either application user context, or application context, or both. The description of the solution using application user context should not be interpreted as a limitation of the solution.

Figure 16:
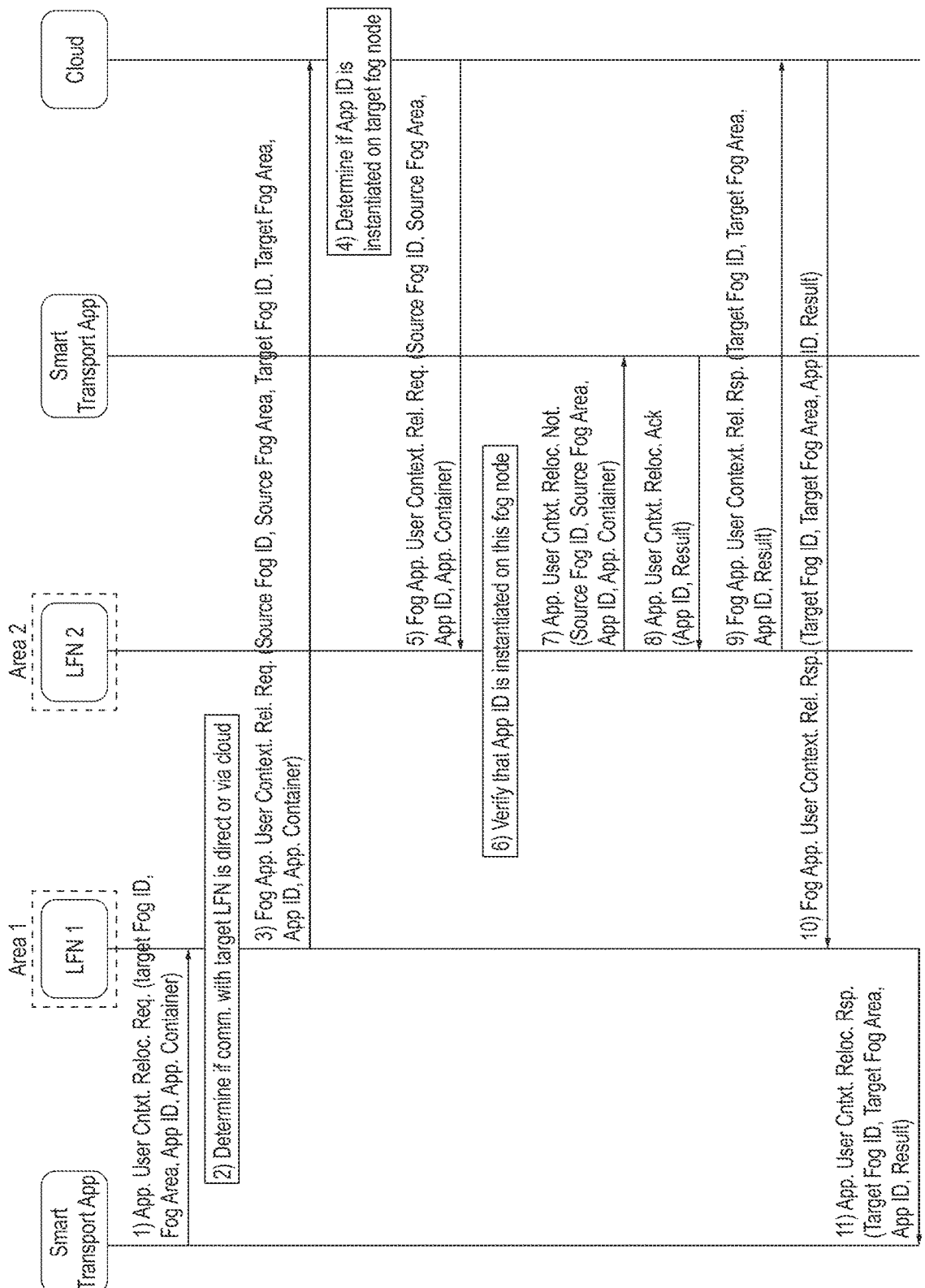
FIG. 16 shows an example procedure for application user context relocation via the cloud.

Procedures for application user context relocation from a source fog node to a target fog node via the cloud node are disclosed. These procedures may be executed before the user actually moves into the new fog area and the decision to do so may be made by the application layer. It may be assumed that the application layer tracks the user and is responsible to make this decision at the right time. The solution is simple in the sense that it relies on the fog service layer to move the application user context and it assumes that the target application instance is responsible to analyze the context and then get the necessary service for the user as if the user is being serviced at the target fog node initially. That is, the target application is responsible to interact with the target fog node on which it runs in order to request the necessary fog services accordingly. As such, no service transfer is performed for the user as part of the mobility. FIG. 16 shows the overall procedure for a fog service that relocates the application user context as requested by the application layer.

In step 1, the application layer decides to relocate a user's context to a target application running on a target fog node. The application may be aware that an instance of the same application is running on the target fog node. The application uses the API: Application User Context Relocation Request which contains one or more of the target fog ID, target fog area, the Application ID and an Application Container which is only understood by the application layer and is transparent to the fog service layer.

In step 2, the LFN 1 verifies if the relocation has to be done via the cloud or directly with the target fog. In this case the LFN 1 determines to do the relocation via the cloud based on its local policies.

In step 3, the LFN 1 sends a Fog Application User Context Relocation Request message to the cloud indicating the source LFN ID and fog area, the target LFN ID and fog area, the Application ID and the Application Container that contains the application user context.

In step 4, the cloud verifies if the target Application ID is instantiated in the target fog node and also authorizes the request.

In step 5, if authorized, the cloud sends a Fog Application User Context Relocation Request message to the target LFN indicating one or more of the source LFN ID and fog area, the Application ID and the Application Container that contains the application user context.

In step 6, the target LFN verifies if the application identified by an Application ID is indeed instantiated in this LFN.

In step 7, the LFN (e.g. the LF Manager) uses the API: Application User Context Relocation Notification including one or more of the source LFN ID and fog area, the Application ID and the Application Container that contains the user context. This API is used to notify the application that there is request for user context transfer from another application in another LFN.

In step 8, the application responds with the API: Application User Context Relocation Acknowledge indicating the Application ID and the result of the context relocation. This indicates the result of the context transfer which if successful implies that the particular set of users whose contexts have been transferred can now be served by this application instance.

In step 9, the target LFN responds to the cloud with a Fog Application User Context Relocation Response message including one or more of the target LFN ID and fog area, the Application ID, and the result of the relocation of the application user context.

In step 10, the cloud responds to the source LFN with a Fog Application User Context Relocation Response message including one or more of the target LFN ID and fog area, the Application ID, and the result of the relocation.

In step 11, the LFN 1 (e.g. the LF Manger in LFN 1) responds to the application using the API: Application User Context Relocation Response which contains one or more of the target fog ID, target fog area, the Application ID and the result of the application user context relocation. This procedure makes the target application (on the target LFN) responsible for analyzing the context and determining the services that should be requested from the target fog node so that the user's service needs are made available in a seamless manner.

Figure 17A:
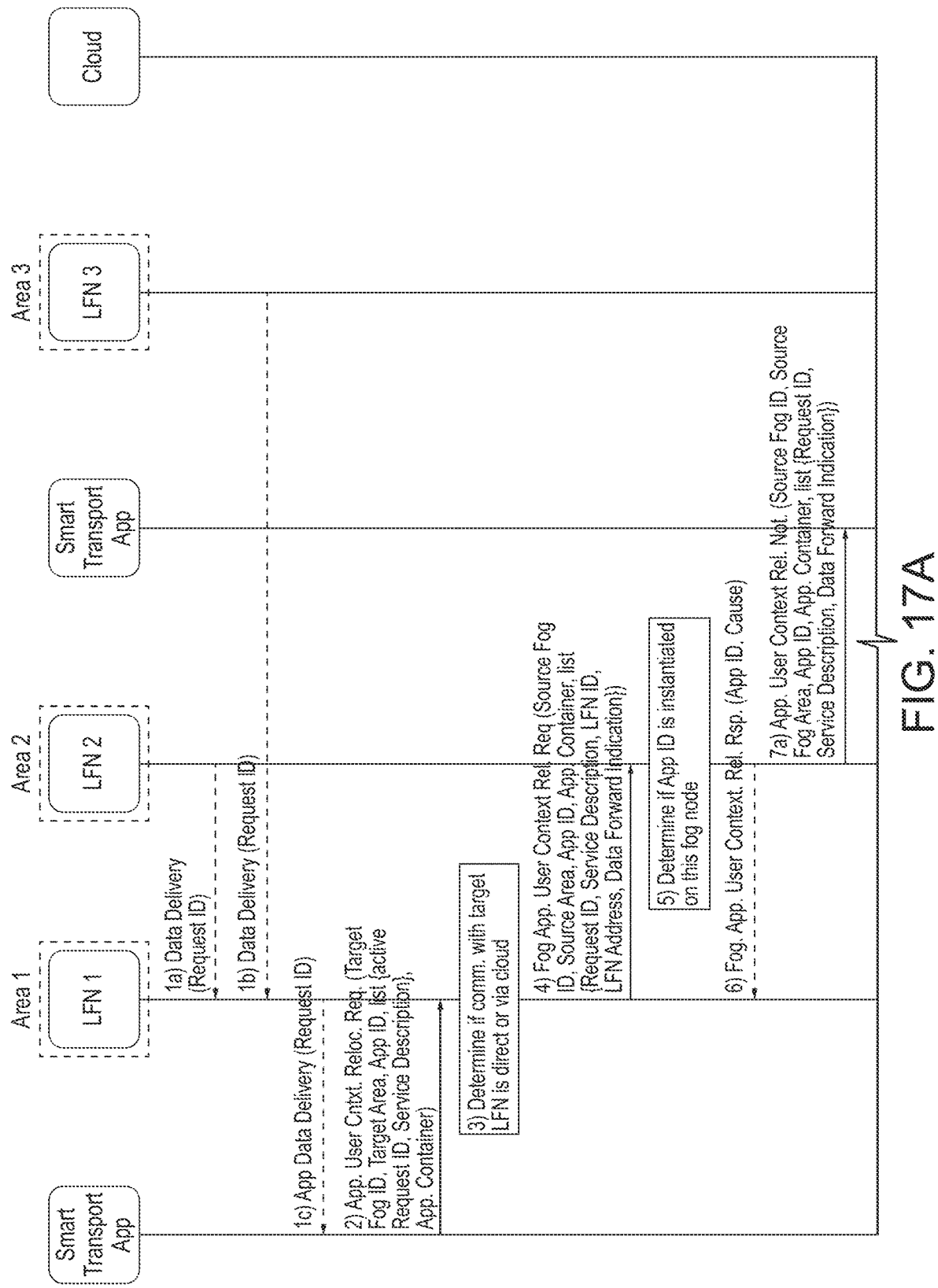
FIGS. 17A-B shows an example procedure for application user context relocation with direct fog-to-fog signaling.
Figure 17B:
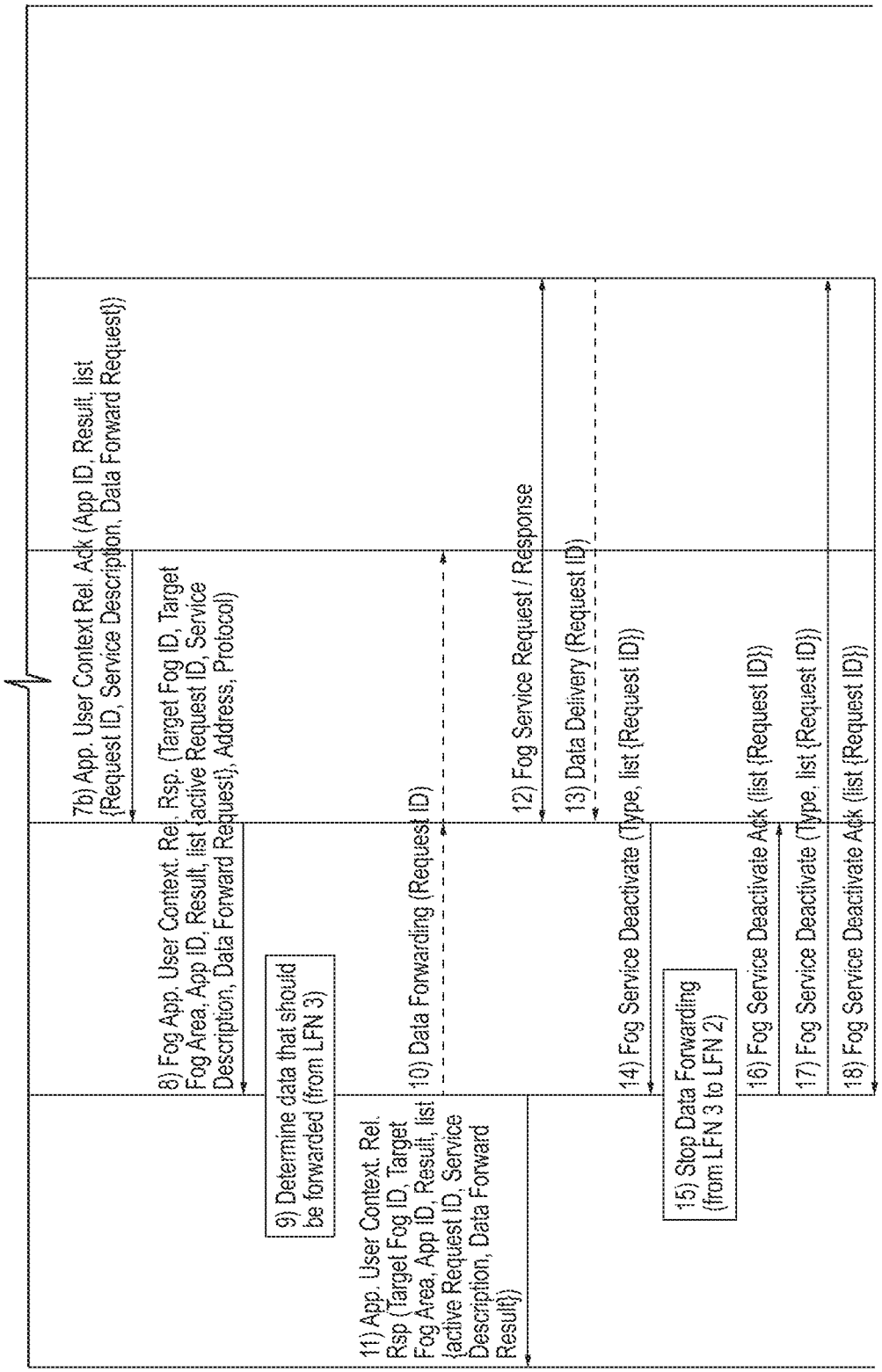

An example procedure for application user context relocation from application instances across fog nodes using a direct procedure between the LFNs is shown in FIG. 17. This procedure also supports data or service forwarding from the source fog node to the target fog node into whose fog area the user is moving.

A user may have specific services that no other user is currently requesting. For example, a user may be interested in finding out the availability of a parking spot in a particular street of a city. As such, camera images or sensors at parking spots on that street may send data back to fog nodes indicating the availability, or not, of parking spots. Moreover, the fog node responsible for these "things" on the street of interest is not yet the fog node under which the user is. For example, consider a case where a user is currently in Fog Area 1 under LFN 1. The user or vehicle is driving towards a destination or street in Fog Area 3 that is controlled by LFN 3. Although the user is not yet in Fog Area 3, the LFN 3 may be fetching data and sending it to LFN 1 to inform the user about the availability of parking spaces even before arriving at the destination. As such, this parking information service is not a one-time data sharing event, but it can be done in real-time as more spots become either free or used up. However, the user may actually start crossing into Fog Area 2 which is between Fog Area 1 and Fog Area 3. At this point, the user's application layer context should be moved to the application instance that is running in LFN 2. However, there is data or service for this user and that service needs to be continued in LFN 2. Although the application layer in LFN 2 is supposed to interact with the LFN 2 to get the necessary services for this user, the time needed to do so may be long. For example, LFN 2 now needs to contact LFN 3 to get the data about parking directly instead of having this data sent to LFN 1 since the user is about to leave that area. The procedure presented next enables LFN 1 to forward data or service to LFN 2 during the mobility event. This enables the application instance in LFN 2 to then request the services from LFN 2 and once the services are made available at LFN 2 for this user, the data or service forwarding from LFN 1 stops. This enables a "make before break" service handover and makes the service mobility seamless. FIG. 17 shows the procedure and steps needed for user context relocation directly between the fog nodes.

In the procedure below it is assumed that the user is under LFN 1 using a smart transport application that is also hosted on LFN 1. Moreover, the application is consuming services from LFN 1 that has triggered LFN 1 to in turn get services from LFN2 and LFN 3 using the procedures previously described. As such, the LFN 1 is currently receiving services or data for the particular user. Note that the LFN 1 is not necessarily aware of which data is provided ultimately to a user. This information is available at the application layer which is seen as the primary consumer of the fog service layer. Therefore, the decision to forward data is taken by the application layer and supported by the fog service layer. Similarly, the decision to relocate the user's application layer context is taken by the application layer based on the location of the user.

In step 1a, LFN 1 is receiving data from LFN 2.

In step 1b, LFN 1 is receiving data from LFN 3.

In step 1c, LFN 1 forwards data to the application such as a smart transport application. The data (from both LFN 2 and LFN 3) is forwarded to the application.

In step 2, the application decides to relocate the user's application context for example due to mobility from fog area 1 to fog area 2. The application layer may be aware of the services for this user that might be unique and that may need "service mobility" across the fog nodes. Note that this may also be due to the fact that the user pays a particular premium for which this capability may be supported. The application uses the API: Application User Context Relocation Request whose contents have been described earlier. In addition, since the application requires "service mobility" for this user, the application may include a list of active Request ID and their corresponding FSD. This list indicates the need for "service mobility." Although not shown, the API may also include an explicit "service mobility" indication that requests the fog node to forward data related to the indicated FSD to the target fog node.

In step 3, LFN 1 verifies if the relocation has to be done via the cloud or directly with the target fog. In this case, LFN 1 determines to do the relocation directly with the target fog node based on its local policies.

In step 4, the source LFN sends a Fog Application User Context Relocation Request to the target fog node. The message may contain the source LFN ID and fog area, the Application ID, and the Application Container. The message may also contain a list of Request ID associated with a FSD and a Data Forwarding Indication. The latter informs the target that the source fog node can support data forwarding as part of the mobility.

In step 5, the target LFN verifies if the application identified by an Application ID is indeed instantiated in this LFN.

In step 6, if the policies don't allow this relocation, the fog node responds with Fog Application User Context Relocation Response message that includes the result (in this case a rejection) and a cause code describing the reason for rejection.

In step 7a, if the relocation is authorized, the LFN (e.g. LF Manager) uses the API: Application User Context Relocation Notification. In addition to what has been described earlier, the API may also include a list of Request ID associated with a FSD and a Data Forwarding Indication. The latter informs the application that the service layer supports service mobility as part of the context relocation.

In step 7b, the application responds with the API: Application User Context Relocation Acknowledge that may include the Application ID, the result of the relocation and a list of Request ID associated with a FSD and a Data Forwarding Request. The Data Forwarding Request, per Request ID and FSD, informs the fog node whether service mobility is required for each of the Request ID and FSD.

In step 8, LFN 2 responds to LFN 1 with a Fog Application User Context Relocation Response to source fog node. In addition to the contents previously described, the API may include a list of Request ID, FSD, and a Data Forwarding Request information element. The Data Forwarding Request is an indication that data or service forwarding is requested for the indicated Request ID and FSD.

In step 9, the LFN 1 (e.g. LF Manager) determines that data from LFN 3, that is received at LFN 1, should be forwarded to LFN 2 as part of the mobility. Note that this determination is done based on the Data Forwarding Request indication per Request ID and FSD. Note that this example only shows that data from LFN 3 should be forwarded. However, there may be other data from other LFNs or local service from LFN 2 that may also be forwarded. The example is just for illustration and simplicity.

In step 10, LFN 1 still continues to receive a service from LFN 3 as previously indicated in Step 1b. LFN 3 may not be aware about the user's mobility thus far. LFN 1 forwards data to LFN 2 where the application user context is relocated. The data may also be forwarded to the application. The data forwarded is linked to particular service that is identified by a Request ID.

In step 11, LFN 1 (e.g. LF Manager) responds to the application with the API: Application User Context Relocation Response and indicates the result of the relocation. The API may also include the list of Request ID, FSD and Data Forward Result. The latter indicates if data forwarding was successful or accepted for each Request ID and FSD.

At this point, the application layer in LFN 2 may be getting the necessary service or data for the user in question from LFN 1 for example via forwarding. Although this helps with seamless mobility and service provisioning, the application layer may eventually request LFN 2 to get similar services so that the source of the service provider becomes LFN 2 and not LFN 1. After the service is available at LFN 2, the data forwarding procedure may then be terminated. The next steps describe this accordingly.

In step 12, the LFN 2 requests services from LFN 3 directly so that data forwarding may eventually be stopped.

In step 13, the LFN 3 starts data delivery towards LFN 2 according to the FSD provided in the Fog Service Request procedure.

In step 14, once LFN 2 starts receiving the data directly from LFN 3, the LFN 2 sends a Fog Service Deactivate message to LFN 1. The message may include the request type and the list of Request ID. The request Type indicates the need to stop data forwarding for the list of Request ID.

In step 15, based on the received list of Request IDs, the LFN 1 determines to stop forwarding data corresponding to each Request ID. In this case, LFN 1 stops forwarding data received from LFN 3 to LFN 2.

In step 16, the LFN 1 sends a Fog Service Deactivate Ack message to inform the target LFN that data corresponding to the list of Request ID may no longer be forwarded.

In step 17, the data from LFN 3 may no longer be needed in LFN 1 based on the requests and FSDs that are currently active. The LFN 1 may send a Fog Service Deactivate message to the LFN 3 and include the list of Request ID for which service deactivation is requested.

In step 18, the LFN 3 sends a Fog Service Deactivate Ack message to LFN 1 and acknowledges the termination of the service corresponding to the list of Request IDs.

After Step 18, the application instances may be getting all the data or service it needs from the LFN 2 which in turn gets the data directly from other sources and stops any indirect service provisioning via LFN 1.

An example procedure for a use case involving application layer interactions with the fog is disclosed. Note that although the procedure presents a support service based on predicted mobility pattern, the procedure also applies to any other predictions that may impact the performance of fog nodes. For example, the LFN, FN, or cloud may predict an increase in load conditions on specific LFNs and hence may decide to instantiate an application in other LFNs, etc. As such, the procedure is not only limited to predications by the application layer, or predictions due to mobility. The predictions can be made by the LFNs, FNs, or cloud and the procedure to execute the solution presented below may also be triggered and initiated by the LFN, FN, or cloud.

Figure 18:
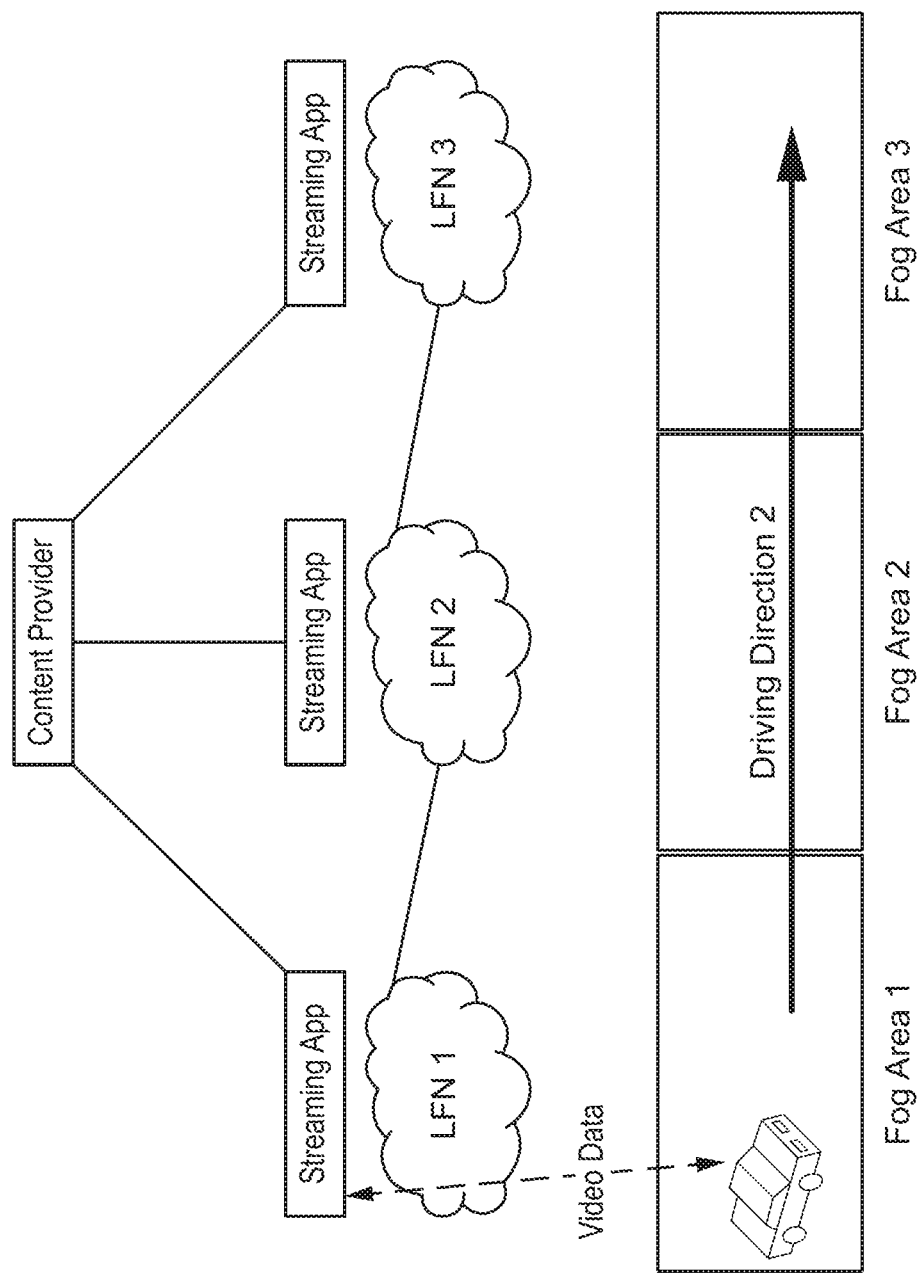
FIG. 18 shows an example vehicle driving across fog areas using a pre-determined route.

In this use case, it may be assumed that the user's mobility is known. Given this assumption, the application layer may request the fog service layer to prepare a particular service ahead of time. The prepared service may be hosted in the fog nodes and hence fog areas through which the user is expected to travel. For example, a video streaming application may be used in a vehicle by a passenger. The vehicle's destination is known ahead of time and the vehicle starts accessing the service in fog area 1 that is serviced by LFN 1. The application instance, for example, the streaming application in LFN 1, requests the LFN 1 to communicate certain information with a list of target fog nodes and the instance of the same application running in these fog nodes so that the application layer is informed, by the fog service layer, when the user is expected to arrive in that fog area. With this information the application instance on that fog node can fetch data (e.g. video streams) that the user may be needing based on the estimated time of arrival. FIG. 18 shows as example use case of a car driving in a particular direction and how the fog nodes may be deployed per area.

Figure 19A:
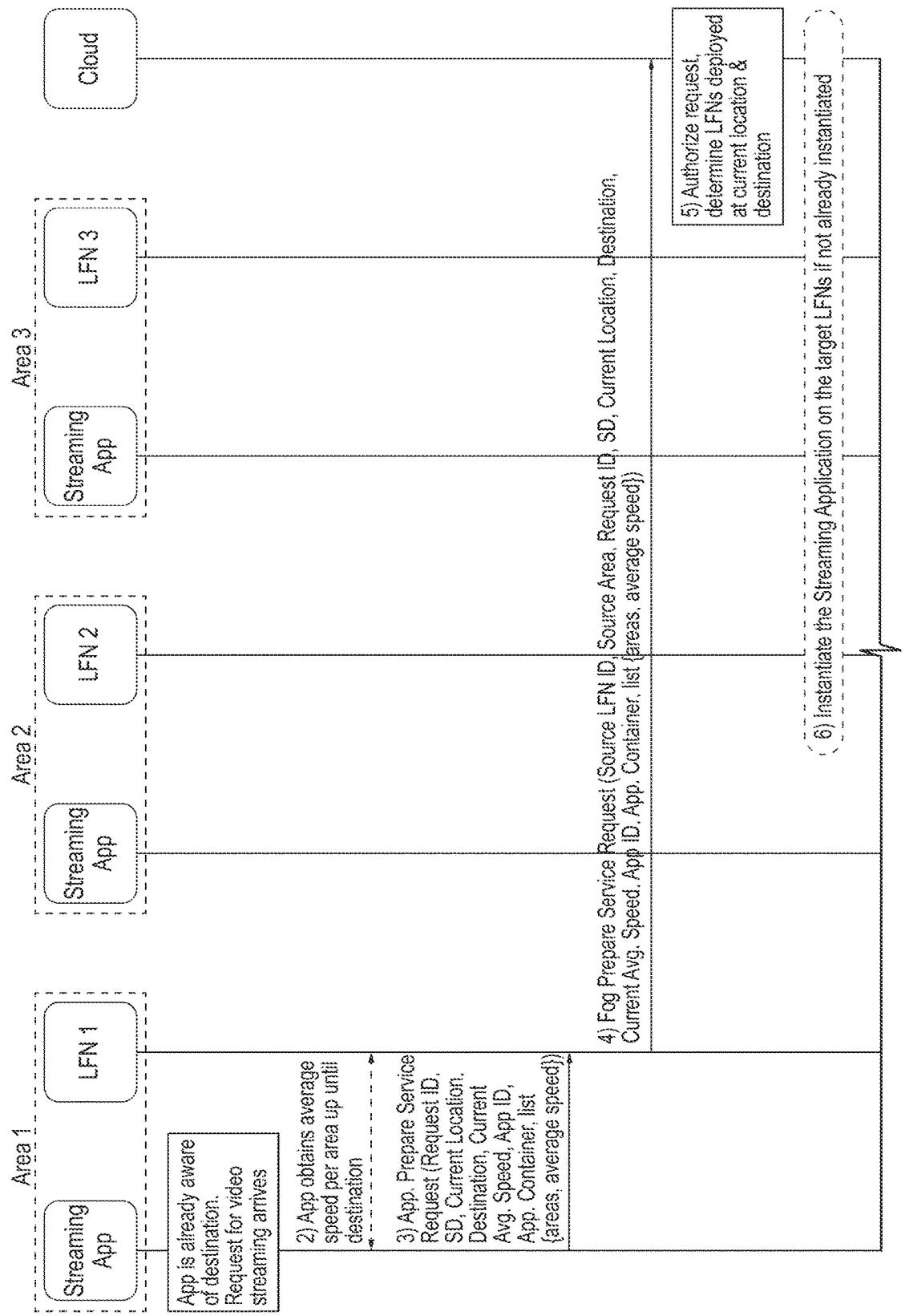
FIGS. 19A-B shows example fog service layer interactions to prepare application services based on predicted mobility.
Figure 19B:
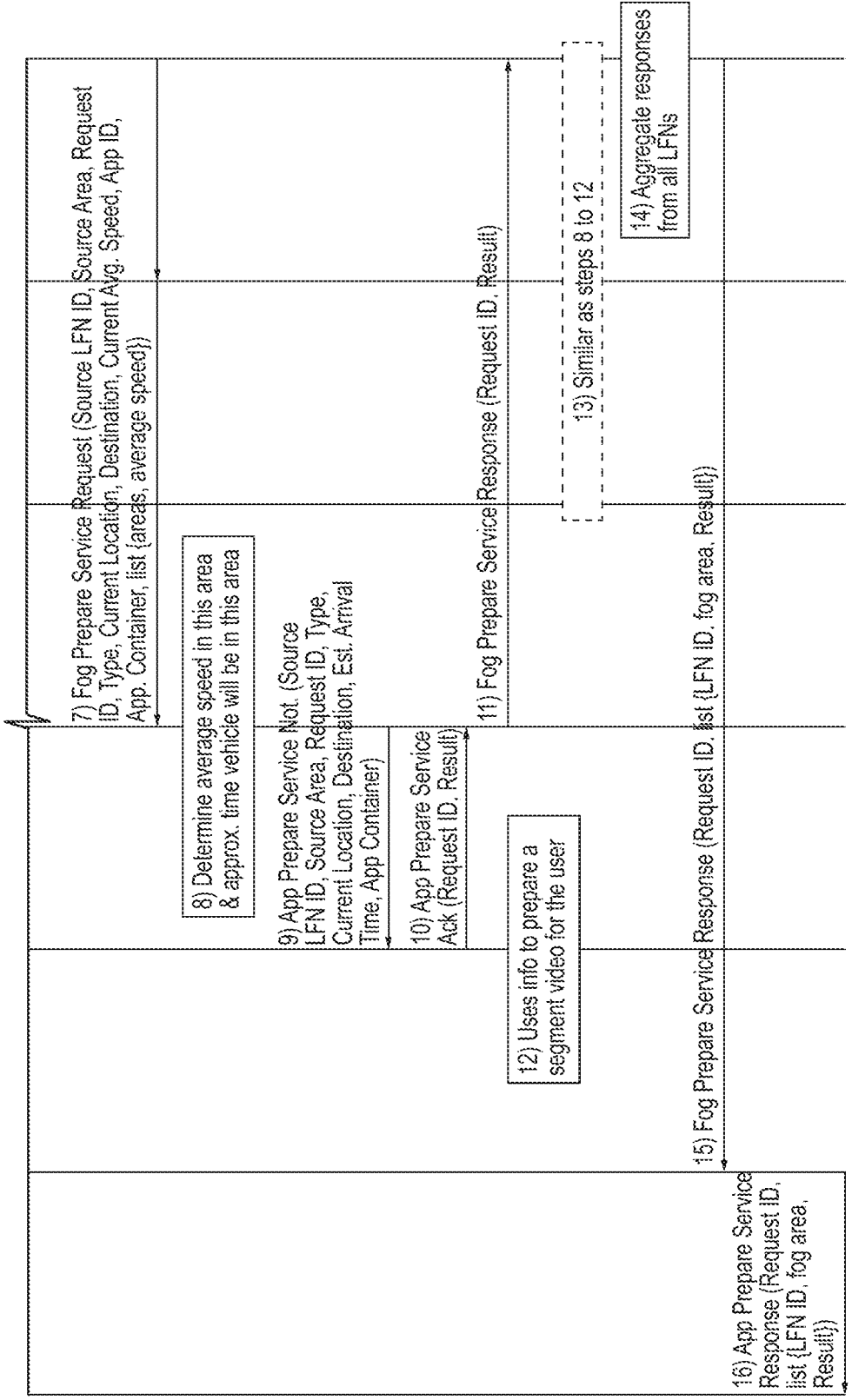

Assume the vehicle is currently in Fog Area 1 under LFN 1 and it is using a streaming application. For example, if the user is watching a movie and the user is currently at the fifth minute of a movie that is a hundred minutes long. Using the fog service layer, it may be estimated that in thirty minutes the user may be under Fog Area 2, and in sixty minutes the vehicle may be under Fog Area 3. As such, this information may be shared with the application instance that is running in the LFN 2 and LFN 3 under Fog Area 2 and Fog Area 3 respectively. Based on this estimate, the application layer on LFN 2 may fetch video streams starting approximately from the thirty fifth minute and that on LFN 3 may fetch contents starting from sixty fifth minute, etc. This content may be locally available or obtained from a main content provider. This section presents the procedures that enable the fog to provide a service of estimating the arrival of users into certain fog areas, and share application layer information across applications residing in the different fog layer so that they can prepare content ahead of time. FIG. 19 shows an example procedure to enable such a service across the fog service layer.

In step 1, the user may be already using the streaming application which is also aware of the user's location and the destination and driving route and hence the fog areas through which the user may cross. The application may use the fog service layer or interact with other applications on the same fog node to get this information. Additionally or alternatively, the user may have provided this information via a graphical user interface of the application.

In step 2, the application interacts with the LFN to get the average speed of vehicles in each of the areas through which the vehicle is expected to go through, in this example, fog area 2 and fog area 3. Note that this information can be obtained as a fog layer service as described herein.

In step 3, the application uses the API: Application Prepare Service Request to request the LFN 1 to prepare target LFNs and application instances on the LFNs for the service in question. The API may also include a Request ID, FSD, the vehicle's current location, its destination, the average speed in this location (i.e. fog area 1), the Application ID, Application Container, and a list of fog areas in which car may go through and the corresponding average speed per area.

In step 4, the fog node sends a Fog Prepare Service Request message to the cloud. The message may include the source fog ID, fog area, Request ID, FSD, the vehicle's current location, its destination, the average speed in this location (i.e. fog area 1), the Application ID, Application Container, and a list of fog areas in which car may go through and the corresponding average speed per area.

In step 5, the cloud authorizes the request and determines the target fog nodes on which the service should be prepared.

In step 6, the cloud is also aware whether or not the application identified by the Application ID is already instantiated in the target LFNs. If not, the cloud initiates the instantiation of the application as described herein.

In step 7, the cloud sends a Fog Prepare Service Request message to the target LFNs, here LFN 2 and LFN 3. The message may include the source fog ID, fog area, Request ID, FSD, the vehicle's current location, its destination, the average speed in this location (i.e. fog area 1), the Application ID, Application Container, and a list of fog areas in which car may go through and the corresponding average speed per area.

In step 8, the LFN 2 uses the information provided to estimate the time needed for the vehicle to enter its fog area. The LFN 2 can use the included average speed related to LFN 2 or it can first compute the most recent average speed and use that information. It may be assumed that LFN 2 has information about the span of its neighboring fog areas.

In step 9, the LFN 2 (e.g. LF Manager) uses the API: Application Prepare Service Notification to inform the application instance about the need to prepare a service for a particular user. The API may also provide the application with the source fog ID, fog area, Request ID, FSD, the vehicle's current location, its destination, the estimated arrival time into this fog area, and the Application Container. The container contains application layer information that is transparent to the fog node and this can include information about which part or type of service that should be prepared such as length of the video, current time of stream, etc.

In step 10, the application responds with the API: Application Prepare Service Ack and includes the result and the Request ID. The application may first execute Step 12 before responding.

In step 11, the LFN 2 responds to the cloud with a Fog Prepare Service Response message. The message may include the Request ID and the result. Although not shown, the message may also include the target fog ID, fog area, and optionally the Application ID.

In step 12, the application uses the received information (e.g. estimated time, current location, etc.) and the FSD and Application Container to fetch (e.g. buffer) and prepare the data or service for the user in question. It is assumed that when the user enters this fog area, the user may contact the application which then resumes serving the user.

Step 13: similar to Step 8 through Step 11 but the interactions are between the LFN 3 and the cloud. Also, the application instance in this LFN 3 takes similar actions as described in Step 12.

In step 14, the cloud aggregates all the responses from each of the target LFN that was contacted to prepare a service.

In step 15, the cloud node sends a Fog Prepare Service Response message to the source LFN. The message may include a Request ID and a list of: target fog ID, fog area, and the result of the request per fog node.

In step 15, the LFN (e.g. LF Manager) uses the API: Application Prepare Service Response to inform the application about the result of the request. The API may also includes a Request ID and a list of: target fog ID, fog area, and the result of the request per fog node.

Some of the procedures described herein can be implemented as oneM2M procedures, specifically, the management procedures for Fog Capability Discovery and Fog Capability Status Report.

Before discussing these procedures in oneM2M methods, every fog node (or LFN, or FE) or the cloud can be implemented as a CSEBase with the following new attributes: "lfnID," "fogArea," and "fogCapabilities." The "fogCapabilities" attributes contains all the capabilities of the fog node as have been described herein. For example, capabilities may include all the IoT devices or "things" (e.g. camera, sensors, etc.) that are connected to the fog node, their location and other specific capabilities. Other fog capabilities may also include native services provided by the fog node such as tracking, supported access technologies for transmit and receive functions, support for particular protocol processing, etc. Alternatively, certain capabilities may be represented as oneM2M resources such as AE, container, or mgmtObj resources. Table 1 shows the attributes of the CSEBase resource with the inclusion of "lfnID," "fogArea," and "fogCapabilities" attributes, with reference to the oneM2M Technical Specification, oneM2M-TS-001-V3.5.

TABLE 1

Example Attributes in the CSEBase

| Attributes of <CSEBase> | Multiplicity | RW/RO/WO | Description |
|---|---|---|---|
| resourceType | 1 | RO | See clause 9.6.1.3. |
| resourceID | 1 | RO | See clause 9.6.1.3. |
| resourceName | 1 | RO | See clause 9.6.1.3. |
| parentID | 1 | RO | See clause 9.6.1.3. Shall be NULL. |
| creationTime | 1 | RO | See clause 9.6.1.3. |
| lastModifiedTime | 1 | RO | See clause 9.6.1.3. |
| accessControlPolicyIDs | 0..1 (L) | RO | See clause 9.6.1.3. |
| labels | 0..1 (L) | RO | See clause 9.6.1.3. |
| dynamicAuthorizationConsultationIDs | 0..1 (L) | RO | See clause 9.6.1.3. |
| cseType | 0..1 | RO | Indicates the type of CSE represented by the created resource: Mandatory for an IN-CSE, hence multiplicity (1). Its presence is subject to SP configuration in case of an ASN-CSE or a MN-CSE. |
| CSE-ID | 1 | RO | The CSE identifier in SP-relative CSE-ID format (clause 7.2). |
| supportedResourceType | 1 (L) | RO | List of the resource types which are supported in the CSE. This attribute contains subset of resource types listed in clause 9.2. |
| pointOfAccess | 1 (L) | RO | Represents the list of physical addresses to be used by remote CSEs to connect to this CSE (e.g. IP address, FQDN). This attribute is exposed to its Registree. |
| nodeLink | 0..1 | RO | The resource identifier of a <node> resource that stores the node specific information of the node on which the CSE represented by this <CSEBase> resource resides. |
| lfnID | 1 | RO | A unique identifier of the LFN. |
| fogArea | 0..1 (L) | RO | The geographical area that this fog node is responsible for or provides service coverage to. This describes the service coverage area of the fog node. This information may be provided in several ways. E.g. it may be related to a shape and the information then describes the area of a rectangle that the fog node serves or covers. Or this may provide a set of (x,y) coordinates that together form the coverage area of the fog node. |
| fogCapabilities | 0..1 (L) | RO | The list of capabilities and services of the fog node. |
| applicationList | 1 (L) | RO | The list of applications running on the fog node. |
| reachabilityTimer | 1 | RO | The time that the fog node prefers that its neighbor node uses for periodic connection verification |
| notificationCongestionPolicy | 0..1 | RO | This attribute applies to CSEs generating subscription notifications. It specifies the rule which is applied when the storage of notifications for each subscriber (an AE or CSE) reaches the maximum storage limit for notifications forthat subscriber. E.g. Delete |

TABLE 1-continued

Example Attributes in the CSEBase

| Attributes of <CSEBase> | Multiplicity | RW/RO/WO | Description |
|---|---|---|---|
| | | | stored notifications of lower notificationStoragePriority to make space for new notifications of higher notificationStoragePriority, or delete stored notifications of older creationTime to make space for new notifications when all notifications are of the same notificationStoragePriority. |
| e2eSecInfo | 0..1 | RO | See clause 9.6.1.3. |

Figure 20:
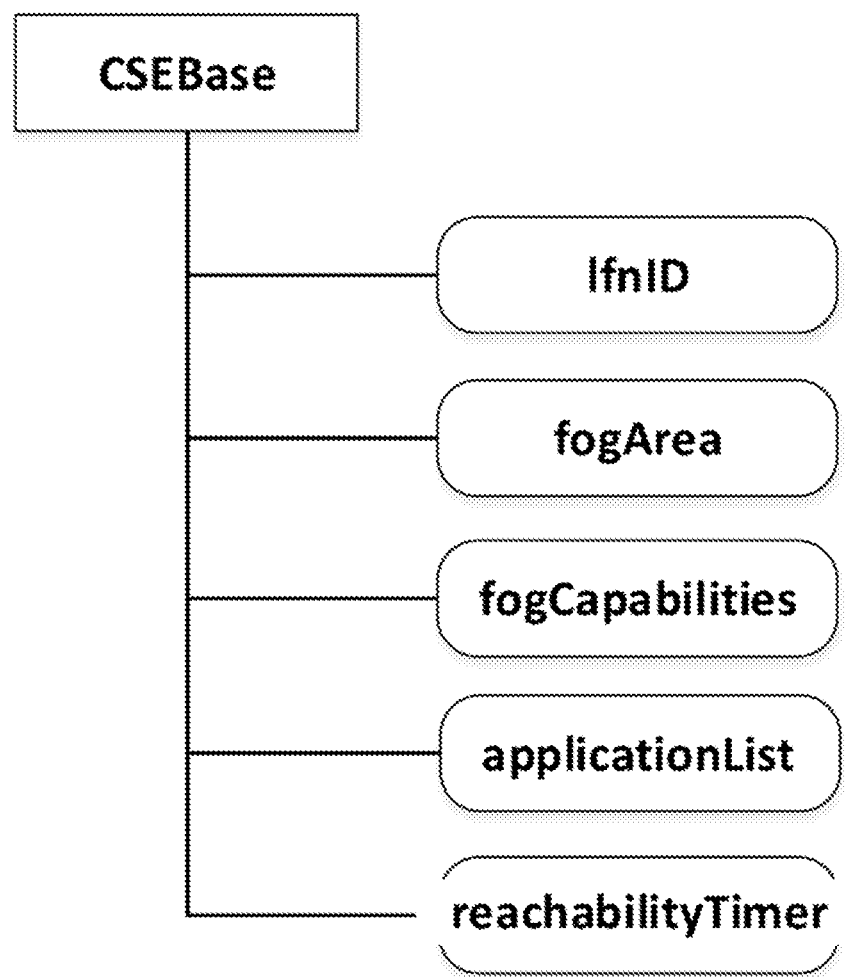
FIG. 20 shows an example resource tree for the CSEBase.

FIG. 20 shows an example resource tree in a fog node, LFN or cloud. This resource tree only shows the new attributes described above for simplicity.

Table 2 shows examples of possible capabilities parameters that may be included in the "fogCapabilities" attribute. Note that the "fogCapabilities" attribute describes the list of fog capabilities that are supported by the fog node. The capabilities include any of the capabilities or services described herein. Note that, where applicable, this also may contain location information associated to the location of the capability. For example, a camera capability may include a list of cameras and the corresponding location of deployment and any other service or capability that is supported by the camera. Another capability of the fog node maybe analytics which is not associated with a location information as it resides in the fog node, etc. As such, some fog capabilities or services may be associated with location information while others are not.

TABLE 2

Example Parameters in the "fogCapabilities" Attribute

| Parameters Name | Description |
|---|---|
| cameras | A list of camera deployed in particular locations, their identities, and the location of deployment and the services each camera provides (e.g. static images, video, infrared capabilities, image processing with face recognition, etc.) |
| speedSensors | A list of speed sensors deployed in particular locations, their identities, and the location of deployment and the services each sensor provides (e.g. average speed value in Km/Hr, in Miles/Hr, etc.) |
| transmitReceiveFunction | A list of access points, their access technology and location of deployment, and the coverage area of these access points, their addresses, etc. |
| safetyApplicationProtocols | A list of safety application protocols that the fog node supports such as IEEE WAVE or Wave Short Message Protocol, etc. |
| services | A list of services that are supported by the fog node e.g. tracking service, analytics, etc. |

Note that Table 2 only shows a small sub-set of the capabilities described herein, however, all other capabilities described may be included and also different capabilities can be defined and included.

Figure 21:
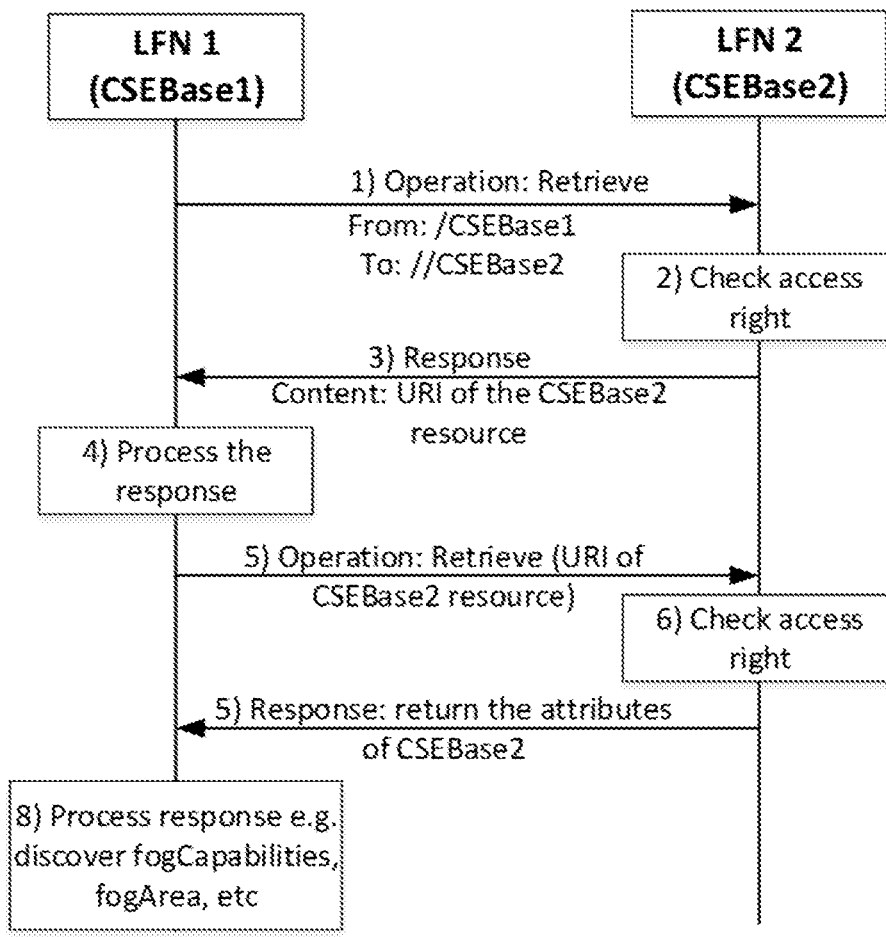
FIG. 21 shows an example implementation of the fog capability discovery procedure with a oneM2M retrieve operation.

The Fog Capability Discovery procedure described herein can be implemented with a oneM2M Retrieve operation that is shown in FIG. 21 below. Alternatively, if fog capabilities are represented as oneM2M resources, then oneM2M Resource Discovery can also be used to discover fog capabilities. Note that it is assumed that the LFNs and hence each CSEBase has discovered each other prior to this procedure.

Figure 22:
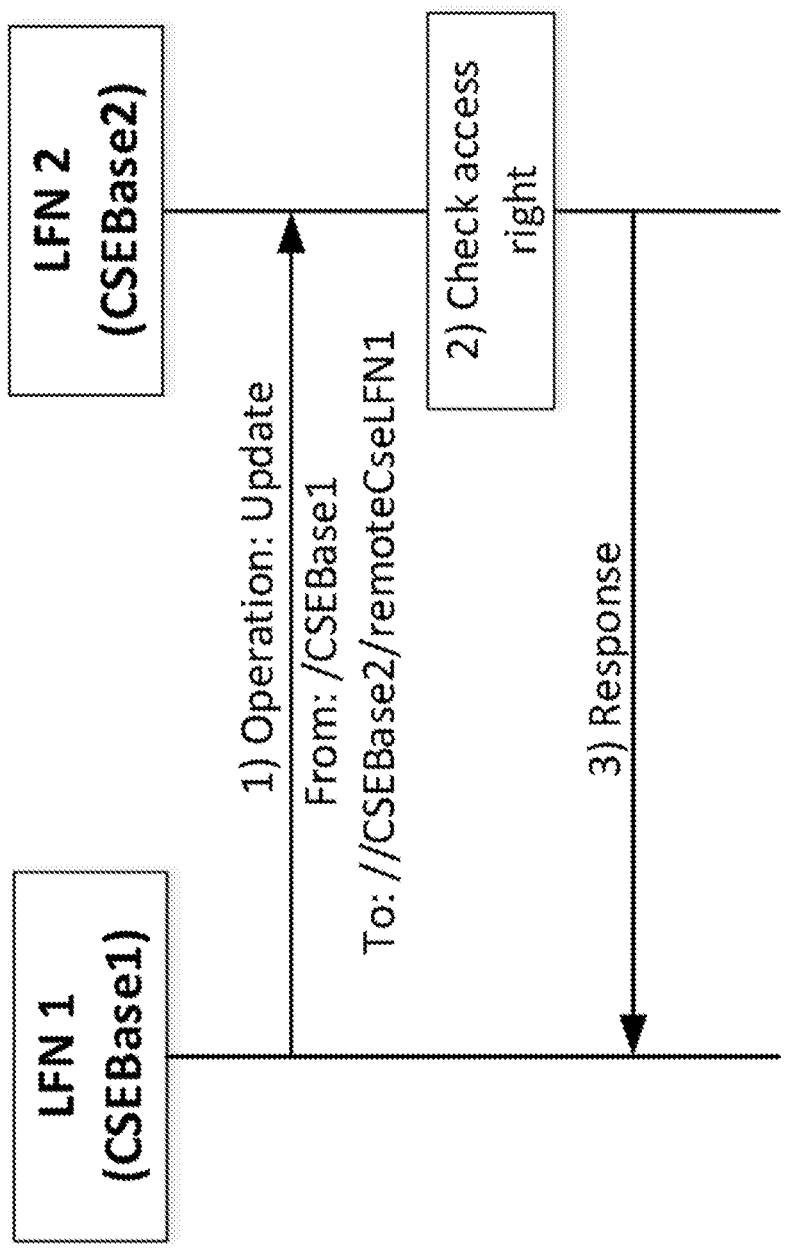
FIG. 22 shows an example implementation of the fog capability status report procedure with a oneM2M update operation.

The Fog Capability Status Report procedure described herein can be implemented with a oneM2M Update operation. Again, it is assumed that each LFN and hence CSEBase has discovered each other prior to this. Moreover, it is assumed that each LFN, and hence CSEBase, has at least one remoteCSE resource that corresponds to the resources and attributes of a neighbor LFN. For example, LFN 1 and LFN 2 have previously registered with each other. LFN 1, in addition to its new attributes that are shown in FIG. 20, may also have a remoteCSE resource for LFN 2. This remoteCSE may also have the same attributes as shown in FIG. 20. Likewise, LFN 2 may have a remoteCSE resource for LFN 1. Therefore, when any of the capabilities or services change in one LFN, the LFN can use the Update operation of oneM2M to update a neighbor LFN about the status of the capabilities and services in the source LFN. FIG. 22 shows an example implementation of the Fog Capability Status Report with an Update operation (assuming both CSEBase entities have already registered with one another).

A oneM2M message may be used to request the instantiation or deactivation (i.e. de-instantiation) of an application that is already running on a LFN. To do so, we first describe the new attributes of the <software> resource that is defined in the oneM2M Technical Specification, oneM2M-TS-001-V3.5.

Figure 23:
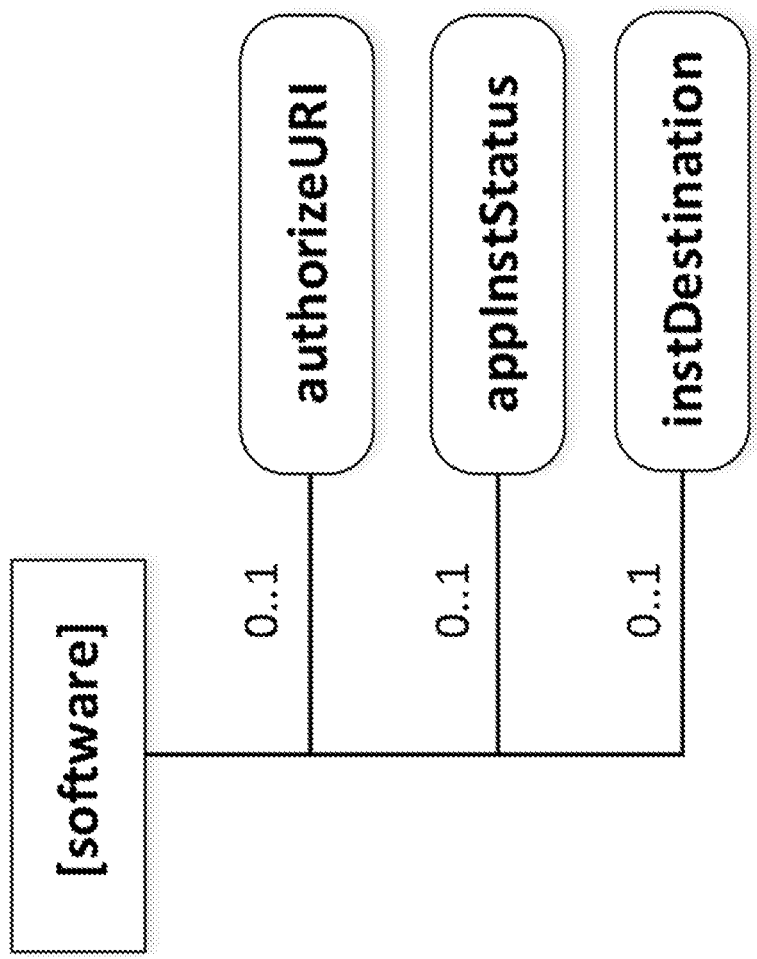
FIG. 23 shows an example enhanced resource for supporting application instantiation.

The resource tree shown in FIG. 23 is only showing the proposed new attributes, i.e. authorizURI, appInstStatus, and instDestination. It may be assumed that the AE has registered with a CSEBase that represents a LFN and has Software resource with the new attributes shown above. As such, the AE can use the oneM2M Update message to request the CSE to instantiate an application or deactivate an application that is already running on the LFN. To instantiate an application, the AE updates the authorizURI attribute of the Software resource such that the value would point to the Cloud Node where the target LFN would communicate with in order to authorize the instantiation request. Also, the AE may set the appInstStatus attribute to a value that indicates e.g. "Instantiate." To deactivate the application, the AE may send the oneM2M Update message and update the appInstStatus attribute to a value that indicates, for example, to "Deactivate" while setting the authorizURI attribute to reflect the Cloud Node where the target LFN would contact to authorize the deactivation request. Table 3 describes the new attributes of the Software resource that are shown in FIG. 23.

TABLE 3

Example New Resources in the Software Resource Tree

| Attributes of <CSEBase> | Multi-plicity | RW/ RO/ WO | Description |
|---|---|---|---|
| authorizeURI | 0..1 | RW | Represents the URI of the FN or the Cloud Node that is responsible to authorize the application instantiation request. Note that the application instantiation request may be either to instantiate or deactivate the application. |
| appInstStatus | 0..1 | RW | This indicates the type of action that is needed by the application instantiation request. For example, a value of "Instantiate" indicates that the application should be instantiated, while a value of e.g. "Deactivate" means the application should be un-instantiated or deactivated. |
| instDestination | 0..1 | RW | This describes the target LFN and/or the target Fog Area where the request should be executed (e.g. their IP addresses, fully qualified domain name, and/or URI, etc.). |

Figure 24:
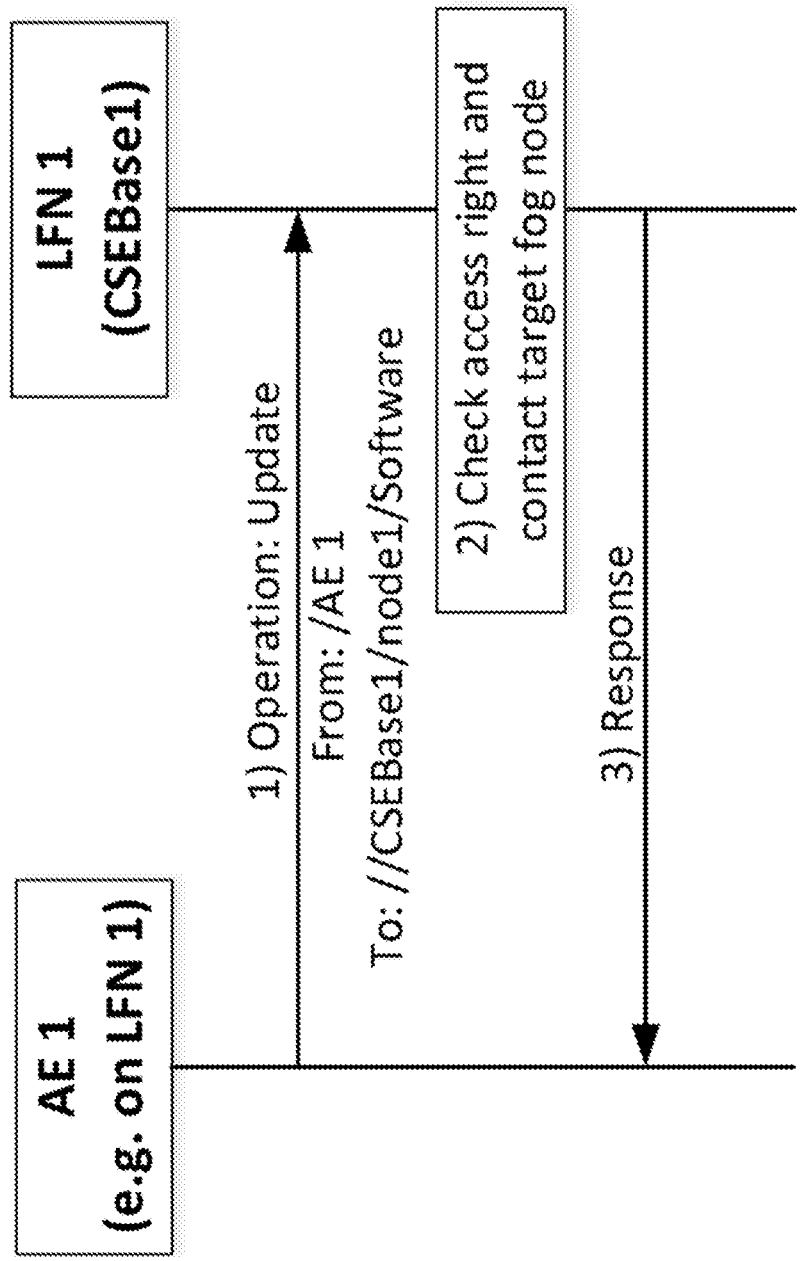
FIG. 24 shows an example oneM2M update message used to instantiate an application at a local fog node.

FIG. 24 shows an example flow by which an AE may send the oneM2M Update message to a CSEBase1 that represents an LFN1 and updates the attributes of the [software] resource accordingly (as described herein) for the purpose of instantiating an application to another fog node LFN2. In FIG. 24, it is assumed that "node1" is a oneM2M <node> resource for management purpose and it can be placed directly under CSEBase1; alternatively, the resource "node1" can be placed as a child resource of CSEBase1/ remoteCSEforLFN2 where remoteCSEforLFN2 is a oneM2M <remoteCSE> resource and refers to the CSE on LFN2.

To instantiate the application, the AE sends the Update message and sets the value of the attributes as explained above. The AE sets the value of the authorizeURI attribute to point to the Cloud Node. Hence, the LFN 1 may use the value of that attribute to contact the Cloud Node for authorization. LFN1 may also inform the Cloud Node of the address of target fog node (i.e. the value of instDestination attribute). Then, the Cloud Node may be able to contact the target fog node to instantiate the application onto it. As such, step 2 of FIG. 24 may then correspond to steps 9, 10, and 11 of FIG. 13. Furthermore, step 3 of FIG. 24 may correspond to step 13 of FIG. 13.

Note that the FEs can also act like an AE and hence the procedure proposed above would also apply to FEs communicating with the LFNs.

Figure 25:
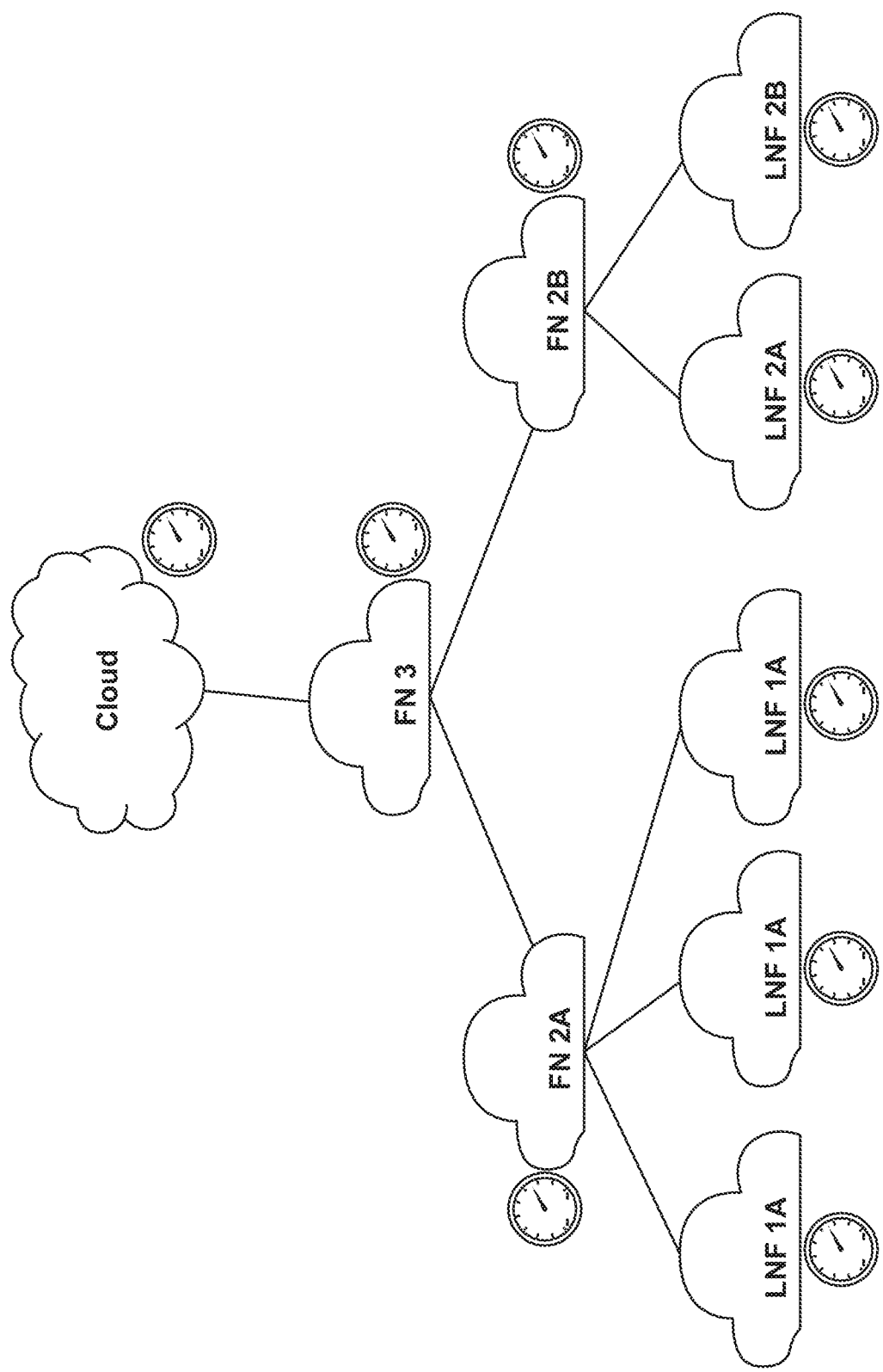
FIG. 25 shows an example monitor showing the hierarchy of fog nodes and the cloud with associated performance meters.
Figure 26:
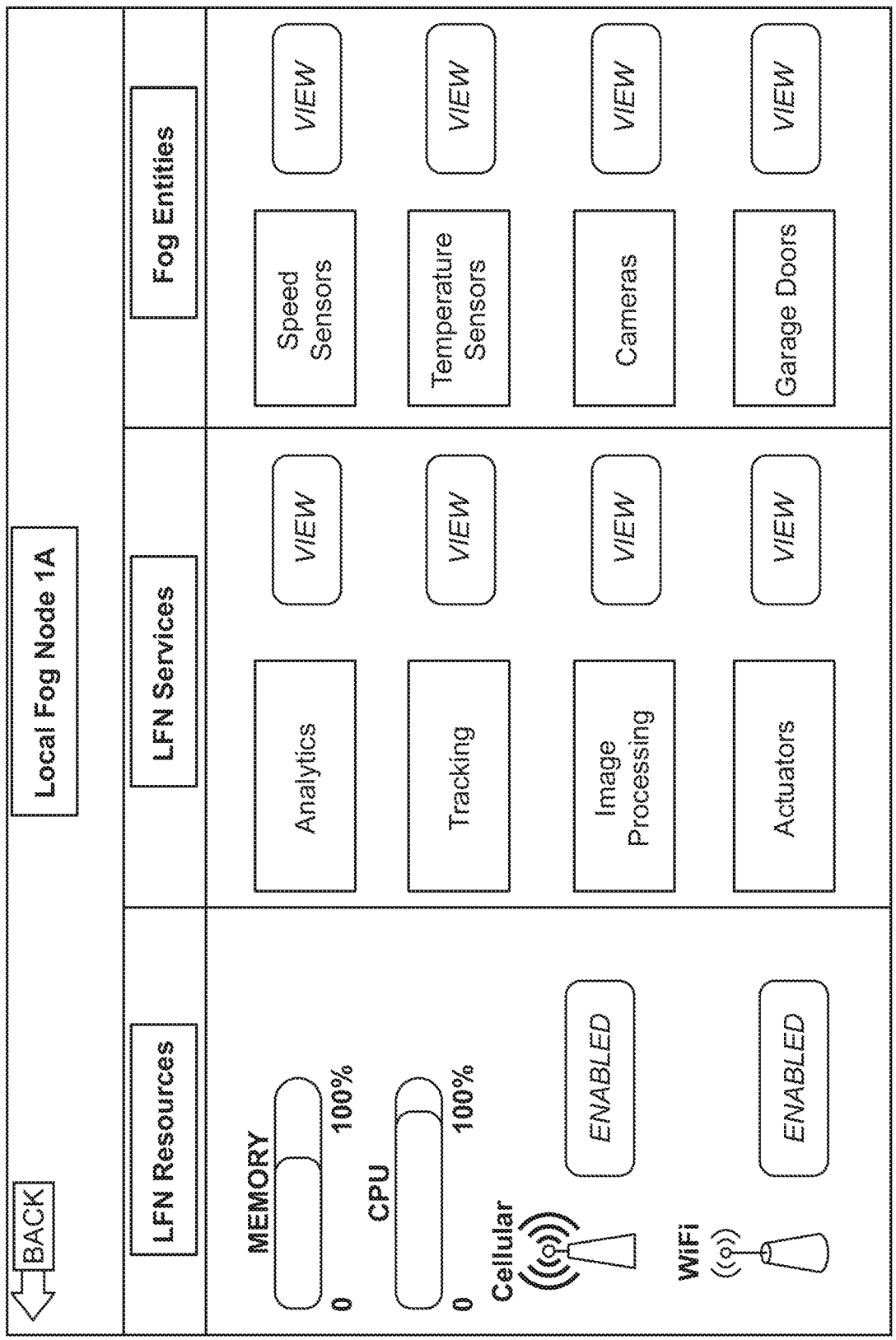
FIG. 26 shows an example of a possible display option.

FIGS. 25 and 26 show an example of what a potential GUI looks like for displaying the hierarchy of LFNs, FNs, and the cloud, and also the resources and services and FEs that connect to a LFN.

FIG. 25 shows an example hierarchy of deployed LFNs, FNs and the cloud, the connections between them and which FN controls certain LFNs. Furthermore, beside each LFN, there is a meter that displays the performance level at which the LFN is running. This performance level covers all the resources of the LFN. For example, it may be an average of the performance of each of the resources in the LFN. The same performance meter is shown next to each FN and the cloud.

A user may want to find out more about a LFN's supported resources and their usage levels, in addition to the list of supported services and the FEs that connect to the LFN. The user may then touch the screen, specifically touch a particular LFN of interest. For example, the user may want to verify the details of LFN 1A. After touching the area of LFN 1A, the user may be provided with a display containing resource, service and FE information that is associated with this LFN. FIG. 26 shows an example display that may result from this process.

Note that FIG. 26 is an example of a possible display option, however, the actual display may contain a sub-set of this information or other information not shown above. In this example, the GUI shows three categories of information—LFN Resources, LFN Services, and Fog Entities. The resources may show the percentage usage at the LFN for each of the supported resources of which two are shown as an example, namely Memory and CPU. The LFN Resource may also indicate if the LFN supports resources related to particular access technologies and an indication of whether the resource is enabled or not. The second category of information is the LFN Services that are supported by the LFN which may be Analytics, Tracking, Image Processing and Actuator control, etc. The user may be provided with a "View" button option which may provide further details about each of the services. A third category of information may be related to the FEs that the LFN connect to. There may be a set of Speed Sensors, Temperatures Sensors, Cameras, etc., that connect to the LFN. The user may use the "View" button to see more details about these FE such at their location, status, ID, manufacturer, etc.

Figure 27A:
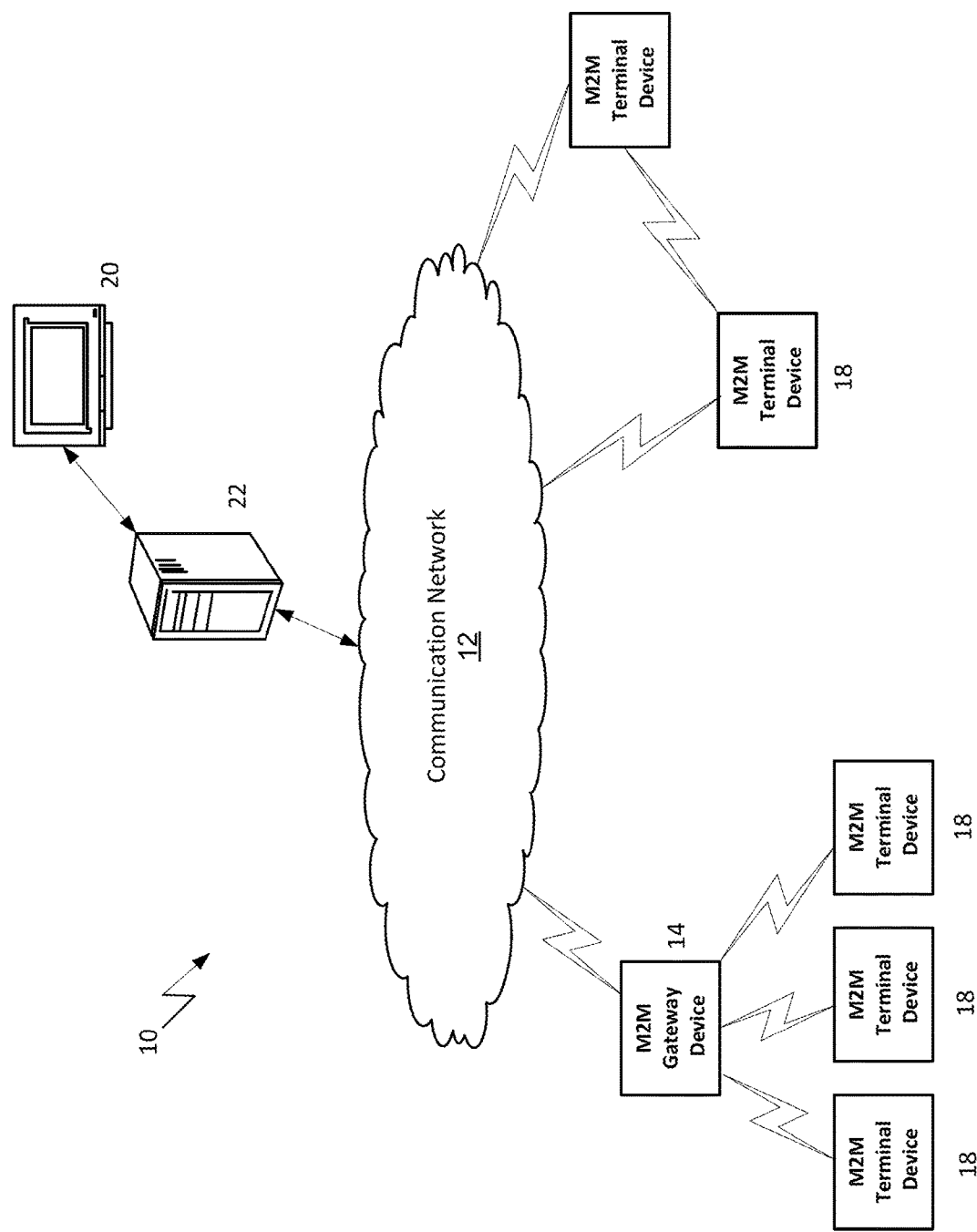
FIG. 27A shows an example system diagram of an example machine-to-machine (M2M) or Internet of Things (IoT) communication system in which one or more disclosed embodiments may be implemented.
Figure 27B:
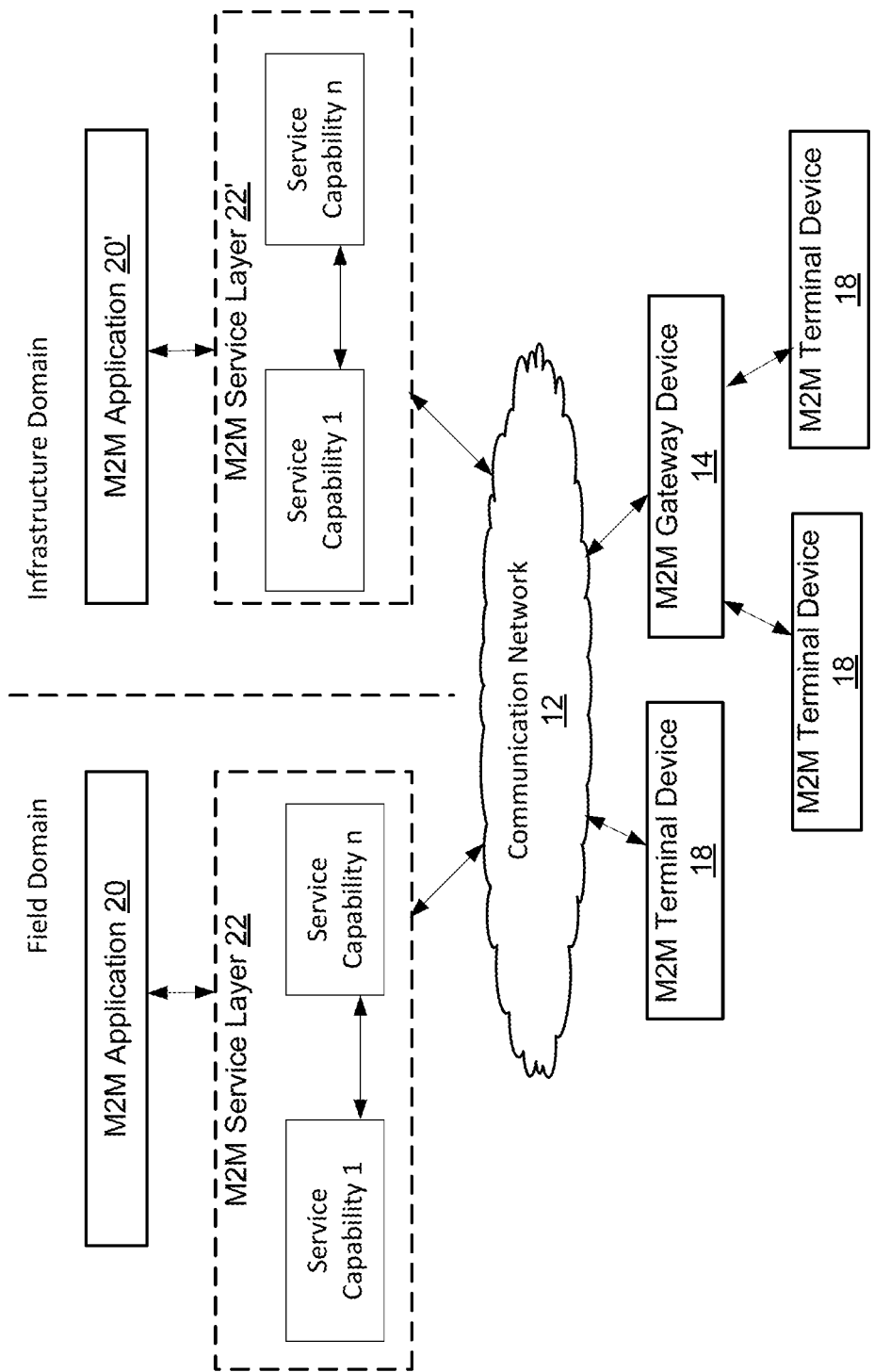
FIG. 27B shows an example system diagram of an example architecture that may be used within the M2M/IoT communications system illustrated in FIG. 27A.
Figure 27C:
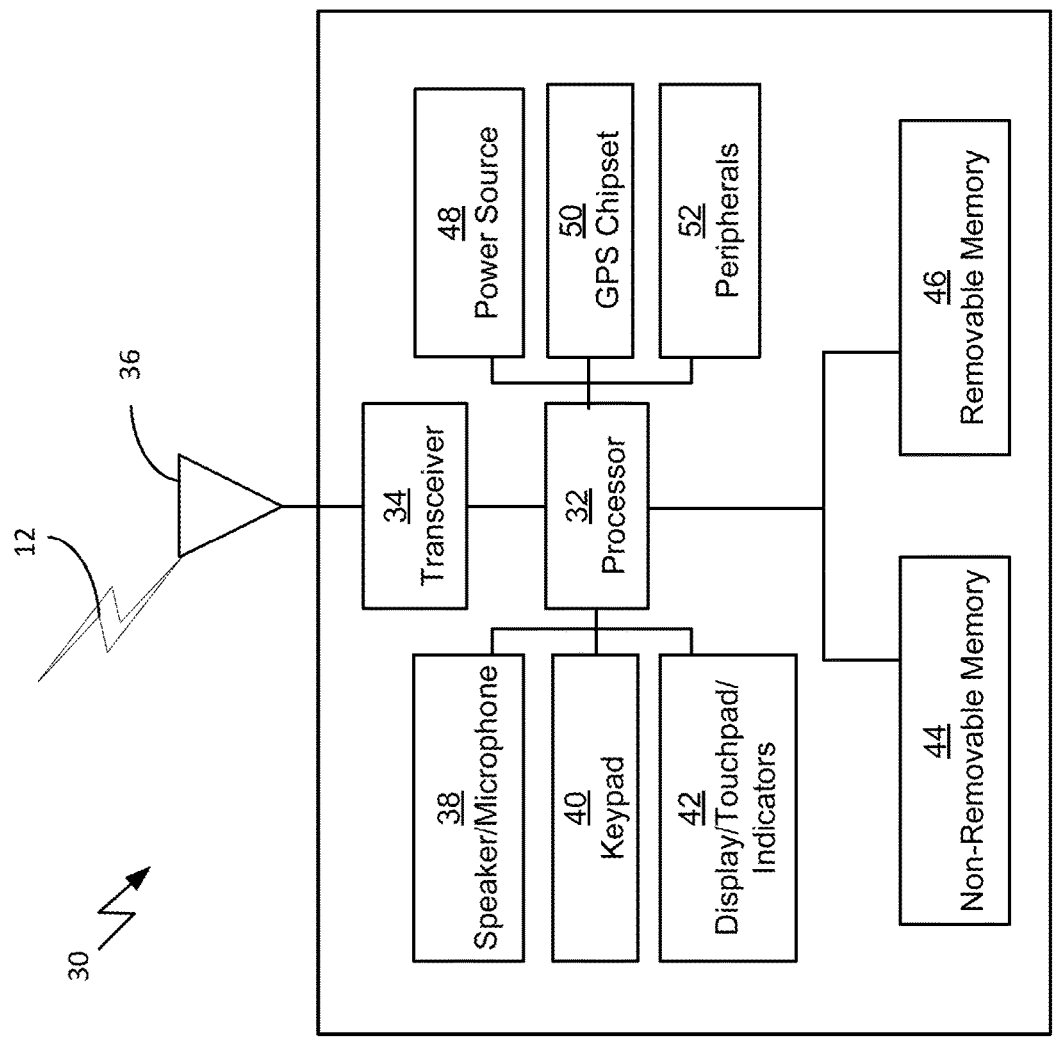
FIG. 27C shows an example system diagram of an example M2M/IoT terminal or gateway device that may be used within the communications system illustrated in FIG. 27A.
Figure 27D:
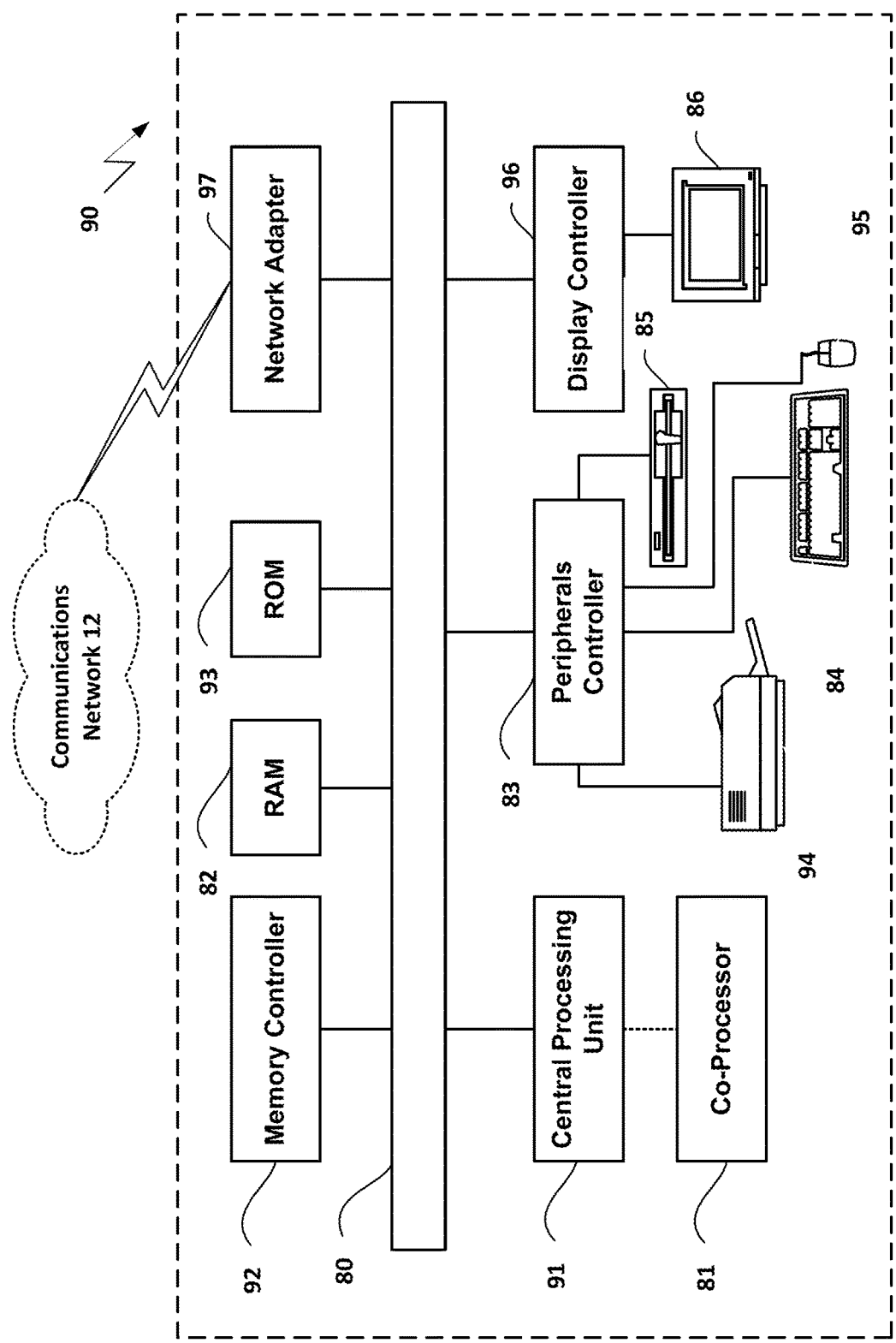
FIG. 27D shows an example block diagram of an example computing system in which aspects of the communication system of FIG. 27A may be embodied.

Any of the entities performing the steps illustrated in FIGS. 6, 8-19, 21, 22 and 24-26 such as the service layer, application entity, cloud node, fog entity, fog node, local fog node, and the like, may be logical entities that may be implemented in the form of software (i.e., computer-executable instructions) stored in a memory of, and executing on a processor of, an apparatus configured for wireless and/or network communications or a computer system such as those illustrated in FIG. 27C or FIG. 27D. That is, the method(s) illustrated in FIGS. 6, 8-19, 21, 22 and 24-26 may be implemented in the form of software (i.e., computer-executable instructions) stored in a memory of an apparatus, such as the apparatus or computer system illustrated in FIG. 27C or FIG. 27D, which computer executable instructions, when executed by a processor of the apparatus, perform the steps illustrated in FIGS. 6, 8-19, 21, 22 and 24-26. It is also understood that any transmitting and receiving steps illustrated in FIGS. 6, 8-19, 21, 22 and 24-26 may be performed by communication circuitry of the apparatus/entity under control of the processor of the apparatus and the computer-executable instructions (e.g., software) that it executes.

FIG. 27A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or apparatus of the IoT/WoT as well as an IoT/WoT Service Layer, etc. Any of the entities illustrated in any of FIGS. 1-26 may comprise a network apparatus of a communication system, such as the ones illustrated in FIGS. 27A-27D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above-mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 27A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 27A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network apparatuses (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link.

A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 27B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more network apparatuses of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more network apparatuses of the network, which may comprise servers, computers, devices, virtual machines (e.g., cloud computing/storage farms, etc.) or the like.

Referring also to FIG. 27B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other network apparatuses of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 27B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network apparatus (e.g., server, computer, gateway, device or the like) having the general architecture illustrated in FIG. 27C or FIG. 27D described below.

Further, the methods and functionalities described herein may be implemented as part of an M2M network that uses a Service Oriented Architecture (SOA) and/or a Resource-Oriented Architecture (ROA) to access services.

FIG. 27C is a block diagram of an example hardware/software architecture of an apparatus of a network, such as one of the entities illustrated in FIGS. 1-26, which may operate as an M2M server, gateway, device, or other network apparatus in an M2M network such as that illustrated in FIGS. 27A and 27B. As shown in FIG. 27D, the network apparatus 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The network apparatus 30 may also include communication circuitry, such as a transceiver 34 and a transmit/receive element 36. It will be appreciated that the network apparatus 30 may include any sub-combination of the foregoing elements while remaining consistent with an embodiment. This network apparatus may be an apparatus that implements the message template management capabilities and methods described herein, such as the methods operations illustrated and described in relation to FIGS. 1-26.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the network apparatus in order to perform the various required functions of the network apparatus. For example, the processor 32 may perform signal coding, data processing, power control, input/output processing, and/or any other functionality that enables the network apparatus 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 27C, the processor 32 is coupled to its communication circuitry (e.g., transceiver 34 and transmit/receive element 36). The processor 32, through the execution of computer executable instructions, may control the communication circuitry in order to cause the network apparatus 30 to communicate with other network apparatuses via the network to which it is connected. In particular, the processor 32 may control the communication circuitry in order to perform the transmitting and receiving steps described herein (e.g., in FIGS. 1-26) and in the claims. While FIG. 27C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other network apparatuses, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 27C as a single element, the network apparatus 30 may include any number of transmit/receive elements 36. More specifically, the network apparatus 30 may employ MIMO technology. Thus, in an embodiment, the network apparatus 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the network apparatus 30 may have multi-mode capabilities. Thus, the transceiver 34 may include multiple transceivers for enabling the network apparatus 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the network apparatus 30, such as on a server or a home computer. The processor 32 may be configured to control lighting patterns, images, or colors on the display or indicators 42 to reflect the status of an apparatus or configure an apparatus, and in particular underlying networks, applications, or other services in communication with the network apparatus. In one embodiment, the display/indicators 42 may present the graphical user interface illustrated in FIG. 31 and described herein.

The processor 32 may receive power from the power source 48, and may be configured to distribute and/or control the power to the other components in the network apparatus 30. The power source 48 may be any suitable device for powering the network apparatus 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the network apparatus 30. It will be appreciated that the network apparatus 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The network apparatus 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The network apparatus 30 may connect to other components, modules, or systems of such apparatuses or devices via one or more interconnect interfaces, such as an interconnect interface that may comprise one of the peripherals 52.

FIG. 27D is a block diagram of an exemplary computing system 90 which may also be used to implement one or more network apparatuses of a network, such as the entities illustrated in FIGS. 1-26, and described herein, which may operate as an M2M server, gateway, device, or other network apparatus in an M2M network such as that illustrated in FIGS. 27A and 27B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 31 and its accompanying description.

Further, computing system 90 may contain communication circuitry, such as for example a network adaptor 97, that may be used to connect computing system 90 to an external communications network, such as network 12 of FIG. 27A-27D, to enable the computing system 90 to communicate with other apparatuses of the network. The communication circuitry, alone or in combination with the CPU 91, may be used to perform the transmitting and receiving steps described herein (e.g., in FIGS. 1-26) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

The following is a list of acronyms relating to service layer technologies that may appear in the above description. Unless otherwise specified, the acronyms used herein refer to the corresponding term listed below:

API Application Programing Interface
CoAP Constrained Application Protocol
CoRE Constrained RESTful Environment
CSE Common Service Entity
D2D Device-to-Device
DSRC Dedicated Short Range Communications
F2C Fog-to-Cloud
F2F Fog-to-Fog
FN Fog Node
FE Fog Entity
GUI Graphical User Interface
HTTP HyperText Transfer Protocol
IEEE Institute of Electrical and Electronics Engineers
IoT Internet of Things
IP Internet Protocol
IPv6 Internet Protocol Version 6
LFN Local FN
RSU Road Side Unit
WAVE Wireless Access in Vehicular Environment
WG Working Group This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A method performed by a first local fog node, the method comprising:
    receiving, from an application hosted on a device that interacts with the first local fog node, a request to provide a service, wherein the request to provide the service comprises a fog service description associated with the service;
    determining, based on the fog service description associated with the service, that a second local fog node is configured to provide the service;
    sending, to the second local fog node, an indication of the request to provide the service;
    receiving, from the second local fog node and based on the indication of the request to provide the service, a response message associated with the service, wherein the service is provided by the second fog node and each of the first local fog node and second local fog node are network nodes comprising functions located in closer proximity to the application than a host of the service;
    updating information stored at the first local fog node to indicate that the second local fog node is configured to provide the service, wherein the information comprises one or more of an identifier associated with the second local fog node and an identifier associated with the request to perform the service; and
    sending, to the application, the response message associated with the service.

2. The method of claim 1, wherein the request to provide the service further comprises one or more of an identifier associated with the application and an identifier associated with the request to perform the service.

3. The method of claim 2, wherein the indication of the request to provide the service comprises one or more of an identifier associated with the first local fog node, an identifier of a fog area associated with the first local fog node, the identifier associated with the application and the identifier associated with the request to perform the service.

4. The method of claim 1, further comprising determining, prior to sending the indication of the request to provide the service, whether one or more policies stored at the first local fog node indicate that the application is authorized to receive the service.

5. The method of claim 4, wherein the second local fog node, prior to sending the response message associated with the service, determines whether one or more policies stored at the second local fog node indicate that the first local fog node is authorized to receive the response message associated with the service.

6. A device comprising a processor and a memory, the memory storing computer-executable instructions which, when executed by the processor, cause the device to implement a first local fog node configured to perform operations comprising:
    receiving, from an application hosted on the device that interacts with the first local fog node, a request to provide a service, wherein the request to provide the service comprises a fog service description associated with the service;
    determining, based on the fog service description associated with the service, that a second local fog node is configured to provide the service;
    sending, to the second local fog node, an indication of the request to provide the service;

receiving, from the second local fog node and based on the indication of the request to provide the service, a response message associated with the service, wherein the service is provided by the second fog node and each of the first local fog node and second local fog node are network nodes comprising functions located in closer proximity to the application than a host of the service;

updating information stored at the first local fog node to indicate that the second local fog node is configured to provide the service, wherein the information comprises one or more of an identifier associated with the second local fog node and an identifier associated with the request to perform the service; and sending, to the application, the response message associated with the service.

7. The device of claim 6, wherein the request to provide the service further comprises one or more of an identifier associated with the application and an identifier associated with the request to perform the service.

8. The device of claim 7, wherein the indication of the request to provide the service comprises one or more of an identifier associated with the first local fog node, an identifier of a fog area associated with the first local fog node, the identifier associated with the application and the identifier associated with the request to perform the service.

9. The device of claim 6, wherein the instructions, when executed, further cause the first local fog node to perform operations comprising determining, prior to sending the indication of the request to provide the service, whether one or more policies stored at the first local fog node indicate that the application is authorized to receive the service.

10. The device of claim 9, wherein the second local fog node, prior to sending the response message associated with the service, determines whether one or more policies stored at the second local fog node indicate that the first local fog node is authorized to receive the response message associated with the service.

11. A computer-readable storage medium comprising computer-executable instructions which, when executed by a device, cause the device to implement a first local fog node configured to perform operations comprising:

receiving, from an application hosted on the device that interacts with the first local fog node, a request to provide a service, wherein the request to provide the service comprises a fog service description associated with the service;

determining, based on the fog service description associated with the service, that a second local fog node is configured to provide the service;

sending, to the second local fog node, an indication of the request to provide the service;

receiving, from the second local fog node and based on the indication of the request to provide the service, a response message associated with the service, wherein the service is provided by the second fog node and each of the first local fog node and second local fog node are network nodes comprising functions located in closer proximity to the application than a host of the service;

updating information stored at the first local fog node to indicate that the second local fog node is configured to provide the service, wherein the information comprises one or more of an identifier associated with the second local fog node and an identifier associated with the request to perform the service; and sending, to the application, the response message associated with the service.

12. The computer-readable storage medium of claim 11, wherein the request to provide the service further comprises one or more of an identifier associated with the application and an identifier associated with the request to perform the service.

13. The computer-readable storage medium of claim 12, wherein the indication of the request to provide the service comprises one or more of an identifier associated with the first local fog node, an identifier of a fog area associated with the first local fog node, the identifier associated with the application and the identifier associated with the request to perform the service.

14. The computer-readable storage medium of claim 11, wherein the instructions, when executed, further cause the first local fog node to perform operations comprising determining, prior to sending the indication of the request to provide the service, whether one or more policies stored at the first local fog node indicate that the application is authorized to receive the service.

* * * * *